United States Patent
Yeom et al.

(10) Patent No.: US 6,917,607 B1
(45) Date of Patent: Jul. 12, 2005

(54) APPARATUS AND METHOD FOR GATED TRANSMISSION IN CDMA COMMUNICATION SYSTEM

(75) Inventors: Jae-Heung Yeom, Seoul (KR); Soon-Young Yoon, Seoul (KR); Seung-Joo Maeng, Songnam-shi (KR); Yu-Suk Yun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 732 days.

(21) Appl. No.: 09/583,523

(22) Filed: May 31, 2000

(30) Foreign Application Priority Data

| May 31, 1999 | (KR) | 1999-19675 |
| Jun. 11, 1999 | (KR) | 1999-21742 |

(51) Int. Cl.[7] .......................................... H04B 7/216
(52) U.S. Cl. .................................. 370/342; 370/335
(58) Field of Search ................................ 370/335, 342, 370/522; 375/130; 455/522

(56) References Cited

U.S. PATENT DOCUMENTS

| 5,793,744 A | * | 8/1998 | Kanerva et al. | ............ 370/342 |
| 5,793,802 A | | 8/1998 | Kanada et al. | ............... 375/220 |
| 5,991,329 A | * | 11/1999 | Lomp et al. | ................. 375/130 |
| 6,373,823 B1 | * | 4/2002 | Chen et al. | .................. 455/522 |
| 6,545,989 B1 | * | 4/2003 | Butler | ......................... 370/335 |

FOREIGN PATENT DOCUMENTS

| JP | 8-70273 | 3/1996 | ............ H04B/7/26 |
| JP | 11-234242 | 8/1999 | ............ H04J/13/04 |
| KR | 99/06849 | 1/1999 | ............ H04B/1/40 |
| WO | 9836508 | * 8/1998 | |

OTHER PUBLICATIONS

Japanese Office Action dated Feb. 24, 2004 issued in a counterpart application, namely, Appln. No. 2001–500476.
Samsung Electronics Co.: "Gated Transmission of DPCCH in DCH/DCH Control Only Substates", TSG–RAN Working Group 1, Meeting #3, Apr. 18–20, 1999.

* cited by examiner

Primary Examiner—Steven Nguyen
(74) Attorney, Agent, or Firm—Dilworth & Barrese LLP

(57) ABSTRACT

An apparatus and method for gated transmission in a CDMA communication system. A mobile station in the CDMA communication system transmits a reverse pilot signal at a reverse gating rate different from a forward gating rate in a gated mode in a control hold state, and a base station transmits a forward pilot signal at the forward gating rate different from the forward gating rate in a gated mode.

18 Claims, 44 Drawing Sheets

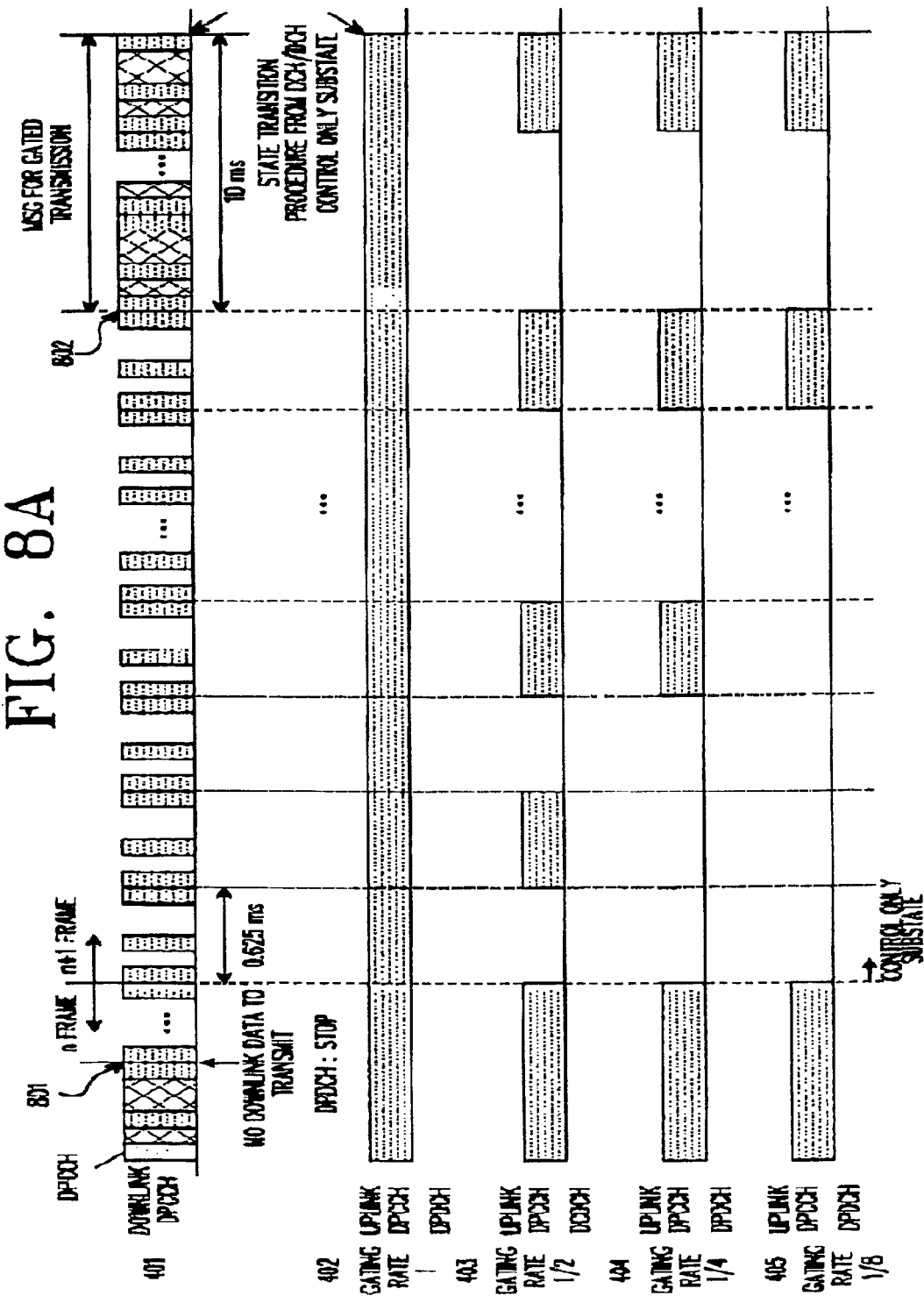

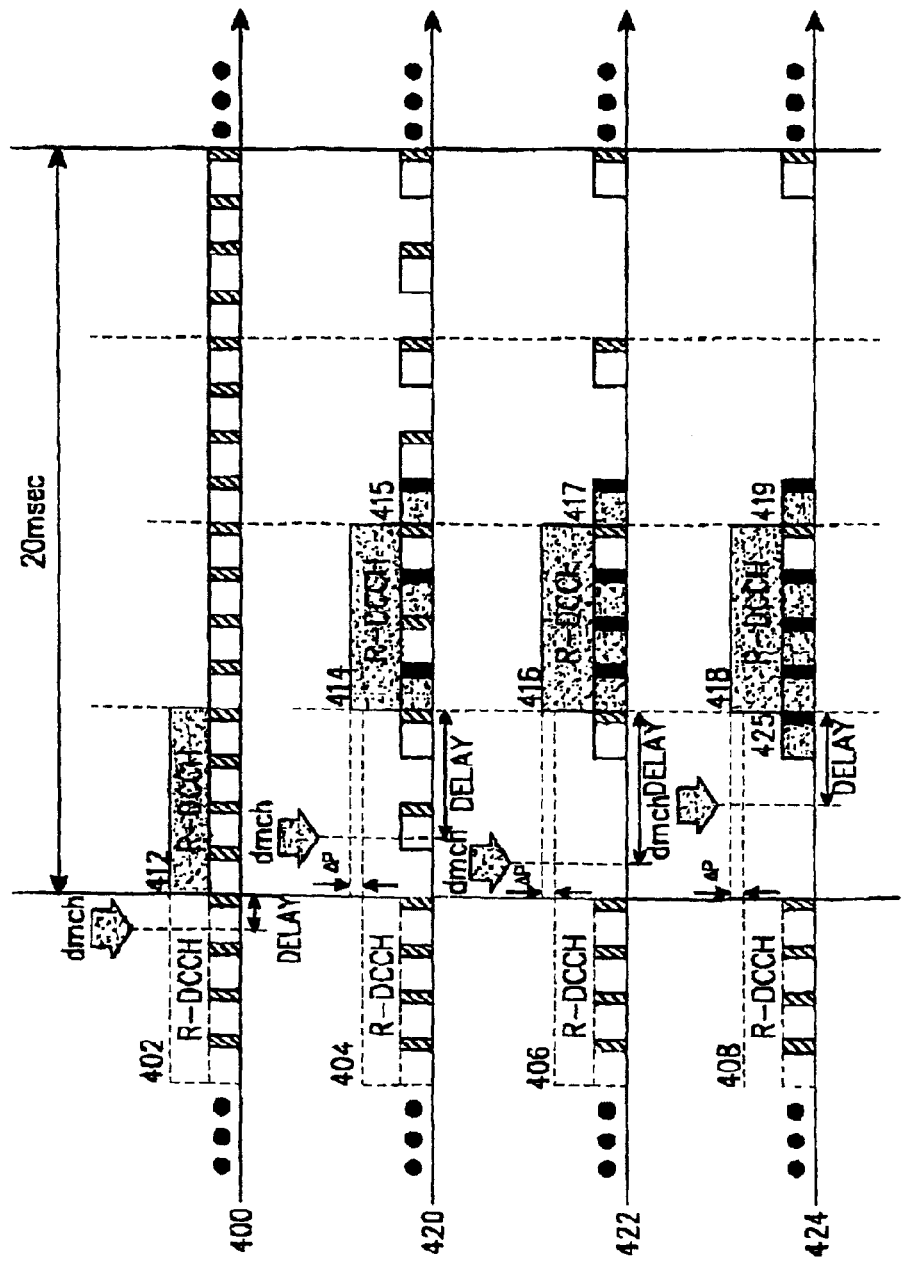

APPARATUS AND METHOD FOR GATED TRANSMISSION IN CDMA COMMUNICATION SYSTEM

PRIORITY

This application claims priority to an application entitled "Apparatus and Method for Gated Transmission in CDMA Communication System" filed in the Korean Industrial Property Office on May 31, 1999 and assigned Serial No. 99-19675 and on Jun. 11, 1999 and assigned Serial No. 99-21742, the contents of which are hereby incorporated by reference.

BACKGROUND OF THE INVENTION

1. Field of the Invention

The present invention relates generally to an apparatus and method for channel transmission in a CDMA (Code Division Multiple Access) mobile communication system, and in particular, to a channel transmitting apparatus and method in which a dedicated channel is gated if there is no transmission data for a predetermined time.

2. Description of the Related Art

A conventional CDMA mobile communication system primarily provides a voice service. However, the future CDMA mobile communication system will support the IMT-2000 standard, which can provide a high-speed data service as well as the voice service. More specifically, the IMT-2000 standard can provide a high-quality voice service, a moving picture service, an Internet search service, etc.

The CDMA mobile communication base station (BS) system operates synchronously or asynchronously. The synchronous CDMA mobile communication system is employed in U.S, while the asynchronous CDMA mobile communication system in the Europe. Thus, standardization is separately under way. As stated before, the U.S. and Europe are developing their separate standards due to the different systems. The European future mobile communication system is referred to as UMTS (Universal Mobile Telecommunication Systems) and the American future mobile communication system, CDMA-2000. The two systems use different channel structures and terms. The following description will be conducted in this context, and with the appreciation that the term "mobile communication system" used hereinafter covers both future mobile communication systems.

In the mobile communication system, a data communication service is typically characterized in that transmission of burst data alternates with long non-transmission periods. In the future mobile communication system, traffic data is transmitted on a dedicated traffic (data) channel or downlink shared channel for a data transmission duration, and the dedicated traffic channel is maintained for a predetermined time even when a base station and a mobile station have no traffic data to transmit. That is, because of limited radio resources, base station capacity and power consumption of a mobile station, the mobile communication system transmits the traffic data on the dedicated traffic channel or downlink shared channel for the data transmission duration and maintains the channel between the base station and the mobile station for a predetermined time even when there is no traffic data to transmit. This standardization minimizes a time delay due to sync reacquisition when there is traffic data to transmit.

Such a mobile communication system requires many states according to channel assignment circumstances and state information existence/non-existence in order to provide a packet data service as well as a voice service. For example, a state transition diagram for a cell connected state, a user data active substate and a control-only substate is well defined in 3GPP RAN TS S2 series S2.03.99.04.

FIG. 1A shows state transition in the cell connected state of the mobile communication system. Referring to FIG. 1A, the cell connected state includes a paging channel (PCH) state, a random access channel (RACH)/downlink shared channel (DSCH) state, an RACH/forward link access channel (FACH) state, and a dedicated channel (DCH)/DCH, DCH/DCH+DSCH, DCH/DSCH+DSCH Ctrl (Control Channel) state.

FIG. 1B shows a user data active substate and a control-only substate of the DCH/DCH, DCH/DCH+DSCH, DCH/DSCH+DSCH Ctrl state. It should be noted that the novel gated transmission device and method is applied when the data transmission channel, DCH or DSCH, is no data to transmit for a predetermined time, control-only substate.

The existing second generation CDMA mobile communication system, which mainly provides the voice service, releases a channel after completion of data transmission and connects the channel again when there is further data to transmit. However, in providing the packet data service as well as the voice service, the recommended future data transmission method has many delaying factors such as a reconnection delay, thus making it difficult to provide a high-quality service. Therefore, to provide the packet data service as well as the voice service, an improved data transmission method is required. For example, in many cases, data transmission is performed intermittently for Internet access and file downloading. Therefore, there occurs a non-transmission period between transmissions of consecutive data packets. For this period, the conventional data transmission method either releases or maintains the data channel. Releasing the data channel will require a long time in reconnecting the channel. Maintaining the data channel will cause a waste of the channel resources.

To solve such problems, a control channel (DCCH or DPCCH) is provided between the base station and the mobile station so that for the data transmission period, a control signal related to the traffic data channel signal is exchanged for power control of the data channel and for the non-transmission period, the traffic data channel is released and only the control channel is maintained. Such a state is called "control-only substate" or "control hold state".

Even though UMTS provide a dedicated control channel, the dedicated control channel is released simultaneously with the release of the dedicated data channel. The dedicated control channel must be reconnected each time a generation of data to transmit occurs.

First, the UMTS will be described herein below.

A downlink for transmitting signals from a base station to a mobile station or an uplink for transmitting signals from the mobile station to the base station includes the following physical channels. A description of the physical channels departing from the scope of the invention will be avoided for simplicity. The physical channels include a dedicated physical control channel (DPCCH) in which pilot symbols are included for sync acquisition and channel estimation, and a dedicated physical data channel (DPDCH) or downlink shared channel (DSCH) for exchanging traffic data with a specific mobile station. The downlink DPDCH or DSCH includes traffic data. The downlink DPCCH includes, at each slot or power control group (PCG), a transport format combination indicator (TFCI) bit, which is information about the format of transmission data, transmit power control (TPC) information bit, which is a power control command, and control information such as the pilot symbols for providing a reference phase so that a receiver (the base station or the mobile station) can compensate for differences in the phase. The DPDCH and the DPCCH are time multiplexed within one PCG.

As an example, the invention will be described with reference to a case where a me length is 10 msec and each frame includes 16 PCGs, i.e., each PCG has a length of 0.625 msec. As another example, the invention will be described with reference to another case where a frame length is 10 msec, but each frame includes 15 PCGs, i.e., each PCG has a length of 0.667 msec. It will be assumed herein that the PCG (0.625 msec or 0.667 msec) has the same time period as the slot (0.625 msec or 0.667 msec). The PCG (or slot) is comprised of pilot symbol, traffic data, transmission data-related information TFCI, and power control information TPC. The values stated above are given by way of example only.

FIG. 2A shows a slot structure including the downlink DPDCH and DPCCH in the UMTS. In FIG. 2A, although the DPDCH is divided into traffic data 1 and traffic data 2, there is a case where the traffic data 1 does not exist and only the traffic data 2 exists according to the types of the traffic data. Table 1 shows the symbols constituting the downlink DPDCH/DPCCH fields, wherein the number of TFCI, TPC and pilot bits in each slot can vary according to a data rate and a spreading factor.

TABLE 1

Downlink DPDCH/DPCCH Fields

| Channel Bit Rate (kbps) | Channel Symbol Rate (ksps) | SF | Bits/Frame DPDCH | Bits/Frame DPCCH | Bits/Frame TOT | Bits/Slot | DPDCH Bits/Slot $N_{data1}$ | DPDCH Bits/Slot $N_{data2}$ | DPCCH Bits/Slot $N_{TFCI}$ | DPCCH Bits/Slot $N_{TPC}$ | DPCCH Bits/Slot $N_{pilot}$ |
|---|---|---|---|---|---|---|---|---|---|---|---|
| 16 | 8 | 512 | 64 | 96 | 160 | 10 | 2 | 2 | 0 | 2 | 4 |
| 16 | 8 | 512 | 32 | 128 | 160 | 10 | 0 | 2 | 2 | 2 | 4 |
| 32 | 16 | 256 | 160 | 160 | 320 | 20 | 2 | 8 | 0 | 2 | 8 |
| 32 | 16 | 256 | 128 | 192 | 320 | 20 | 0 | 8 | 2 | 2 | 8 |
| 64 | 32 | 128 | 480 | 160 | 640 | 40 | 6 | 24 | 0 | 2 | 8 |
| 64 | 32 | 128 | 448 | 192 | 640 | 40 | 4 | 24 | 2 | 2 | 8 |
| 128 | 64 | 64 | 1120 | 160 | 1280 | 80 | 14 | 56 | 0 | 2 | 8 |
| 128 | 64 | 64 | 992 | 288 | 1280 | 80 | 6 | 56 | 8 | 2 | 8 |
| 256 | 128 | 32 | 2400 | 160 | 2560 | 160 | 30 | 120 | 0 | 2 | 8 |
| 256 | 128 | 32 | 2272 | 288 | 2560 | 160 | 22 | 120 | 8 | 2 | 8 |
| 512 | 256 | 16 | 4832 | 288 | 5120 | 320 | 62 | 240 | 0 | 2 | 16 |
| 512 | 256 | 16 | 4704 | 416 | 5120 | 320 | 54 | 240 | 8 | 2 | 16 |
| 1024 | 512 | 8 | 9952 | 288 | 10240 | 640 | 126 | 496 | 0 | 2 | 16 |
| 1024 | 512 | 8 | 9824 | 416 | 10240 | 640 | 118 | 496 | 8 | 2 | 16 |
| 2048 | 1024 | 4 | 20192 | 288 | 20480 | 1280 | 254 | 1008 | 0 | 2 | 16 |
| 2048 | 1024 | 4 | 20064 | 416 | 20480 | 1280 | 246 | 1008 | 8 | 2 | 16 |

Unlike the downlink DPDCH and DPCCH, uplink DPDCH and DPCCH for transmitting signals from the mobile station to the base station are separated by channel separation codes.

FIG. 2B shows a slot structure including the uplink DPDCH and DPCCH in the UMTS. In FIG. 2B, the number of TFCI, FBI (FeedBack Information), TPC and pilot bits can vary according to a service option, such as the types of the traffic data or transmit antenna diversity, or a handover circumstance. The FBI is information about two antennas that the mobile station requests, when the base station uses the transmit diversity antennas. Tables 2 and 3 below show the symbols constituting the uplink DPDCH and DPCCH fields, respectively, wherein SF denotes a spreading factor.

TABLE 2

Uplink DPDCH Fields

| Channel Bit Rate (kbps) | Channel Symbol Rate (ksps) | SF | Bits/Frame | Bits/Slot | $N_{data}$ |
|---|---|---|---|---|---|
| 16 | 16 | 256 | 160 | 10 | 10 |
| 32 | 32 | 128 | 320 | 20 | 20 |
| 64 | 64 | 64 | 640 | 40 | 40 |
| 128 | 128 | 32 | 1280 | 80 | 80 |
| 256 | 256 | 16 | 2560 | 160 | 160 |
| 512 | 512 | 8 | 5120 | 320 | 320 |
| 1024 | 1024 | 4 | 10240 | 640 | 640 |

TABLE 3

Uplink DPCCH Fields

| Channel Bit Rate (kbps) | Channel Symbol Rate (ksps) | SF | Bits/ Frame | Bits/ Slot | $N_{pilot}$ | $N_{TPC}$ | $N_{TFCI}$ | $N_{FBI}$ |
|---|---|---|---|---|---|---|---|---|
| 16 | 16 | 256 | 160 | 10 | 6 | 2 | 2 | 0 |
| 16 | 16 | 256 | 160 | 10 | 8 | 2 | 0 | 0 |
| 16 | 16 | 256 | 160 | 10 | 5 | 2 | 2 | 1 |
| 16 | 16 | 256 | 160 | 10 | 7 | 2 | 0 | 1 |
| 16 | 16 | 256 | 160 | 10 | 6 | 2 | 0 | 2 |
| 16 | 16 | 256 | 160 | 10 | 5 | 1 | 2 | 2 |

Tables 1 to 3 show an example where there exists one DPDCH which is a traffic channel. However, there may exist second, third and fourth DPDCHs according to the service types. Further, the downlink and uplink both may include several DPDCHs.

A hardware structure of the conventional UMTS mobile communication system (base station transmitter and mobile station transmitter) will be described below with reference to FIGS. 3A and 3B. Although the base station transmitter and mobile station transmitter will be described with reference to a case where there exist three DPDCHs, the number of DPDCHs is not limited.

FIG. 3A shows a structure of a base station transmitter in the conventional UMTS. Referring to FIG. 3A, multipliers 111, 121, 131 and 132 multiply a DPCCH signal and $DPDCH_1$, $DPDCH_2$ and $DPDCH_3$ signals, which have undergone channel encoding and interleaving, by gain coefficients $G_1$, $G_2$, $G_3$ and $G_4$, respectively. The gain coefficients $G_1$, $G_2$, $G_3$ and $G_4$ may have different values according to circumstances such as the service option and the handover. A multiplexer (MUX) 112 time-multiplexes the DPCCH signal and the $DPDCH_1$ signal into the slot structure of FIG. 2A. A first serial-to-parallel (S/P) converter 113 distributes the output of the multiplexer 112 to an I channel and a Q channel. Second and third S/P converters 133 and 134 S/P-convert the $DPDCH_2$ and $DPDCH_3$ signals and distribute them to the I channel and the Q channel, respectively. The S/P converted I and Q channel signals are multiplied by channelization codes $C_{ch1}$, $C_{ch2}$ and $C_{ch3}$ in multipliers 114, 122, 135, 136, 137 and 138, for spreading and channel separation. Orthogonal codes are used for the channelization codes. The I and Q channel signals multiplied by the channelization codes in the multipliers 114, 122, 135, 136, 137 and 138 are summed by first and second summers 115 and 123, respectively. That is, the I channel signals are summed by the first summer 115, and the Q channel signals are summed by the second summer 123. The output of the second summer 123 is phase shifted by 90° by a phase shifter 124. A summer 116 sums an output of the first summer 115 and an output of the phase shifter 124 to generate a complex signal I+jQ. A multiplier 117 scrambles, complex spreads, the complex signal with a PN sequence $C_{scramb}$ which is uniquely assigned to each base station, and a signal separator 118 separates the scrambled signal into a real part and an imaginary part and distributes them to the I channel and the Q channel. The I and Q channel outputs of the signal separator 118 are filtered by filters 119 and 125, respectively, to generate bandwidth-limited signals. The output signals of the filters 119 and 125 are multiplied by carriers $\cos\{2\pi f_c t\}$ and $\sin\{2\pi f_c t\}$ in multipliers 120 and 126, respectively, to frequency the signals to a radio frequency (RF) band. A summer 127 sums the frequency-shifted shifted I and Q channel signals.

FIG. 3B shows a structure of a mobile station transmitter in the conventional UMTS. Referring to FIG. 3B, multipliers 211, 221, 223 and 225 multiply a DPCCH signal and $DPDCH_1$, $DPDCH_2$ and $DPDCH_3$ signals, which have undergone channel encoding and interleaving, by channelization codes $C_{ch1}$, $C_{ch2}$, $C_{ch3}$ and $C_{ch4}$, respectively, for spreading and channel separation. Orthogonal codes are used for the channelization codes. The output signals of the multipliers 211, 221, 223 and 225 are multiplied by gain coefficients $G_1$, $G_2$, $G_3$ and $G_4$ in multipliers 212, 222, 224 and 226, respectively. The gain coefficients $G_1$, $G_2$, $G_3$ and $G_4$ may have different values. The outputs of the multipliers 212 and 222 are summed by a first summer 213 and output as an I channel signal, and the outputs of the multipliers 224 and 226 are summed by a second summer 227 and output as a Q channel signal. The Q channel signal output from the second summer 227 is phase shifted by 90° in a phase shifter 228. A summer 214 sums the output of the first summer 213 and the output of the phase shifter 228 to generate a complex signal I+jQ. A multiplier 215 scrambles, complex spreads, the complex signal with a PN sequence $C_{scramb}$ which is uniquely assigned to each base station, and a signal separator 229 separates the scrambled signal into a real part and an imaginary part and distributes them to the I channel and the Q channel. The I and Q channel outputs of the signal separator 229 are filtered by filters 216 and 230, respectively, to generate bandwidth-limited signals. The output signals of the filters 216 and 230 are multiplied by carriers $\cos\{2\pi f_c t\}$ and $\sin\{2\pi f_c t\}$ in multipliers 217 and 231, respectively, to frequency shift the signals to a radio frequency (RF) band. A summer 218 sums the frequency-shifted I and Q channel signals.

FIG. 5A illustrates transmission of a downlink DPCCH and an uplink DPCCH when transmission of an uplink DPDCH is discontinued, that is, traffic data to transmit does not exist for a predetermined time in the conventional UMTS. The state wherein the traffic data does not exist for a predetermined time is called "control-only substate".

FIG. 5B illustrates transmission of the downlink DPCCH and the uplink DPCCH when transmission of a downlink DPDCH is discontinued, that is, traffic data to transmit does not exist for a predetermined time in the conventional UMTS.

As shown in FIGS. 5A and 5B, the mobile station continuously transmits the uplink DPCCH in the absence of traffic data in order to avoid sync reacquisition from the base station. Meanwhile, if there exists no traffic data to transmit for a long time in the continuous uplink DPCCH transmission state, the base station and the mobile station transit to an RRC (Radio Resource Control) connection released state (not shown). Although the transmission of the uplink DPDCH is discontinued, the mobile station continuously transmits DPCCH signal on the uplink DPCCH. The resulting increase of uplink interference reduces the capacity of the uplink.

Despite the advantage of avoidance of sync reacquisition from the base station, the continuous uplink DPCCH transmission in a control-only substate in the conventional UMTS increases the uplink interference and reduces the uplink capacity. Furthermore, since downlink PCBs are continuously transmitted on the downlink DPCCH, downlink interference increases and downlink capacity decreases. Therefore, it is necessary to minimize, in case of release the channels, both the time required for sync reacquisition from the base station and, in case of continuous transmission of DPCCH signals, the increase of uplink and downlink interference.

The second future mobile communication system, the CDMA-2000 system, will now be described.

As stated above, a CDMA-2000 system provides a dedicated control channel (DCCH) to prevent channel consumption caused by maintaining a channel even when there is no traffic data to transmit. That is, a control signal related to a dedicated data channel (Fundamental or Supplemental Channel) is exchanged between a base station and a mobile station for a data transmission period. For a non-data transmission period, the dedicated data channel is released and only the dedicated control channel is maintained. Consequently, channel consumption is prevented and the dedicated data channel can be rapidly set up using the DCCH upon generation of transmission data. This state is called "control hold state" in CDMA-2000. The control hold state is divided into two substates: normal substate and slotted substate. In the normal substate, there is no data to transmit on a communication channel and only a control signal is communicated on a DCCH. In the slotted substate, a control signal is not even communicated due to no communication of packet data for a long time in the normal substate. In the transition from the slotted substate to the normal substate, resynchronization is required between the base station and the mobile station because no control signals have been exchanged between them. A CDMA-2000 system can be so configured that only the normal substate is set without the slotted substate.

The structure of a conventional CDMA-2000 mobile communication system for transmitting a signal in a control hold state will be described on the assumption that a frame is 20 ms in duration, one frame includes 16 PCGs (i.e., one PCG is 1.25 msec in duration), and a DCCH frame is 5 ms or 20 ms in duration.

FIG. 3C is a block diagram of a base station transmitter in a conventional CDMA-2000 mobile communication system. A forward link on which a base station transmits signals to a mobile station is comprised of the following channels: a pilot channel, which provides a basis for sync acquisition and channel estimation, an F-CCCH (Forward Common Control Channel) for transmitting a control message to all mobile stations within the cell of the base station, an F-DCCH (Forward Dedicated Control Channel) for transmitting a control message to a particular mobile station, and an F-DTCH (Forward Dedicated Traffic Channel) for transmitting traffic data to a particular mobile station. The F-DCCH includes a sharable F-DCCH for transmitting a control message to the particular mobile station in time division. The F-DTCH includes an F-FCH (Forward Fundamental Channel) and an F-SCH (Forward Supplemental Channel).

In FIG. 3C, demultiplexers (DEMUXes) or SPCs (Serial-to-Parallel Converters) 120, 122, 124, and 126 separate channel encoded and interleaved data into I channel and Q channel data. Mixers 110 and 130 to 137 multiply the separated data by corresponding orthogonal codes (e.g., Walsh codes W) for spreading and channelization. To express the outputs of the mixers 110 and 130 to 137 as relative sizes to that of a forward pilot channel, they pass through amplifiers 140 to 147. Summers 150 and 152 sum the outputs of the amplifiers 140 and 141 to 147 by I channels and Q channels. A complex spreader 160 scrambles the outputs of the summers 150 and 152 by a PN sequence assigned to the base station. The complex spread signal from the complex spreader 160 is filtered by filters 170 and 171 to generate I and Q channel signals in limited bandwidths. Amplifiers 172 and 173 amplify the outputs of the filters 170 and 171 to a signal strength suitable for transmission. Mixers 174 and 175 transits the outputs of the amplifiers 172 and 173 to an RF band by multiplying the outputs of the amplifiers 172 and 173 by carriers. A summer 180 sums the I channel and Q channel signals.

FIG. 3D is a block diagram of a mobile station transmitter in the conventional CDMA-2000 mobile communication system. A reverse link is comprised of a pilot/PCB channel on which a pilot signal for sync acquisition and channel estimation and forward PCBs for forward power control are multiplexed, an R-DCCH (Reverse Dedicated Control Channel) for transmitting a control message to the serving base station of the mobile station, and an R-DTCH (Reverse Dedicated Traffic Channel) for transmitting traffic data to the base station. The R-DTCH includes an R-FCH (Reverse Fundamental Channel) and an R-SCH (Reverse Supplemental Channel).

In FIG. 3D, a multiplexer (MUX) 210 multiplexes a reverse pilot channel and forward PCBs. Mixers 220, 230, 240, 250 and 260 multiply the reverse channel which was channel-encoded and interleaved by orthogonal codes mutually orthogonal among channels, for channelization and spreading. To express the outputs of the mixers 220, 240, 250 and 260 in relative sizes to that of the output of mixer 230 for the reverse pilot/PCB, they pass through amplifiers 222, 242, 252, and 262. Summers 224 and 254 sum the outputs of the multiplier 230 and the amplifiers 222, 242, 252, and 262 by I channels and Q channels. The complex spreader 160 scrambles the outputs of the summers 224 and 254 by a PN sequence assigned to the mobile station. The complex spread signal from the complex spreader 160 is filtered by the filters 170 and 171 to generate I and Q channel signals in limited bandwidths. The amplifiers 172 and 173 amplify the outputs of the filters 170 and 171 to a signal strength suitable for transmission. The mixers 174 and 175 transform the outputs of the amplifiers 172 and 173 to an RF band by multiplying the outputs of the amplifiers 172 and 173 by carriers. The summer 180 sums the I channel and Q channel signals.

The structure of signals communicated between a base station and a mobile station in the conventional CDMA-2000 system will now be described herein below.

Reference numeral 300 in FIG. 5C indicates a reverse pilot/PCB channel signal when an R-DCCH signal is continuous transmitted in a conventional control hold state/normal substate. A mobile station transmits the reverse pilot/PCB channel continuously in the control hold state/normal substate to avoid sync reacquisition from a base station. The resulting increase in reverse link interference reduces the capacity of the reverse link.

Reference numeral 400 in FIG. 13A indicates the generation position of an R-DCCH upon generation of a reverse dedicated MAC (Medium Access Control) channel (dmch) data in the conventional control hold state/normal substate. The R-DCCH can be transmitted within 5 msec at longest after the dmch is generated. Here, the R-DCCH can be disposed at a position being a multiple of 5 msec position only. Due to the limited positions, the base station determines whether the R-DCCH exists or not at four positions in one frame. A 2.5 msec delay on the average occurs until the R-DCCH is transmitted after generation of the dmch.

As described above, the continuous transmission of a reverse pilot/PCB channel in a control hold state/normal substate in the conventional CDMA-2000 system is advantageous in that it is possible to avoid sync reacquisition from a base station. However, the resulting increase of reverse link interference reduces the capacity of the reverse link. Further, continuous transmission of reverse PCBs on a forward link also increases forward link interference and reduces forward link capacity. Accordingly, it is necessary, in case of no transmission of PCBs, to minimize time required for sync reacquisition from the base station, in case of continuous transmission, to minimize the reverse link interference increased by the transmission of the reverse pilot/PCB channel, and the forward link interference increased by the transmission of the reverse PCBs on the forward link.

SUMMARY OF THE INVENTION

It is, therefore, a first object of the present invention to provide a gated transmission apparatus and method for enabling rapid reconnection while no traffic data to transmit exists in a mobile communication system.

It is a second object of the present invention to provide a gated transmission apparatus and method for minimizing the increase of inter-link interference while no traffic data to transmit exists in a mobile communication system.

In CDMA-2000 it is a third object of the present invention to provide a gated transmission apparatus and method for gating a forward link dedicated control channel and a reverse link dedicated control channel at different gating rates while no traffic data to transmit exists in a mobile communication system in order to increase a power control rate and decrease a power control delay.

In UMTS it is a fourth object of the present invention to provide a gated transmission apparatus and method for gating a downlink dedicated control channel and an uplink dedicated control channel at different gating rates while no traffic data to transmit exists in a mobile communication system in order to increase a power control rate and decrease a power control delay.

In CDMA-2000 it is a fifth object of the present invention to provide a gated transmission apparatus and method in which a network designates slot positions on a forward link and a reverse link in a mobile communication system in order to minimize a power control delay or balance power control delays on bi-directional links.

In UMTS it is a sixth object of the present invention to provide a gated transmission apparatus and method in which a network designates slot positions on a downlink and an uplink in a mobile communication system in order to minimize a power control delay or balance power control delays on bi-directional links.

Briefly, these and other objects can be achieved by providing an apparatus and method for gated transmission in a CDMA communication system. A mobile station in the CDMA communication system transmits a reverse pilot signal at a reverse gating rate different from a forward gating rate in a gated mode in a control hold state, and a base station transmits a forward pilot signal at the forward gating rate different from the forward gating rate in a gated mode.

BRIEF DESCRIPTION OF THE DRAWINGS

The above and other objects, features and advantages of the present invention will become more apparent from the following detailed description when taken in conjunction with the accompanying drawings in which:

FIG. 8A is a diagram illustrating a method for transmitting downlink and uplink signals when transmission of a downlink DPDCH is discontinued in the UMTS according to the embodiment of the present invention;

FIG. 13A is a diagram illustrating a method for transmitting a reverse pilot/PCB channel when an R-DCCH is activated in a control hold state in a conventional CDMA-2000 system and a CDMA-2000 system according to an embodiment of the present invention (gated transmission for the pilot/PCB channel at predetermined time intervals);

DETAILED DESCRIPTION OF THE PREFERRED EMBODIMENTS

Figure 1A:
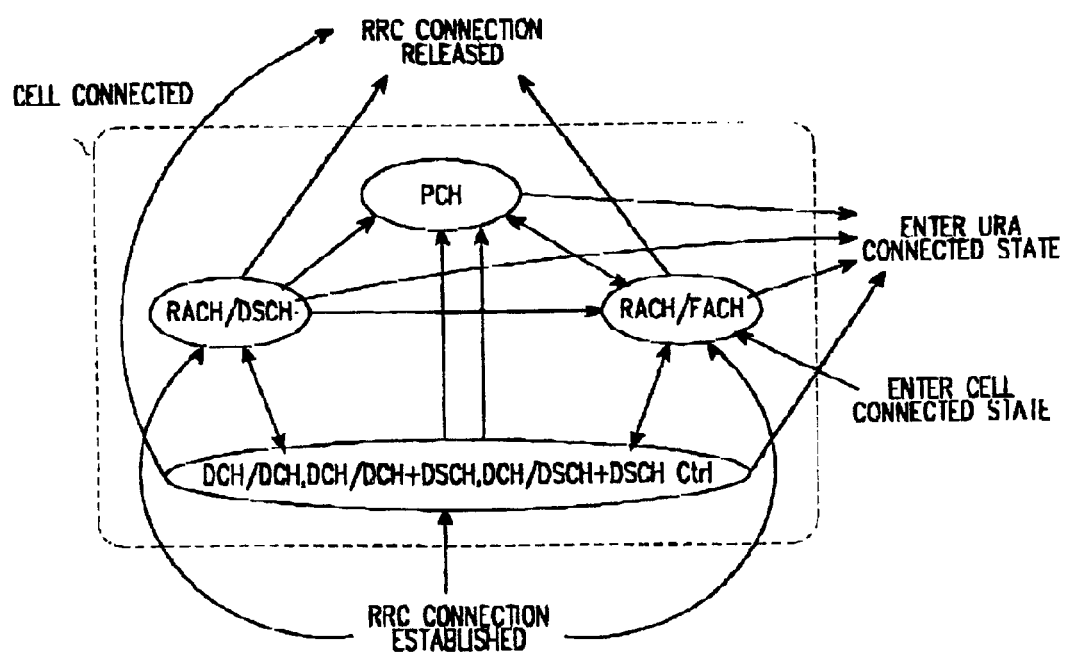
FIG. 1A is a state transition diagram for a packet data service.
Figure 1B:
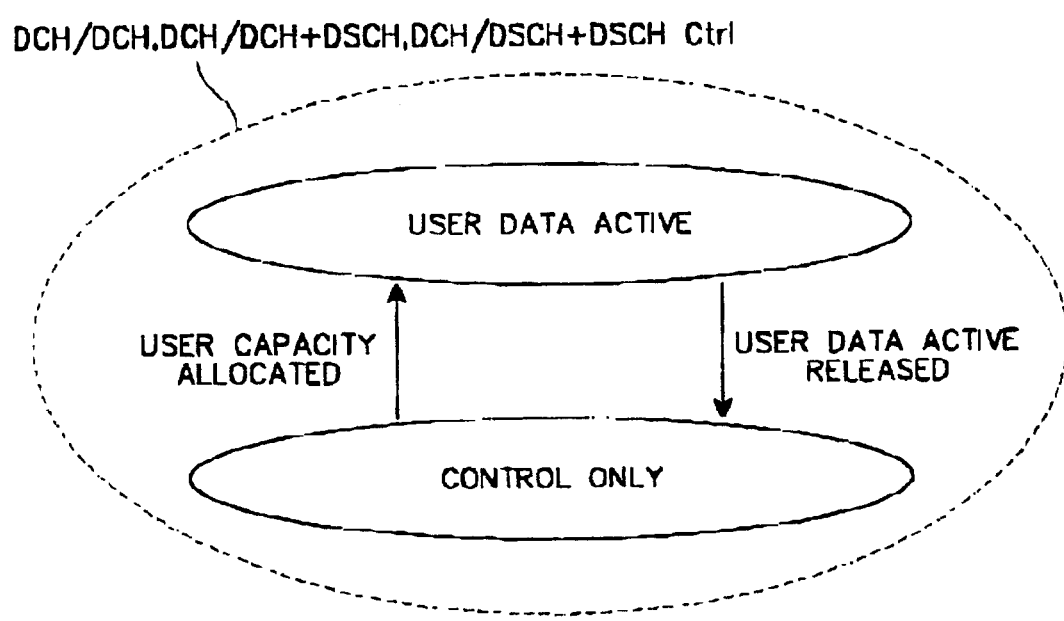
FIG. 1B is a state transition diagram between a user data active substate and a control-only substate of the DCH/DCH state.
Figure 2A:
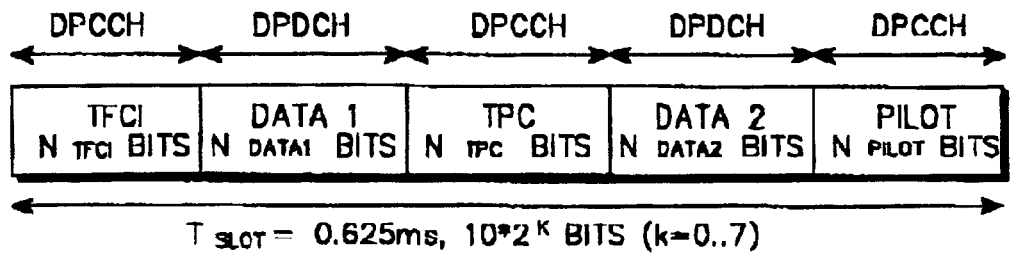
FIG. 2A is a diagram illustrating a slot structure of downlink DPDCH and DPCCH in a UMTS.
Figure 2B:
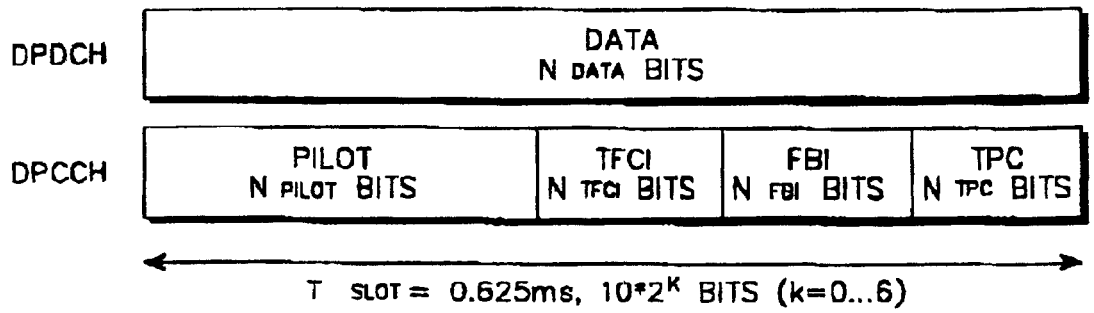
FIG. 2B is a diagram illustrating a slot structure of uplink DPDCH and DPCCH in the UMTS.

Preferred embodiments of the present invention will be described herein below with reference to the accompanying drawings. In the following description, well-known functions or constructions are not described in detail since they would obscure the invention in unnecessary detail.

The following description is conducted on a CDMA mobile communication system, separately in the context of UMTS and CDMA-2000. Like reference numerals denote the same components in the drawings.

1. Application to UMTS

Embodiments of the present invention which are applied to the UMTS will first be described referring to FIGS. 4A & 4B, and FIGS. 6A to 12B.

The term "normal transmission" as used herein refers to continuously transmitting control information included in the downlink or uplink DPCCH, i.e., TFCI, TPC and pilot symbols. Further, the term "gated transmission" refers to transmitting the control information included in the downlink DPCCH, i.e., TFCI, TPC and pilot symbols, only at a specific PCG (or slot) according to a predetermined time pattern when there is no data to transmit for a predetermined time. The term "state transition" as used herein refer to gating rate transition of normal transmission to gated transmission or gated transmission to normal transmission. In addition, the term "gated transmission" refers to transmitting the control information included in the uplink DPCCH (i.e., TFCI, TPC and pilot symbols) only at a specific PCG (or one slot) or only at the pilot symbol of a predetermined PCG and a TFCI and TPC of the next PCG according to a predetermined time pattern. The information, transmission of which is discontinued in the downlink DPCCH during gated transmission, may include all of the TFCI, TPC and pilot symbols in an nth PCG (or one slot), or may include the pilot symbols in an nth PCG (or one slot), and TFCI and TPC in an (n+1)th PCG. The information, transmission of which is discontinued in the uplink DPCCH during gated transmission, includes all of TFCI, TPC, FBI and pilot symbols in a specific PCG (or one slot). Herein, "a gated transmission unit is identical to a slot unit" means that TFCI, TPC and pilot symbols within one PCG are set as a gated transmission unit. Further, "a gated transmission unit is not identical to a slot unit" means that an nth pilot symbol and (n+1)th TFCI and TPC are set as a gated transmission unit.

In addition, since performance of a frame beginning part is very important, the invention locates the TPC for controlling power of the first slot of the next frame at the last slot of one frame. That is, TPC bits for the downlink DPCCH and the uplink DPCCH are located at the last slot of the nth frame, and power of the first slot of the (n+1)th frame is controlled using the TPC bits existing at the last slot of the nth frame.

Further, a power control rate can be maintained even when transmission data is generated during gated transmission of the control information according to the present invention. That is, gating of power control information (TPC) is maintained even when transmission data is generated during gated transmission of the control information. In addition, a gating pattern (or gated transmission pattern) for the downlink DPCCH and a gating pattern for the uplink DPCCH are determined to have an offset. That is, the control information for the downlink DPCCH and the control information for the uplink DPCCH are transmitted at different time points.

A hardware structure according to an embodiment of the invention will be described below.

Figure 3A:
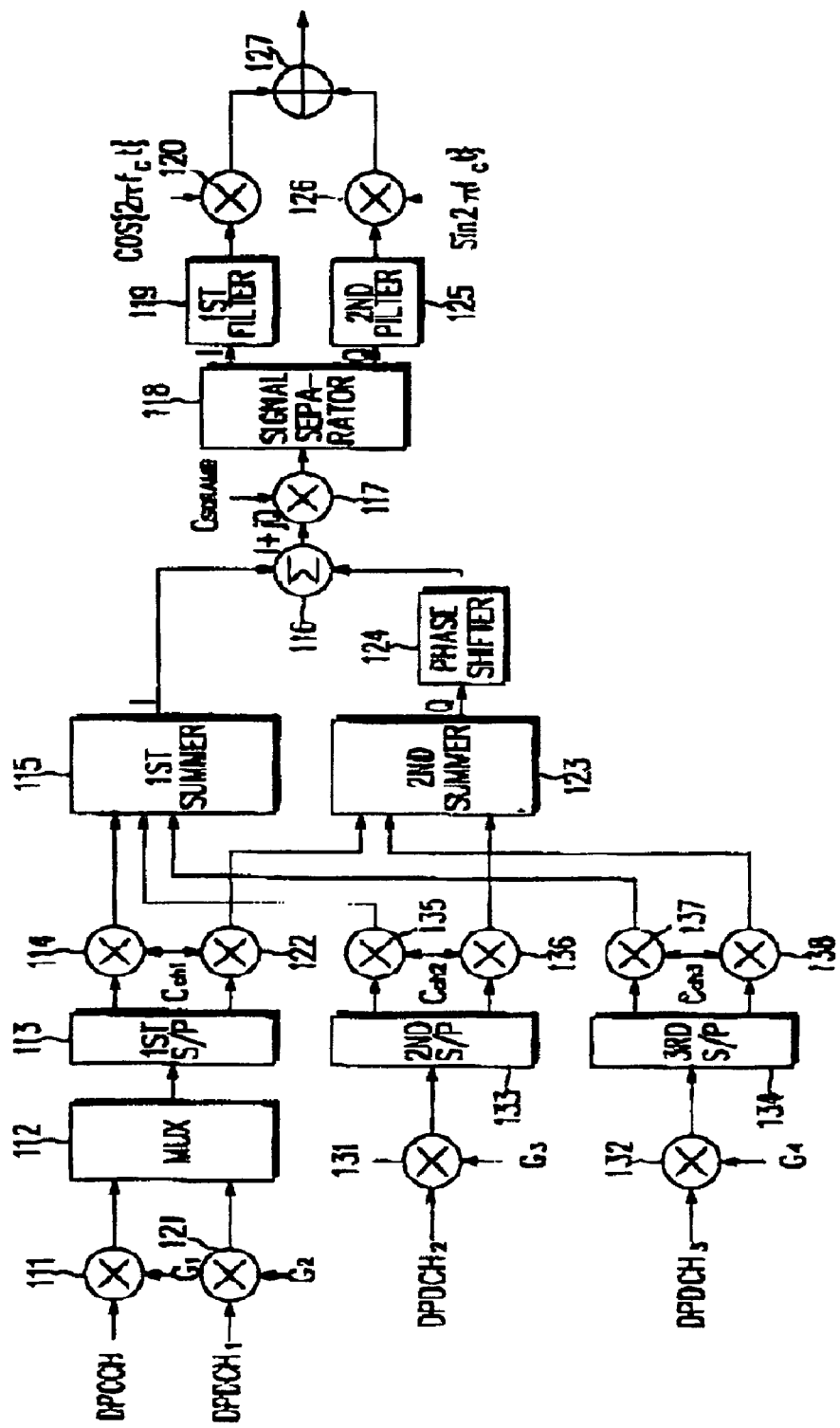
FIG. 3A is a diagram illustrating a structure of a base station transmitter in a conventional UMTS.
Figure 4A:
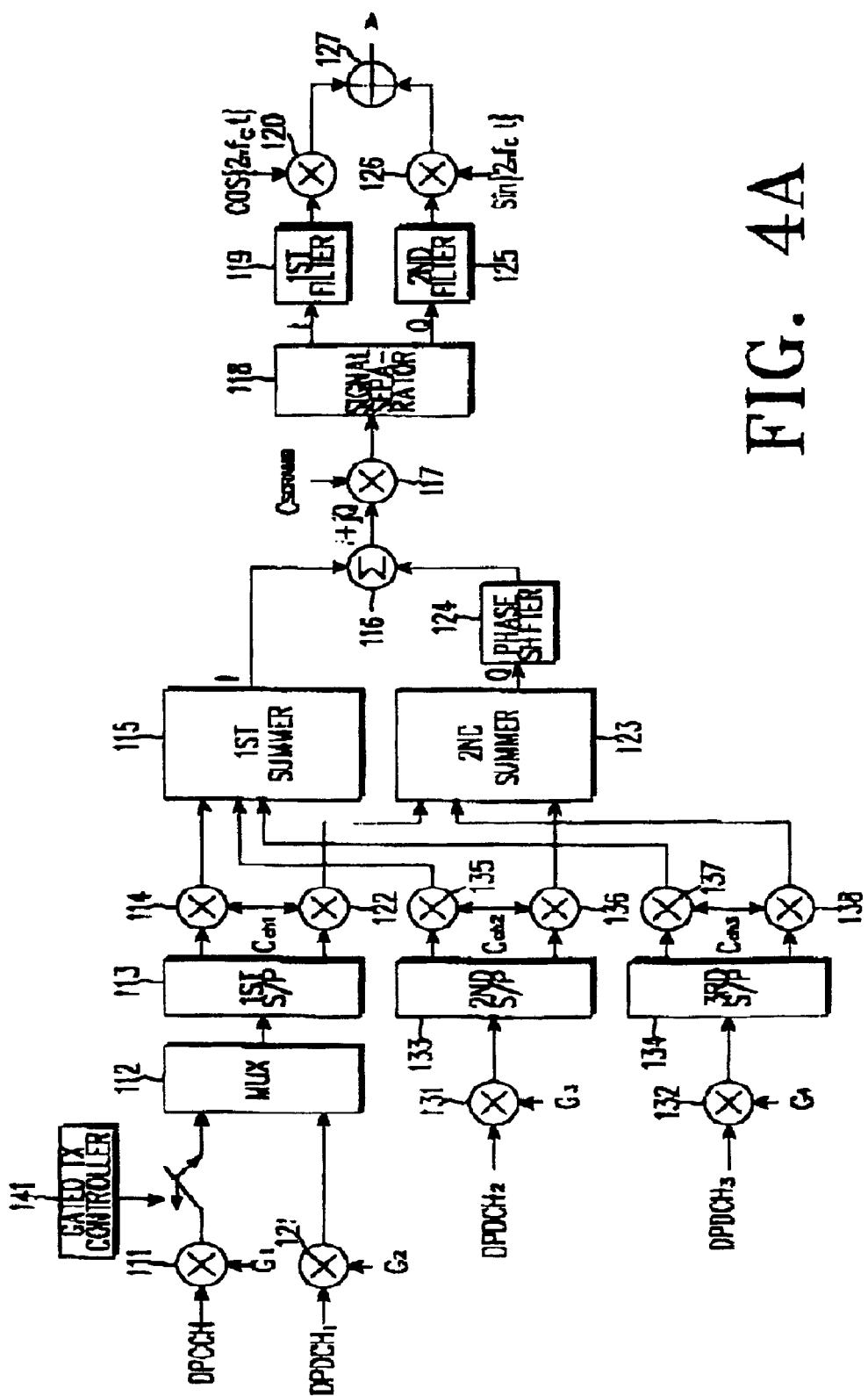
FIG. 4A is a diagram illustrating a structure of a base station transmitter in a UMTS according to an embodiment of the present invention.

FIG. 4A shows a structure of a base station transmitter in a UMTS according to an embodiment of the present invention. The base station transmitter is different from the conventional one of FIG. 3A in that with regard to the downlink DPCCH, the output of the multiplier 111 is gated by a gated transmission controller 141. That is, the gated transmission controller 141 performs gated transmission on the TFCI and TPC bits for the downlink DPCCH at a PCG (or time slot) scheduled with the mobile station when there is no data to transmit for a predetermined time, in the control-only substate where the traffic data is not transmitted over the downlink and uplink DPDCHs. In addition, the gated transmission controller 141 performs gated transmission on one PCG (or one entire slot) including the pilot symbols, TFCI and TPC bits for the downlink DPCCH at a PCG (or time slot) scheduled with the mobile station in the control-only substate where the traffic data is not transmitted over the downlink and uplink DPDCHs.

Although the downlink gated transmission pattern is identical to the uplink gated transmission pattern, an offset may exist between them for efficient power control. The offset is given as a system parameter.

The gated transmission controller 141 can perform gated transmission either when the gated transmission unit is identical to the slot unit or when the gated transmission unit is not identical to the slot unit. When the gated transmission unit is not identical to the slot unit, the gated transmission controller 141 separately gates the TFCI, TPC and pilot symbols. That is, nth pilot symbol, (n+1)th TFCI and TPC are set as a gated transmission unit.

In addition, the gated transmission controller 141 locates the TPC bits for power controlling the first slot of the next frame at the last slot of one frame to secure performance of the frame beginning part. That is, the TPC bits for the downlink DPCCH and the uplink DPCCH are located at the last slot of the nth frame, and power of the first slot of the (n+1)th frame is controlled using the TPC bits existing at the last slot of the nth frame.

Figure 3B:
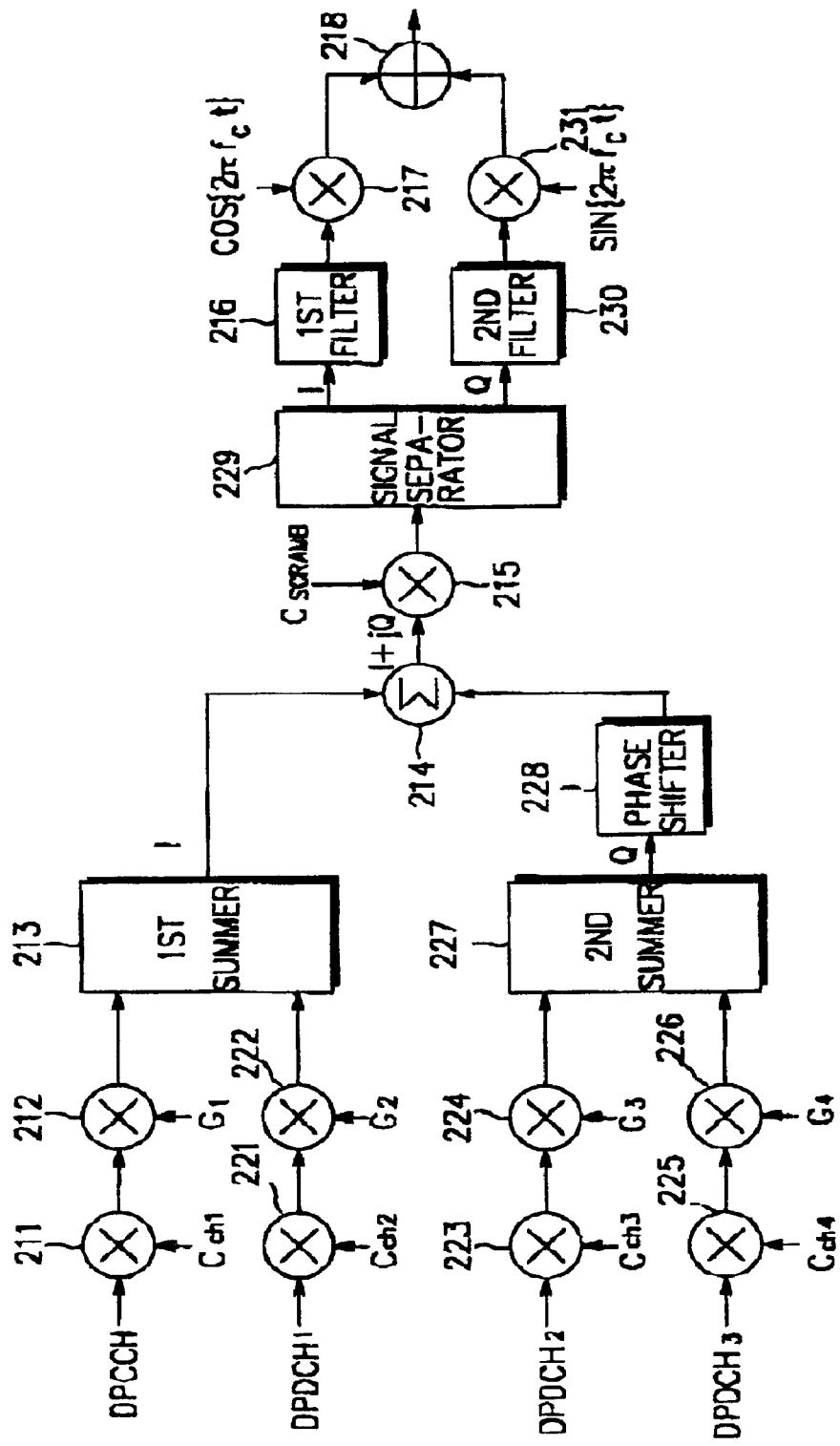
FIG. 3B is a diagram illustrating a structure of a mobile station transmitter in the conventional UMTS.
Figure 4B:
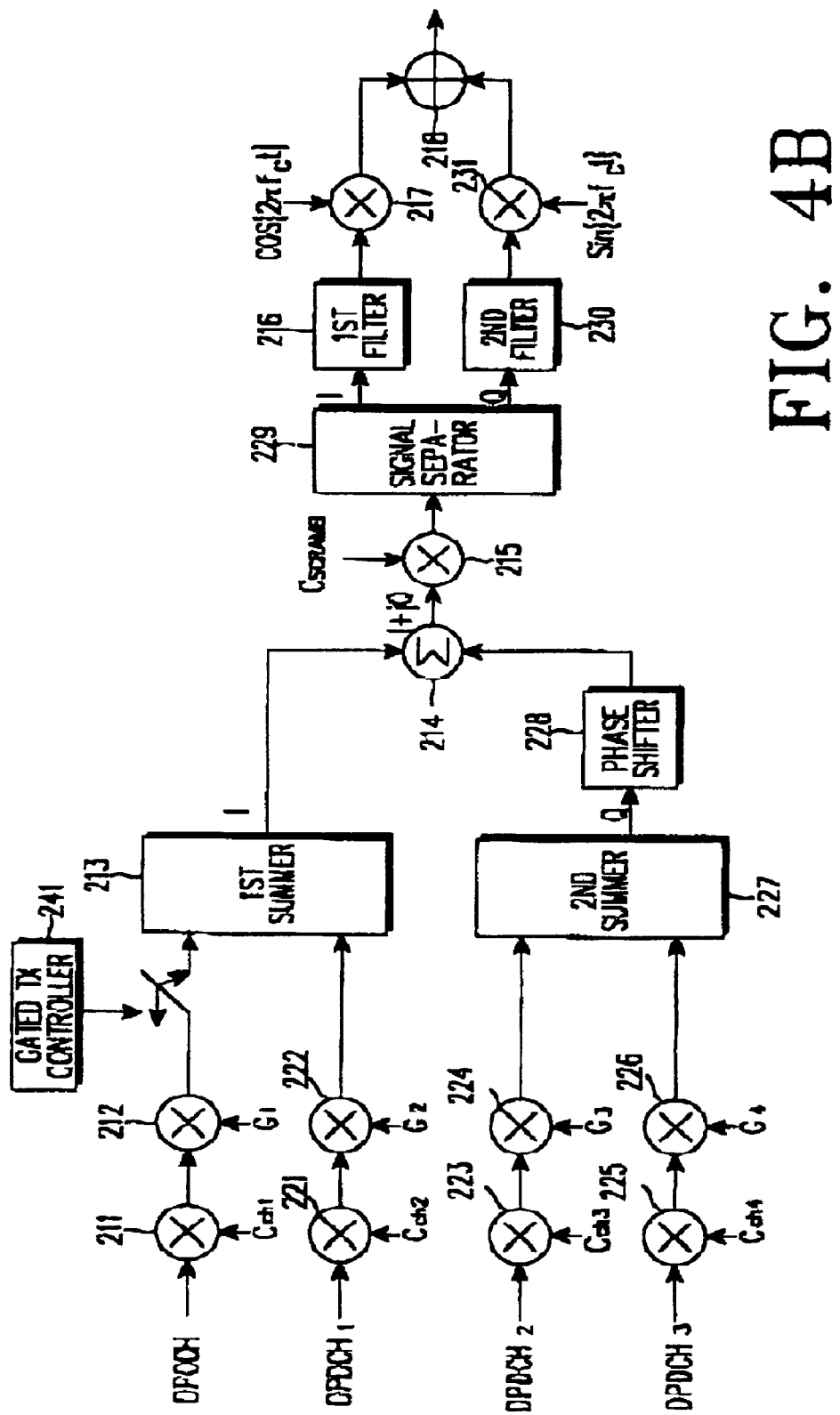
FIG. 4B is a diagram illustrating a structure of a mobile station transmitter in the UMTS according to the embodiment of the present invention.

FIG. 4B shows a structure of a mobile station transmitter in the UMTS according to the embodiment of the present invention. The mobile station transmitter is different from the conventional one of FIG. 3B in that a gated transmission controller 241 is provided to gate transmission of the uplink DPCCH. That is, the gated transmission controller 241 performs gated transmission on one PCG (or one entire slot) including the pilot symbols, TFCI, FBI and TPC bits for the uplink DPCCH at a PCG (or time slot) scheduled with the mobile station in the control-only substate where the traffic data is not transmitted over the downlink and uplink DPDCHs. For sync detection, it is necessary to transmit the pilot symbols and TPC bits over the uplink DPCCH, and there is no alternative way to transmit the TPC, FBI and pilot symbols over the other uplink channels at the duration where transmission of the above channel is discontinued.

Now, a description will be made of a transmission signal structure of the base station and the mobile station according to an embodiment of the present invention.

Figure 6A:
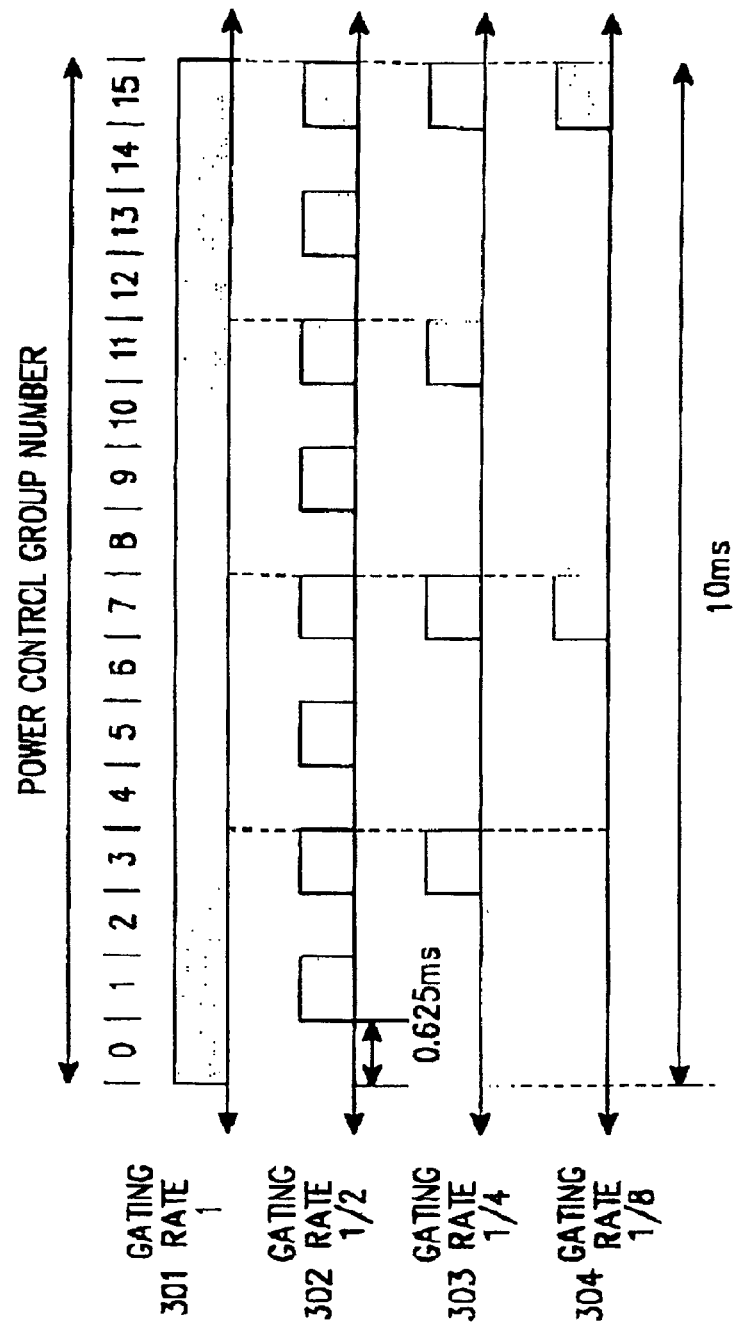
FIG. 6A is a diagram illustrating a method for transmitting a signal according to a regular or gated transmission pattern for an uplink DPCCH in a control-only substate of the UMTS according to the embodiment of the present invention.

FIG. 6A shows a method for transmitting a signal according to a regular or gated transmission pattern for the uplink DPCCH in a control-only substate in the UMTS according to the embodiment of the present invention. In FIG. 6A, reference numerals 301, 302, 303 and 304 show different gating rates according to a ratio of a duty cycle (hereinafter, referred to as DC). Reference numeral 301 shows a conventional method for transmitting the uplink DPCCH without gating (DC=1), and reference numeral 302 shows a method for regularly transmitting every other PCG (or time slot), when DC=1/2 (only 1/2 of the whole PCGs in one frame are transmitted). Reference numeral 303 shows a method for regularly transmitting every fourth PCGs (3rd, 7th, 11th and 15th PCGs), when DC=1/4 (only 1/4 of the whole PCGs in one frame are transmitted). Reference numeral 304 shows a method for regularly transmitting every eighth PCGs (7th and 15th PCGs), when DC=1/8 (only 1/8 of the whole PCGs in one frame are transmitted). In the embodiment of FIG. 6A, when DC=1/2 and 1/4, although the gated transmission controller 241 of the mobile station regularly gates the PCGs of the uplink DPCCH, it is also possible to gate arbitrary PCGs out of the whole PCGs according to the corresponding DC. That is, when DC=1/2, it is also possible to continuously gate arbitrary adjacent PCGs according to an irregular pattern, rather than to regularly transmit every other PCG. Further, when DC=1/2, it is also possible to continuously transmit half of the whole PCGs at the second half (8th to 15th PCGs) of the frame. When DC=1/4, it is also possible to continuously transmit 1/4 of the whole PCGs beginning at a 3/4 point of the frame (i.e., 12th to 15th PCGs). When DC=1/8, it is also possible to continuously transmit 1/8 of the whole PCGs beginning at a 1/8 point of the frame (i.e., 14th to 15th PCGS).

The above state transition method can be divided into several methods as stated below, and is determined according to system setup. In one method, a direct state transition occurs from DC=1/1 to DC=1/2, from DC=1/1 to DC=1/4, or from DC=1/1 to DC=1/8 according to a set timer value or a transition command message from the base station. In another method, a sequential state transition occurs from DC=1/1 to DC=1/2, from DC=1/2 to DC=1/4, or from DC=1/4 to 1/8. Selection of the DC value can be determined in consideration of the capacity of the corresponding mobile station or the quality of the channel environment.

Figure 6B:
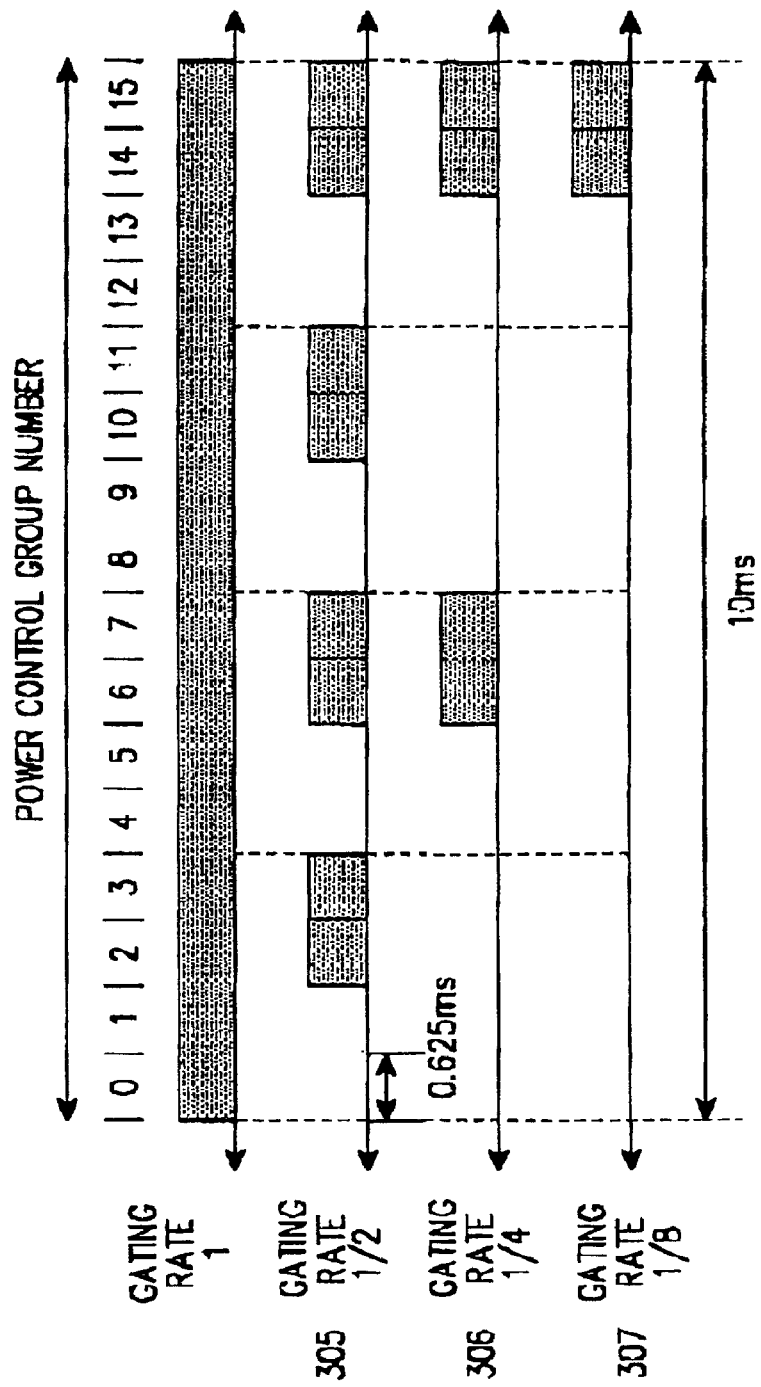
FIG. 6B is a diagram illustrating another method for transmitting a signal according to a regular or gated transmission pattern for an uplink DPCCH in a control-only substate of the UMTS according to the embodiment of the present invention.

FIG. 6B shows another method for transmitting a signal according to a regular or gated transmission pattern for the uplink DPCCH in the control-only substate in the UMTS according to the embodiment of the present invention. In FIG. 6B, reference numerals 305, 306 and 307 show different gating rates according to a ratio of a duty cycle DC. Reference numeral 305 shows a method for transmitting two consecutive PCGs at regular locations ($2^{nd}$–$3^{rd}$, $6^{th}$–$7^{th}$, $10^{th}$–$11^{th}$ and $14^{th}$–$15^{th}$ PCGs), when DC=1/2 (only 1/2 of the whole PCGs in one frame are transmitted). Reference numeral 306 shows a method for transmitting two consecutive PCGs at regular locations ($6^{th}$–$7^{th}$ and $14^{th}$–$15^{th}$ PCGs), when DC=1/4 (only 1/4 of the whole PCGs in one frame are transmitted). Reference numeral 307 shows a method for transmitting two consecutive PCGs at regular locations ($14^{th}$–$15^{th}$ PCGs), when DC=1/8 (only 1/8 of the whole PCGs in one frame are transmitted). In the embodiment of FIG. 6B, when DC=1/2 and 1/4, although the gated transmission controller 241 of the mobile station regularly gates the PCGs of the uplink DPCCH, it is also possible to gate arbitrary PCGs out of the whole PCGs according to the corresponding DC. That is, when DC=1/2, it is also possible to continuously gate 4 consecutive PCGs (e.g., $2^{nd}$–$5^{th}$ PCGs) according to an irregular pattern, rather than to regularly transmit every other 2 consecutive PCGs.

The above state transition method can be divided into several methods as stated below, and is determined according to system setup. In one method, a direct state transition occurs from DC=1/1 to DC=1/2, from DC=1/1 to DC=1/4, or from DC=1/1 to DC=1/8 according to a set timer value or a transition command message from the base station. In another method, a sequential state transition occurs from DC=1/1 to DC=1/2, from DC=1/2 to DC=1/4, or from DC=1/4 to 1/8. Selection of the DC value can be determined in consideration of the capacity of the corresponding mobile station or the quality of the channel environment.

Figure 7A:
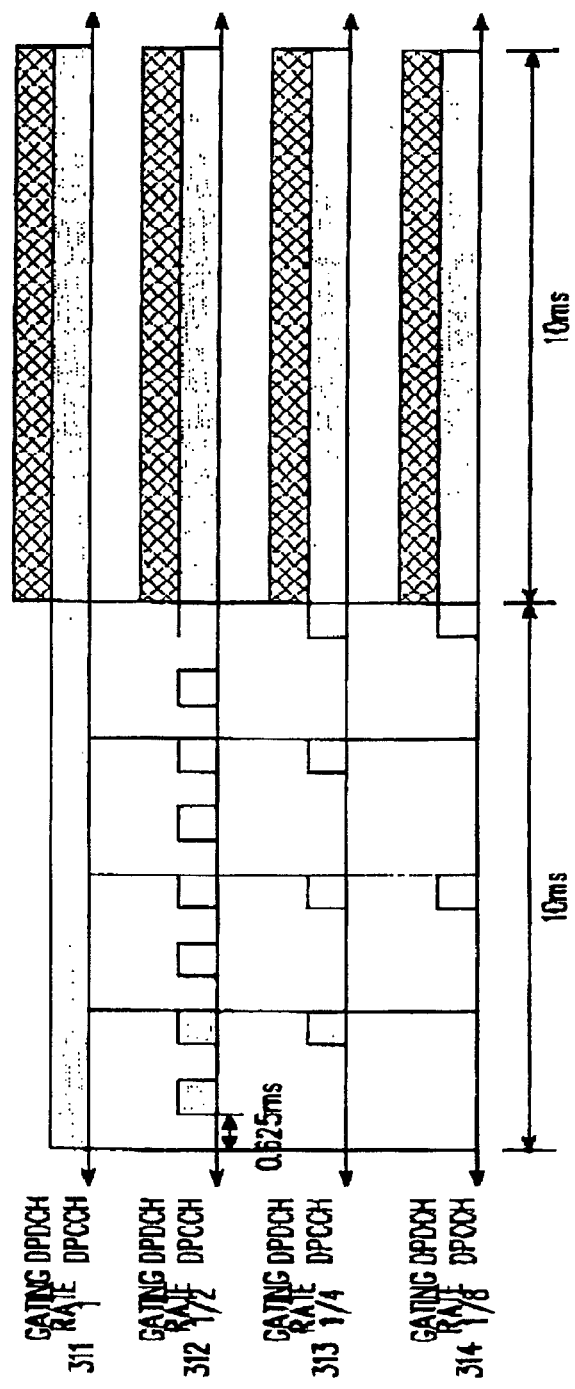
FIG. 7A is a diagram illustrating a method for transmitting a signal when an uplink DPDCH message is generated while an uplink DPCCH is intermittently transmitted in a gated mode of the UMTS according to the embodiment of the present invention.
Figure 7B:
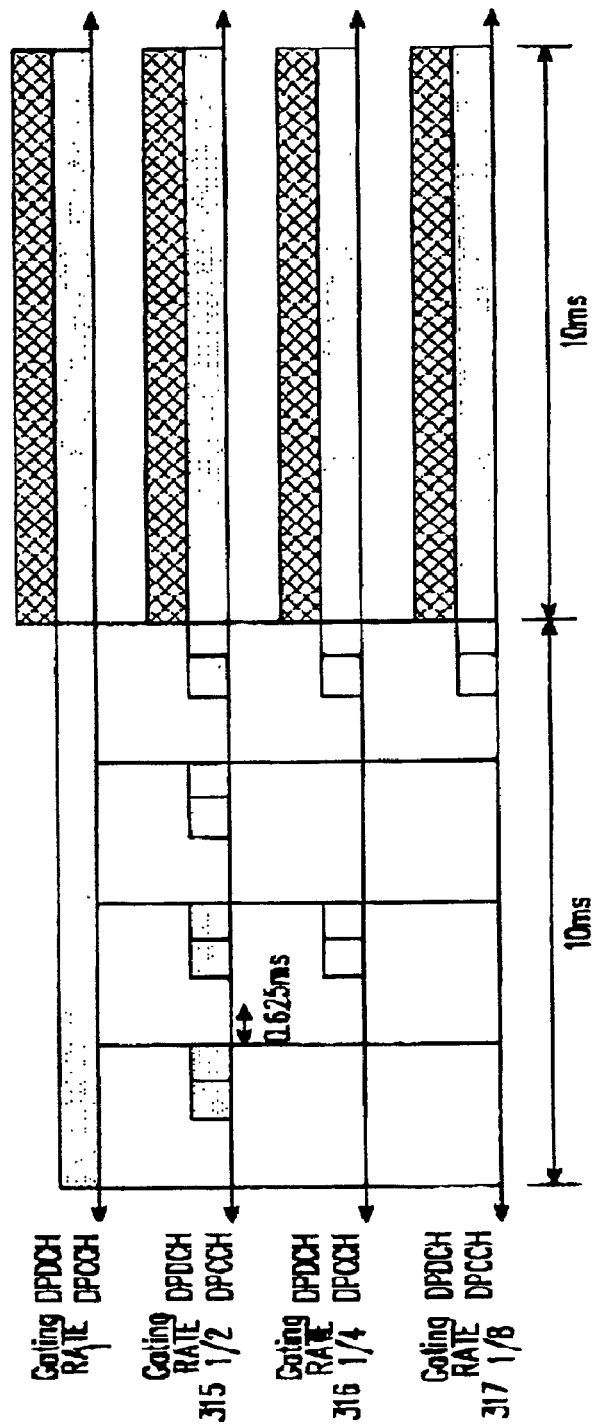
FIG. 7B is a diagram illustrating another method for transmitting a signal when an uplink DPDCH message is generated while an uplink DPCCH is intermittently transmitted in a gated mode of the UMTS according to the embodiment of the present invention.

FIGS. 7A and 7B show the uplink DPCCH for the case where a transition message is transmitted over the uplink DPDCH when a dedicated MAC logical channel is generated in the control-only substate of FIGS. 6A and 6B. Reference numeral 311 of FIG. 7A shows a case where a uplink DPDCH message is generated while the uplink DPCCH does not undergo gated transmission (i.e., while the uplink DPCCH is continuously transmitted (DC=1/1)). Reference numeral 312 shows a case where the uplink DPDCH message is generated while the uplink DPCCH undergoes DC=1/2 gated transmission. Reference numeral 313 shows a case where the uplink DPDCH message is generated while the uplink DPCCH undergoes DC=1/4 gated transmission. Reference numeral 314 shows a case where the uplink DPDCH message is generated while the uplink DPCCH undergoes DC=1/8 gated transmission. The PCGs, which are not transmitted according to the gated transmission patterns shown by the reference numerals 312, 313 and 314, undergo normal transmission when the uplink DPDCH is transmitted in the corresponding duration. In the PCGs for normal transmission, the TPC bits for downlink power control can be omitted and the pilot duration (or period) can be extended to a PCG length. Beginning at the PCGs succeeding after transmitting the uplink DPDCH message by normal transmission of the PCGs, it is possible to transmit the uplink DPCCH without gating, or it is possible to gate transmission of the uplink DPCCH according to the original DC value until a state transition message is received from the base station. That is, when the uplink DPDCH message is transmitted for DC=1/2 gated transmission, it is possible to perform normal transmission on the PCG of the above duration, thereafter perform DC=1/2 gated transmission again, and then perform DC=1 gated transmission when transitioning to the user data active substate upon receipt of a state transition message from the base station.

Like the uplink DPCCH, even in the downlink, when a downlink DPDCH message is generated during gated transmission for the DPCCH, the PCGs, which are not transmitted according to the gated transmission pattern, undergo normal transmission in the corresponding duration. In the PCGs for normal transmission, the TPC bits for downlink power control can be omitted and the pilot duration can be extended to a PCG length. Beginning at the PCGs succeeding after transmitting the downlink DPDCH message by normal transmission of the PCGs, it is possible to transmit the downlink DPCCH without gating, or it is possible to gate transmission of the downlink DPCCH according to the original DC value until a state transition request message is received from the mobile station. That is, when the downlink DPDCH message is transmitted for DC=1/2 gated transmission, it is possible to perform normal transmission on the PCG of the above duration, thereafter perform DC=1/2 gated transmission again, and then perform DC=1 gated transmission when transitioning to the user data active substate upon receipt of a state transition request message from the mobile station.

Reference numeral 315 of FIG. 7B shows a case where an uplink DPDCH message is generated while the uplink DPCCH undergoes DC=1/2 gated transmission. Reference numeral 316 shows a case where the uplink DPDCH message is generated while the uplink DPCCH undergoes DC=1/4 gated transmission. Reference numeral 317 shows a case where the uplink DPDCH message is generated while the uplink DPCCH undergoes DC=1/8 gated transmission. The PCGS, which are not transmitted according to the gated transmission patterns shown by the reference numerals 315, 316 and 317, undergo normal transmission when the uplink DPDCH is transmitted in the corresponding duration. In the PCGs for normal transmission, the TPC bits for downlink power control can be omitted and the pilot duration (or period) can be extended to a PCG length. Beginning at the PCGs succeeding after transmitting the uplink DPDCH message by normal transmission of the PCGs, it is possible to transmit the uplink DPCCH without gating, or it is possible to gate transmission of the uplink DPCCH according to the original DC value until a state transition message is received from the base station. That is, when the uplink DPDCH message is transmitted for DC=1/2 gated transmission, it is possible to perform normal transmission on the PCG of the above duration, thereafter perform DC=1/2 gated transmission again, and then perform DC=1 gated transmission when transitioning to the user data active substate upon receipt of a state transition message from the base station.

It is also possible to simultaneously perform gate transmission on both the uplink DPCCH and the downlink DPCCH according to the same gating pattern. Beginning at the PCGs succeeding after transmitting the downlink DPDCH message by normal transmission of the PCGs, generated while gating transmission of the downlink DPCCH, it is possible to transmit the downlink DPCCH without gating, or it is possible to gate transmission of the downlink DPCCH according to the original DC value until a state transition request message is received from the mobile station. That is, when the downlink DPDCH message is transmitted for DC=1/2 gated transmission, it is possible to perform normal transmission on the PCG of the above duration, thereafter perform DC=1/2 gated transmission again, and then perform DC=1 gated transmission when transitioning to the user data active substate upon receipt of a state transition request message from the mobile station.

FIG. 8A shows a method for transmitting downlink and uplink signals when transmission of a downlink DPDCH is discontinued. When transmission of the downlink DPDCH is discontinued as shown by reference numeral 801 in the user data active substate where there exists no uplink DPDCH, the base station and the mobile station transition to the control-only substate if a set timer value expires or a downlink DPDCH message for state transition is generated. Although FIG. 8A shows an embodiment where the message for state transition to the control-only substate is generated by the base station, it is also possible for the mobile station to send a state transition request message to the base station when there is no downlink and uplink DPDCH. While transmitting the downlink DPCCH in FIG. 8A, it is also possible to transmit all the TFCI, TPC and pilot symbols without gating. Since the TPC bits include meaningless TPC values determined by measuring power strength of the pilot symbols of the gated PCGs within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous PCG. Alternatively, while transmitting the downlink DPCCH in FIG. 8A, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The PCG, in which the TPC bits in the downlink DPCCH are gated, refers to the TPC bits generated by measuring the pilot symbols corresponding to the gated PCG in the DPCCH transmitted from the mobile station.

Reference numeral 802 shows a situation where a state transition message generated by the base station is transmitted to the mobile station over the downlink DPDCH. In this case, the mobile station, which has been gating transmission of the uplink DPCCH, can stop gated transmission upon receipt of the state transition message and perform normal transmission (DC=1). Alternatively, the mobile station, which has been gating transmission of the uplink DPCCH, can continue gated transmission even after receipt of the state transition message, stop gated transmission at the time point where state transition occurs, and then perform normal transmission (DC=1).

Figure 8B:
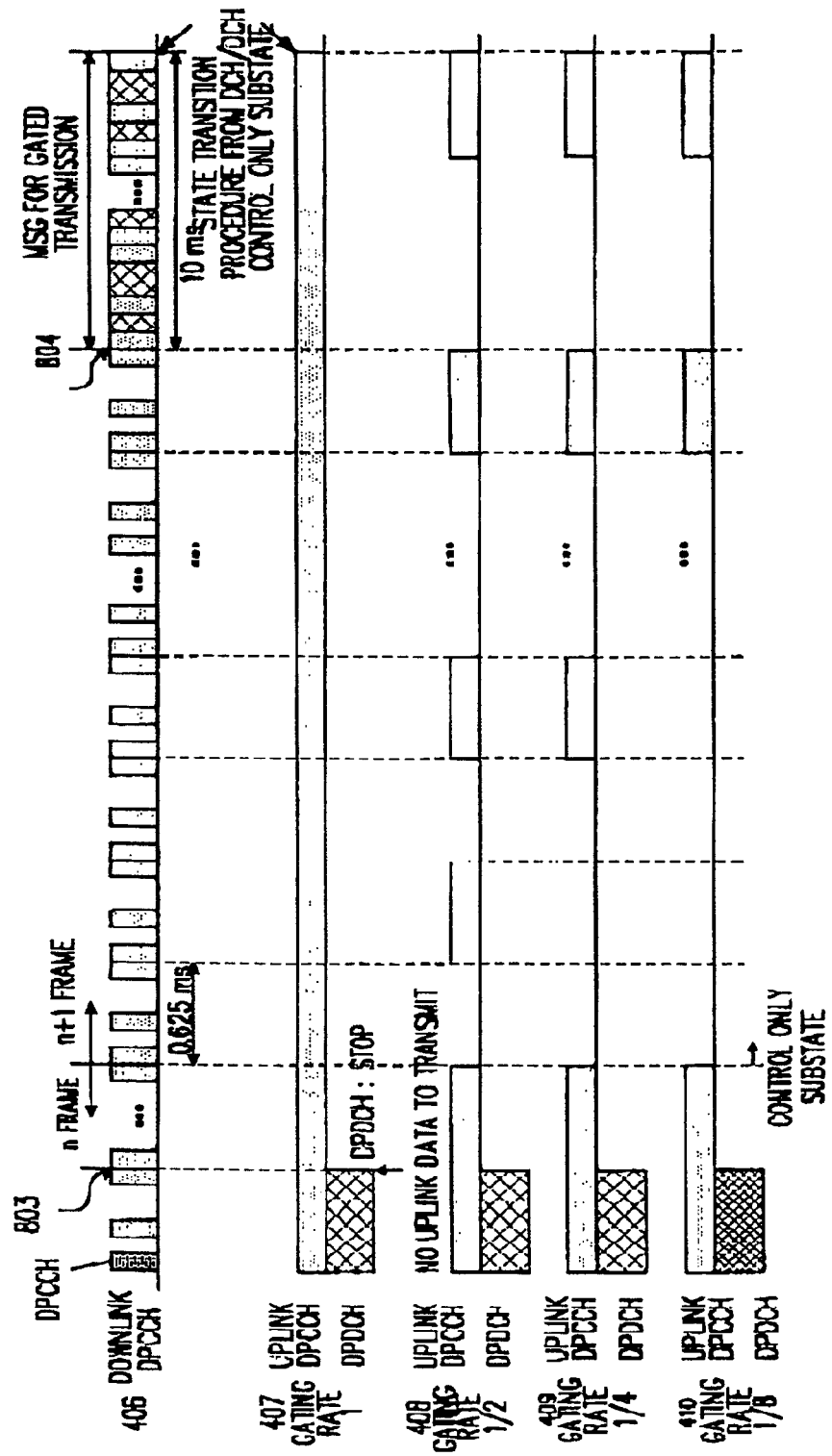
FIG. 8B is a diagram illustrating a method for transmitting downlink and uplink signals when transmission of an uplink DPDCH is discontinued in the UMTS according to the embodiment of the present invention.

FIG. 8B shows a method for transmitting downlink and uplink signals when transmission of a uplink DPDCH is discontinued. When transmission of the uplink DPDCH is discontinued as shown by reference numeral 803 in the user data active substate where there exists no downlink DPDCH, the base station and the mobile station make a state transition at a time point appointed (or scheduled) between them when a set timer value expires or after exchanging a state transition message. Although FIG. 8B shows an embodiment where the message for state transition is generated in the downlink DPDCH, the state transition message can also be generated in the uplink DPDCH of the mobile station. While transmitting the downlink DPCCH in FIG. 8B, it is also possible to transmit all the TFCI, TPC and pilot symbols without gating. Since the TPC bits include meaningless TPC values determined by measuring power strength of the pilot symbols of the gated PCGs within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous PCG. Alternatively, while transmitting the downlink DPCCH in FIG. 8B, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The PCG, in which the TPC bits in the downlink DPCCH are gated, refers to the TPC bits generated by measuring the pilot symbols corresponding to the gated PCG in the DPCCH transmitted from the mobile station.

Reference numeral 804 shows a situation where a state transition message generated by the base station is transmitted to the mobile station over the downlink DPDCH. In this case, the mobile station, which has been gating transmission of the uplink DPCCH, can stop gated transmission upon receipt of the state transition message and perform normal transmission (DC=1). Alternatively, the mobile station, which has been gating transmission of the uplink DPCCH, can continue gated transmission even after receipt of the state transition message, stop gated transmission at the time point where state transition occurs, and then perform normal transmission (DC=1).

Figure 8C:
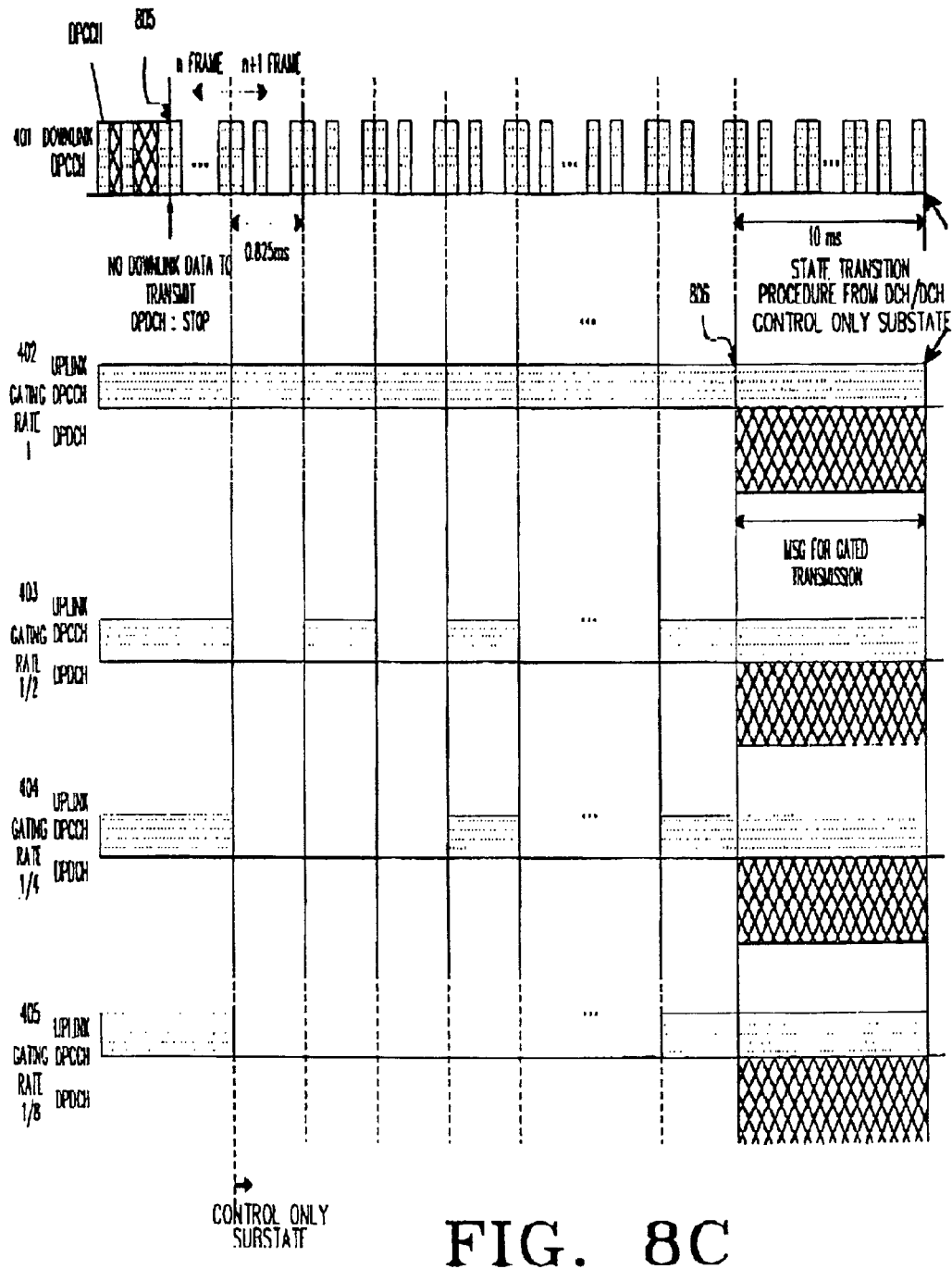
FIG. 8C is a diagram illustrating another method for transmitting downlink and uplink signals when transmission of the downlink DPDCH is discontinued in the UMTS according to the embodiment of the present invention.

FIG. 8C shows a method for transmitting downlink and uplink signals when transmission of a downlink DPDCH is discontinued. When transmission of the downlink DPDCH is discontinued as shown by reference numeral 805 in the user data active substate where there exists no uplink DPDCH, the base station and the mobile station transition to the control-only substate if a set timer value expires or a downlink DPDCH message for state transition is generated. Although FIG. 8C shows an embodiment where the message for state transition to the control-only substate is generated by the base station, it is also possible for the mobile station to send a state transition request message to the base station when there is no downlink and uplink DPDCH. While transmitting the downlink DPCCH in FIG. 8C, it is also possible to transmit all the TFCI, TPC and pilot symbols without gating. Since the TPC bits include meaningless TPC values determined by measuring power strength of the pilot symbols of the gated PCGs within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous PCG. Alternatively, while transmitting the downlink DPCCH in FIG. 8C, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The PCG, in which the TPC bits in the downlink DPCCH are gated, refers to the TPC bits generated by measuring the pilot symbols corresponding to the gated PCG in the DPCCH transmitted from the mobile station.

Reference numeral 806 shows a situation where a state transition message generated by the mobile station is transmitted to the base station over the uplink DPDCH. In this case, the mobile station, which has been gating transmission of the uplink DPCCH, can stop gated transmission after transmission of the state transition message over the uplink DPDCH and then perform normal transmission (DC=1). Alternatively, the mobile station, which has been gating transmission of the uplink DPCCH, can continue gated transmission even after transmission of the state transition message, stop gated transmission at the time point where state transition occurs, and then perform normal transmission (DC=1).

Figure 8D:
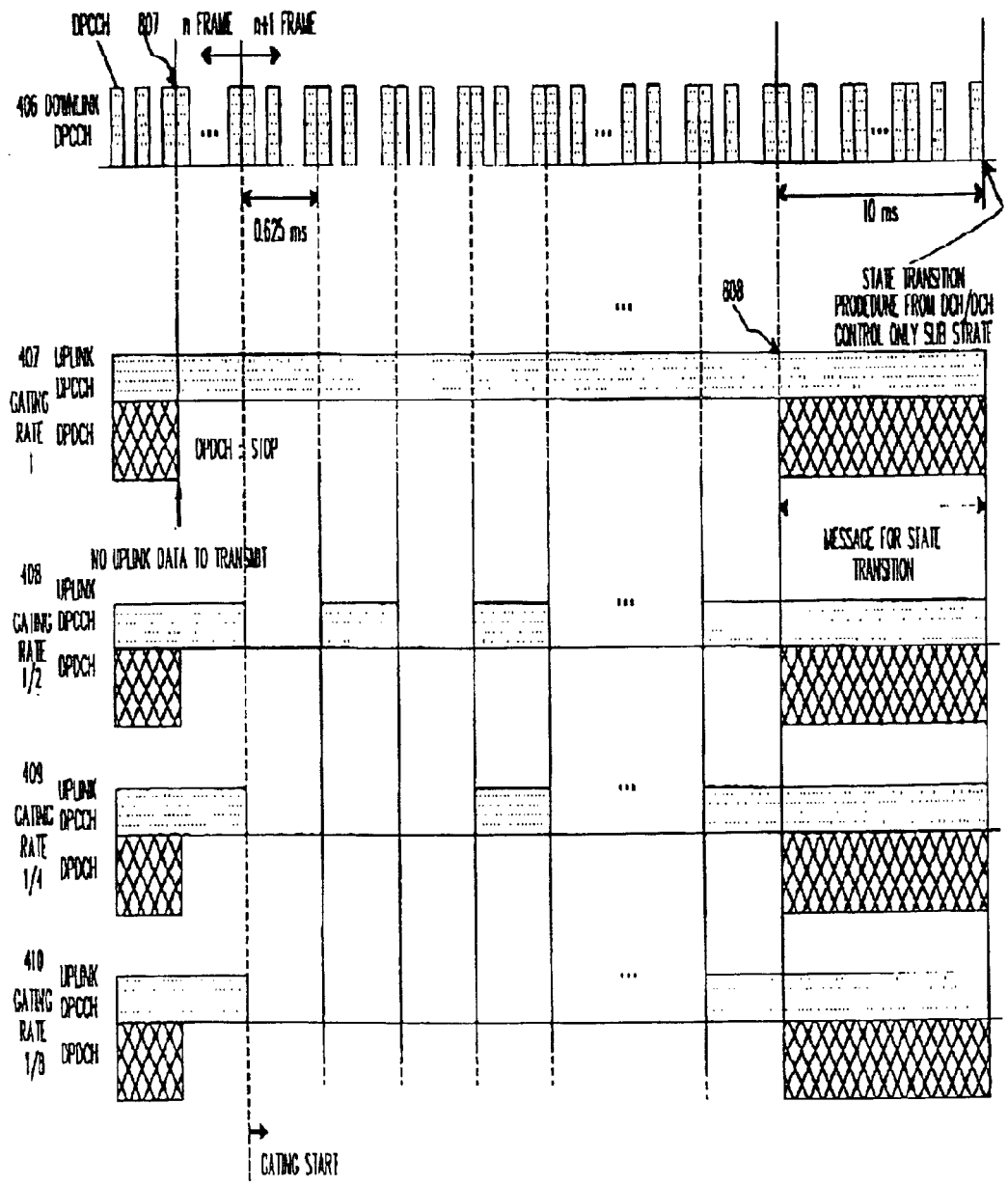
FIG. 8D is a diagram illustrating another method for transmitting downlink and uplink signals when transmission of the uplink DPDCH is discontinued in the UMTS according to the embodiment of the present invention.

FIG. 8D shows a method for transmitting downlink and uplink signals when transmission of a uplink DPDCH is discontinued. When transmission of the uplink DPDCH is discontinued as shown by reference numeral 807 in the user data active substate where there exists no downlink DPDCH, the base station and the mobile station make a state transition at a time point appointed (or scheduled) between them when a set timer value expires or after exchanging a state transition message. Although FIG. 8D shows an embodiment where the message for state transition is generated in the downlink DPDCH, the state transition message can also be generated in the uplink DPDCH of the mobile station. While transmitting the downlink DPCCH in FIG. 8D, it is also possible to transmit all the TFCI, TPC and pilot symbols without gating. Since the TPC bits include meaningless TPC values determined by measuring power strength of the pilot symbols of the gated PCGs within the uplink DPCCH, the mobile station ignores the meaningless TPC values transmitted from the base station in order to perform uplink power control in consideration of the gating pattern for the uplink DPCCH, and performs transmission at the same transmission power as the transmission power for the previous PCG. Alternatively, while transmitting the downlink DPCCH in FIG. 8D, it is also possible to gate only the TFCI and TPC bits in the downlink DPCCH without gating the pilot symbols in the downlink DPCCH. At this point, the gating pattern is identical to a gating pattern for the uplink DPCCH of the mobile station. The PCG, in which the TPC bits in the downlink DPCCH are gated, refers to the TPC bits generated by measuring the pilot symbols corresponding to the gated PCG in the DPCCH transmitted from the mobile station.

Reference numeral 808 shows a situation where a state transition message generated by the mobile station is transmitted to the base station over the uplink DPDCH. In this case, the mobile station, which has been gating transmission of the uplink DPCCH, can stop gated transmission after transmission of the state transition message over the uplink DPDCH and then perform normal transmission (DC=1). Alternatively, the mobile station, which has been gating transmission of the uplink DPCCH, can continue gated transmission even after transmission of the state transition message, stop gated transmission at the time point where state transition occurs, and then perform normal transmission (DC=1).

Figure 9A:
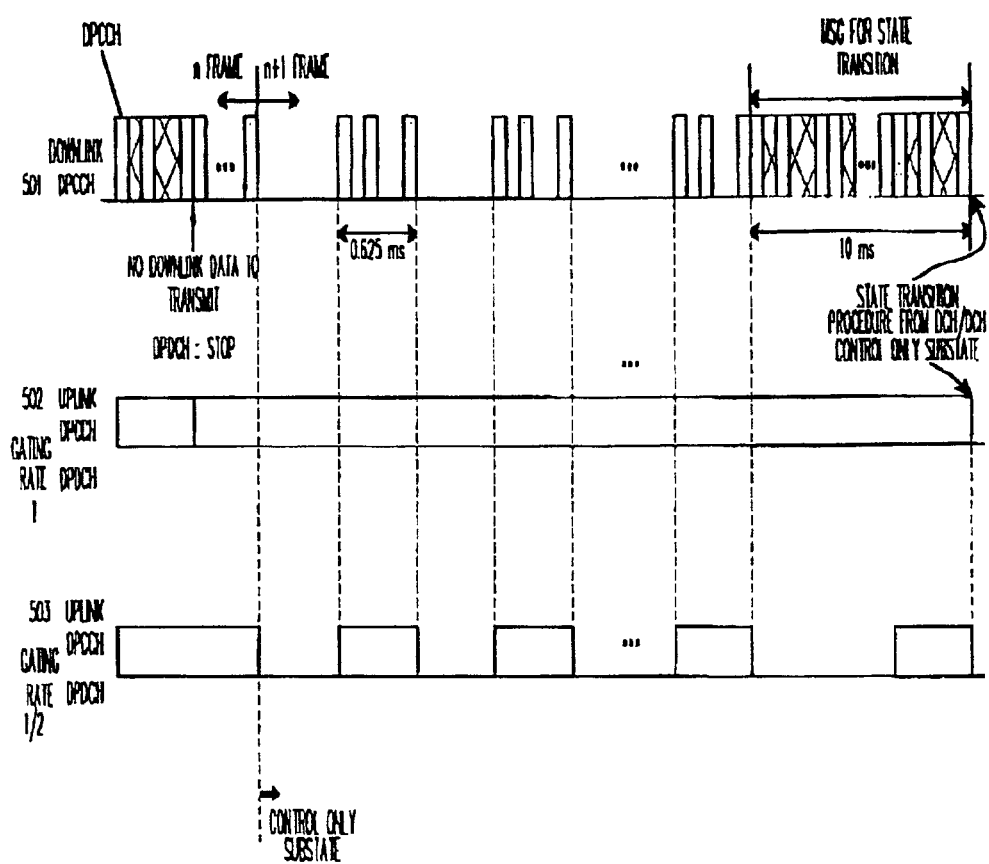
FIG. 9A is a diagram illustrating a method for transmitting downlink and uplink signals when transmission of a downlink DPDCH is discontinued (gated transmission for the downlink DPCCH) in the UMTS according to the embodiment of the present invention.

FIG. 9A shows a method for transmitting downlink and uplink signals when transmission of a downlink DPDCH is discontinued. When transmission of the downlink DPDCH is discontinued, the base station and the mobile station make a state transition at a time point appointed between them if a set timer value expires or after exchanging a state transition message. FIG. 9A shows a case where a gating pattern for the downlink DPCCH is identical to a gating pattern for the uplink DPCCH. Although FIG. 9A shows an embodiment where the state transition message is generated through the downlink DPDCH, the state transition message can also be generated through the uplink DPDCH of the mobile station.

Figure 9B:
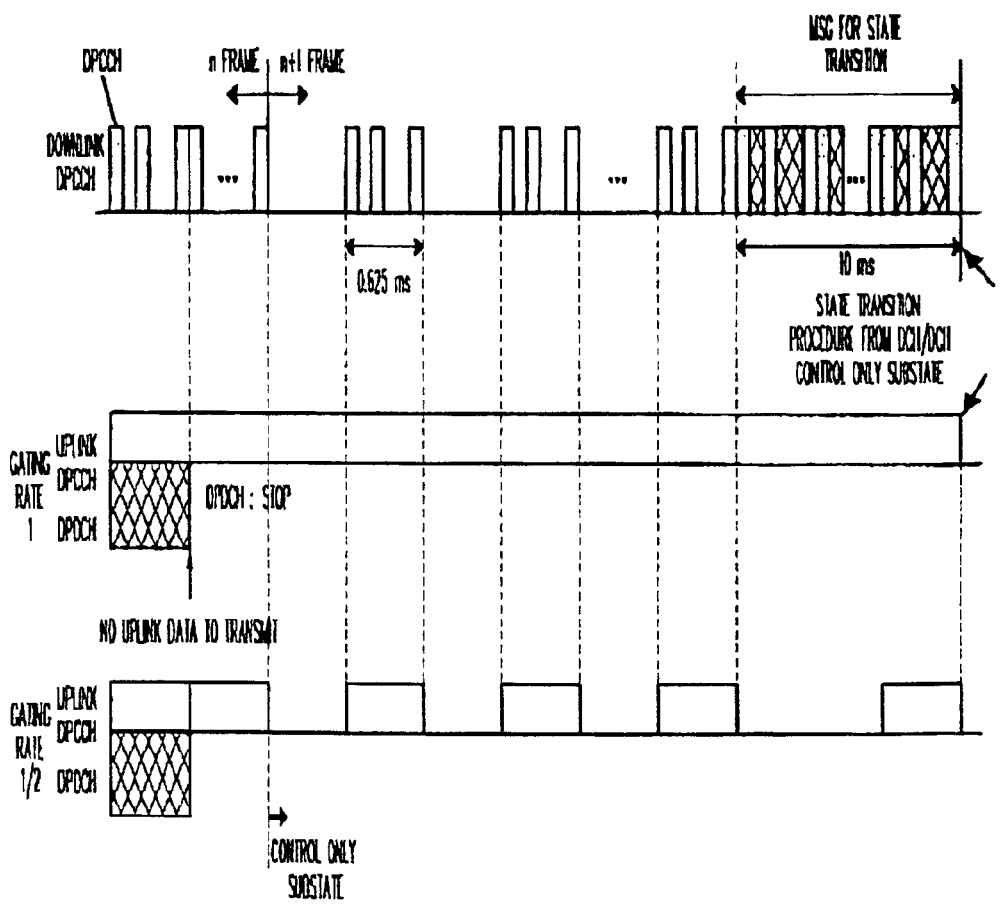
FIG. 9B is a diagram illustrating a method for transmitting downlink and uplink signals when transmission of an uplink DPDCH is discontinued (gated transmission for downlink DPCCH) the UMTS according to the embodiment of the present invention.

FIG. 9B shows a method for transmitting downlink and uplink signals when transmission of a uplink DPDCH is discontinued. When transmission of the uplink DPDCH is discontinued, the base station and the mobile station make a state transition at a time point appointed between them if a set timer value expires or after exchanging a state transition message. FIG. 9B shows a case where a gating pattern for the downlink DPCCH is identical to a gating pattern for the uplink DPCCH. Although FIG. 9B shows an embodiment where the state transition message is generated through the downlink DPDCH, the state transition message can also be generated through the uplink DPDCH of the mobile station.

In the foregoing drawings and descriptions, the downlink and uplink frames have the same frame start point. However, in the UMTS system, the frame start point of the uplink is artificially delayed by 250 μsec as compared with the frame start point of the downlink. This is to make power control time delay become one slot (=0.625 ms) in consideration of propagation delay of the transmission signal when a cell radius is less than 30 Km.

Figure 10A:
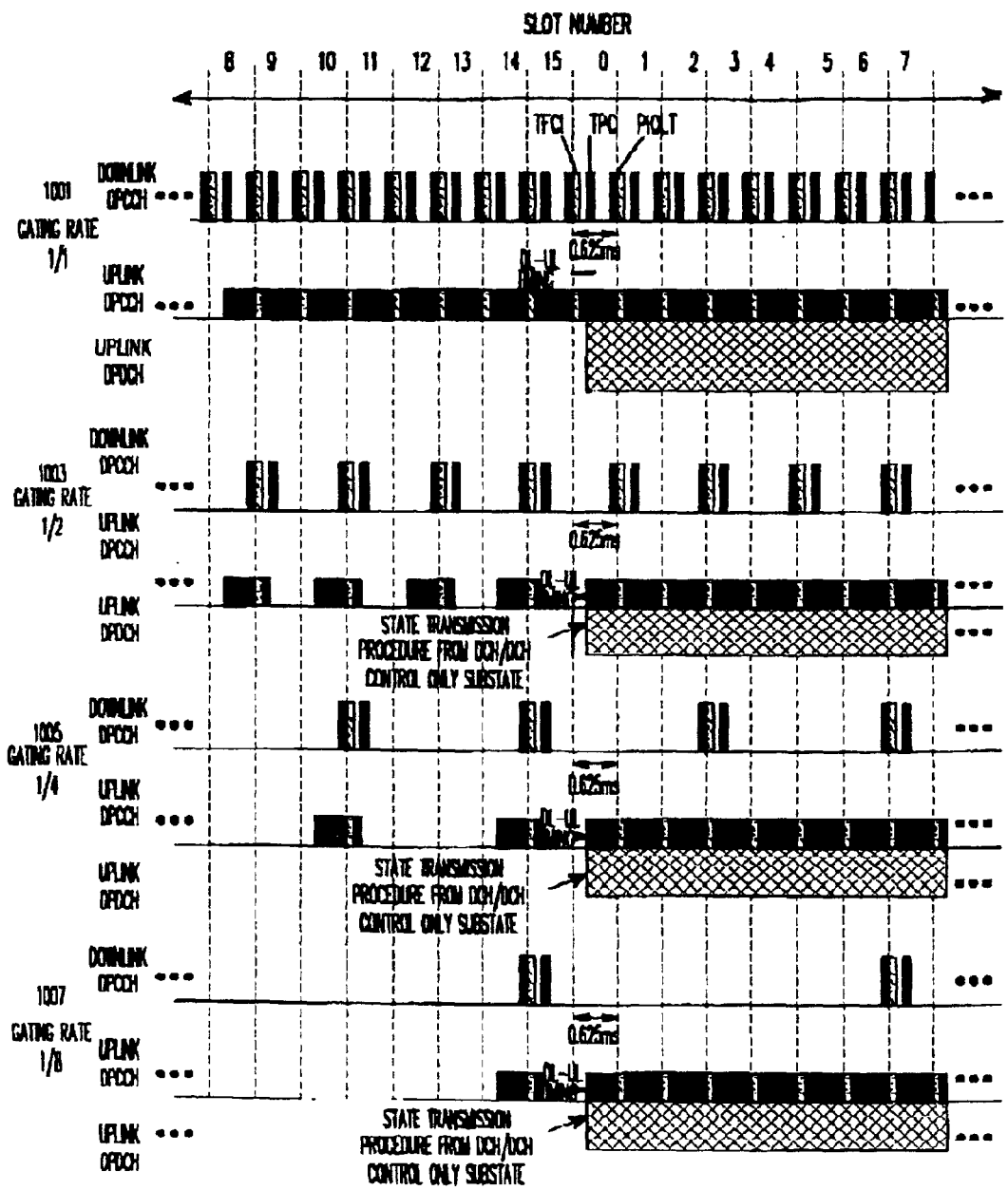
FIG. 10A is a diagram illustrating a method for transmitting downlink and uplink signals at the same gating rate when a gated transmission message is transmitted on the uplink in a gated mode of the UMTS according to the embodiment of the present invention.
Figure 10B:
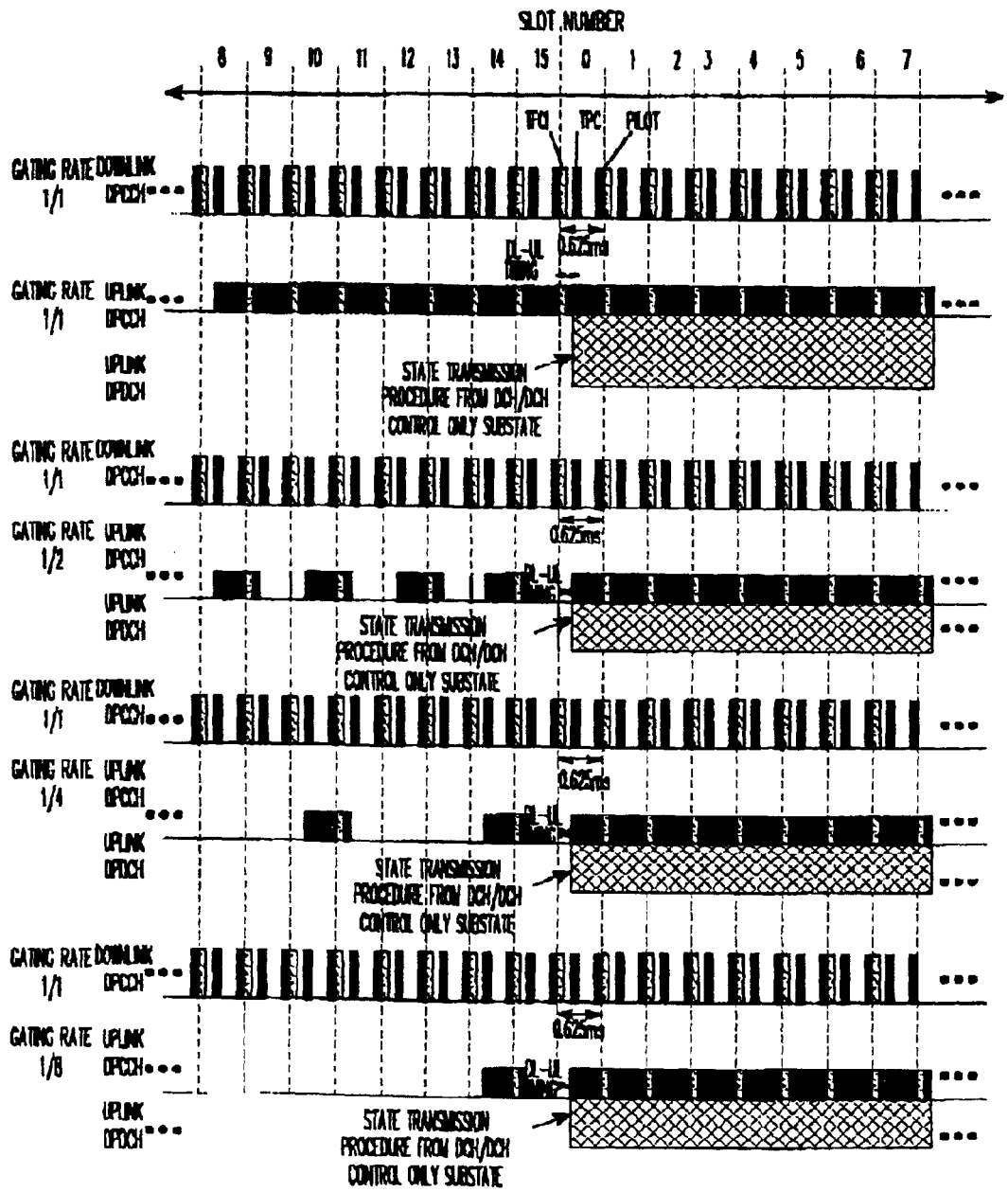
FIG. 10B is a diagram illustrating a first embodiment of a method for transmitting downlink and uplink signals at different gating rates when a gated transmission message is transmitted on the uplink in a gated mode of the UMTS according to the embodiment of the present invention.

Therefore, in consideration of the artificial time delay of the downlink and uplink frame start time, the methods for transmitting the DPCCH signal according to gated transmission can be shown by FIGS. 11A to 11E. FIGS. 10A and 10B show structures of the base station controller and the mobile station controller, which enable such gated transmission, respectively.

It is shown from the following description that a power control rate and power control delay can be reduced by using different uplink and downlink gating rates when a gated transmission message is transmitted in a state where no traffic data is transmitted on a DPDCH for a predetermined time according to embodiments of the present invention.

There will first be given a description of signal transmission diagrams for the case that a message is transmitted on the uplink when no traffic data is transmitted on a DPDCH for a predetermined time.

FIG. 10A is a signal transmission diagram for the down link and the uplink at the same gating rate when a gated transmission message is transmitted on the uplink in the state that no traffic data is transmitted on a DPDCH for a predetermined time. That is, FIG. 10A shows the same gating rate on the downlink and uplink when a gated transmission message is transmitted on the uplink in the state that traffic data is not transmitted on the DPDCH for a predetermined time.

Referring to FIG. 10A, when the DPDCH is transmitted on the uplink, a DPCCH including TFCI, pilot symbols, and TPC is continuously transmitted. On the other hand, when the DPDCH is not transmitted, the DPCCH is transmitted at a gating rate in a gated mode. The power control rate of the uplink is determined by the gating rate of the downlink. Reference numeral 1001 indicates the case that for a downlink gating rate of 1/1, the uplink power control rate is 1600 Hz. Reference numeral 1003 indicates the case that for a downlink gating rate of 1/2, the uplink power control rate is 800 Hz. Reference numeral 1005 indicates the case that for a downlink gating rate of 1/4, the uplink power control rate is 400 Hz. Reference numeral 1007 indicates the case that for a downlink gating rate of 1/8, the uplink power control rate is 200 Hz.

FIG. 10B is a signal transmission diagram for the downlink and the uplink at different gating rates when a gated transmission message is transmitted on the uplink in the state that no traffic data is transmitted on a DPDCH for a predetermined time according to a first embodiment of the present invention. That is, FIG. 10B shows an embodiment of transmitting signals on the downlink and uplink at different gating rates (a downlink gating rate of 1).

Referring to FIG. 10B, when an uplink message is not transmitted, the uplink gating rate varies to 1, 1/2, 1/4, and 1/8 and then the uplink power control rate in turn varies to 1600, 800, 400, and 200 Hz. On the other hand, when a message is transmitted on the DPDCH, the uplink power control rate is fixed at 1600 Hz regardless of the uplink gating rate. In addition, it can be noted that downlink and uplink power control delays are minimized regardless of gating positions (gating pattern) of the uplink.

Figure 10C:
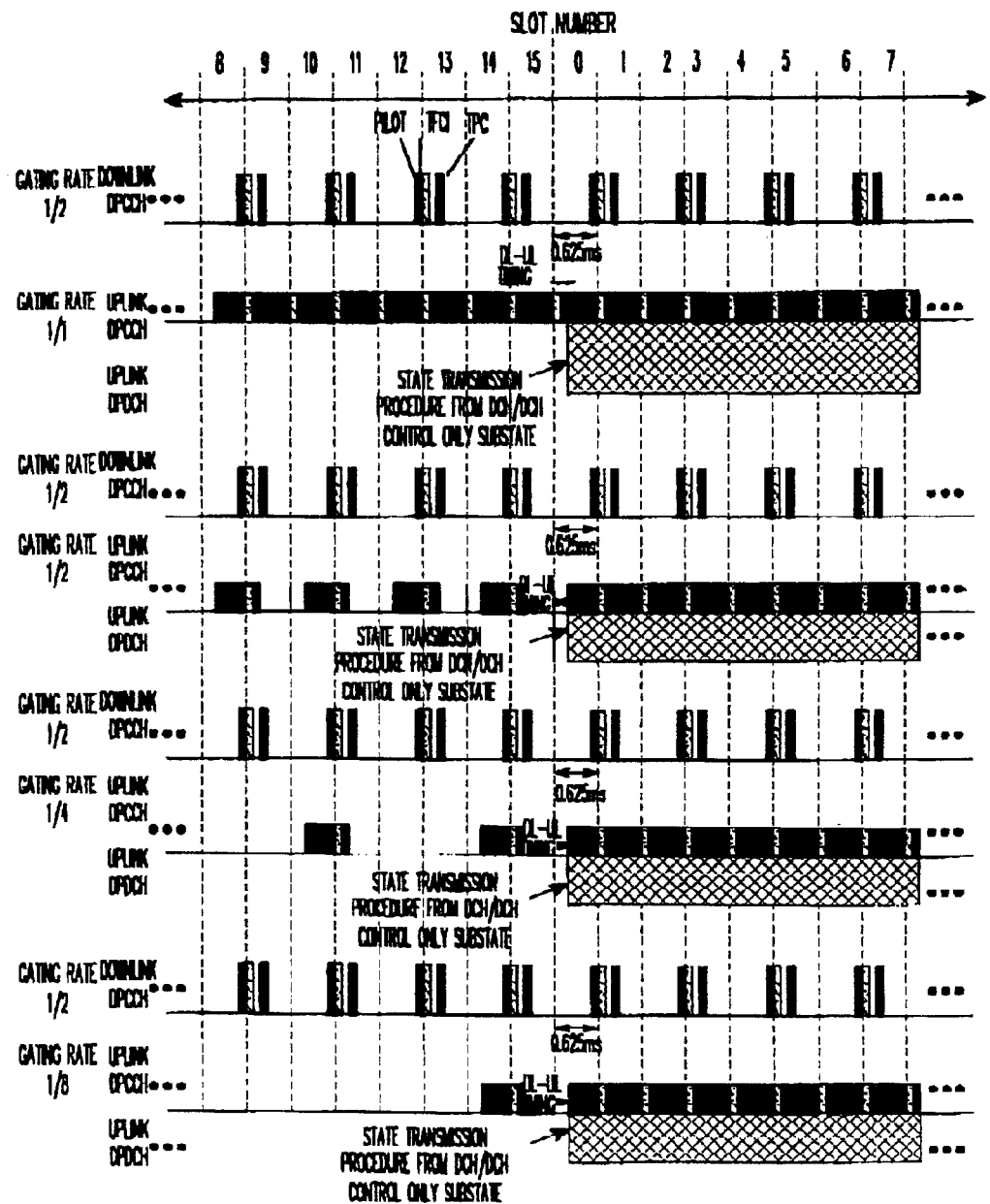
FIG. 10C is a diagram illustrating a second embodiment of the method for transmitting downlink and uplink signals at different gating rates when a gated transmission message is transmitted on the uplink in a gated mode of the UMTS according to the embodiment of the present invention.

FIG. 10C is a signal transmission diagram for the downlink and the uplink at different gating rates when a gated transmission message is transmitted on the uplink in the state that no traffic data is transmitted on a DPDCH for a predetermined time according to a second embodiment of the present invention. That is, FIG. 10C shows another embodiment of transmitting signals on the downlink and uplink at different gating rates. Here, a downlink gating rate is shown to be 1/2.

Referring to FIG. 10C, when no message is transmitted on the uplink, the uplink gating rate varies to 1, 1/2, 1/4, and 1/8 and then the uplink power control rate in turn varies to 1600, 800, 400, and 200 Hz. On the other hand, when a message is transmitted on the DPDCH, the uplink power control rate is fixed at 800 Hz regardless of the uplink gating rate.

A description will be made of signal transmission diagrams for the case that a gated transmission message is transmitted on the downlink in the state that no traffic data is transmitted on a DPDCH for a predetermined time.

Figure 11A:
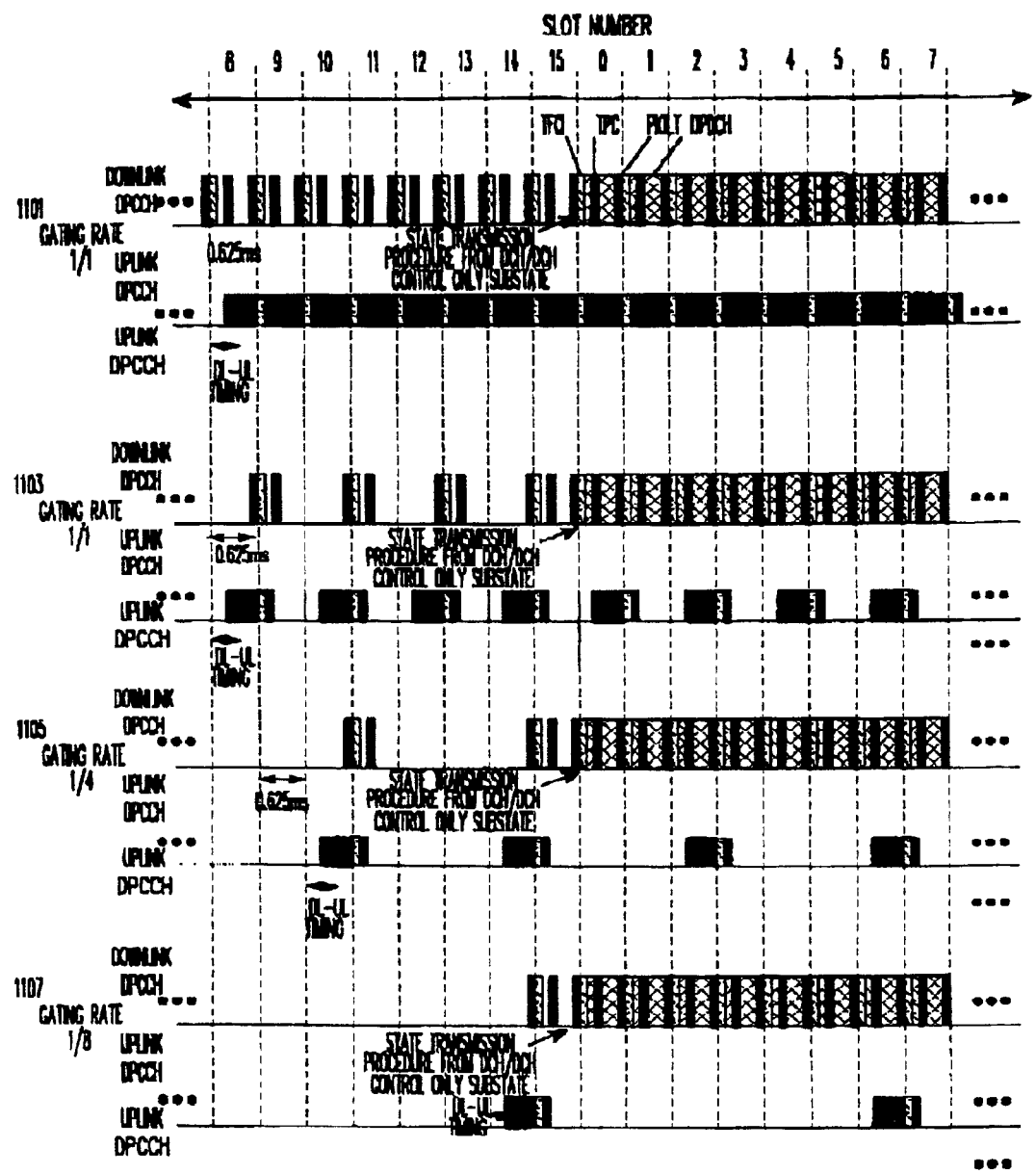
FIG. 11A is a diagram illustrating a method for transmitting downlink and uplink signals at the same gating rate when a gated transmission message is transmitted on the downlink in a gated mode of the UMTS according to the embodiment of the present invention.

FIG. 11A is a signal transmission diagram for the down link and the uplink at the same gating rate when a gated transmission message is transmitted on the downlink in the state that no traffic data is transmitted on a DPDCH for a predetermined time. That is, FIG. 11A shows the same gating rate on the downlink and uplink when a gated transmission message is transmitted on the downlink in the state that traffic data is not transmitted on the DPDCH for a predetermined time.

Referring to FIG. 11A, when the DPDCH is transmitted on the downlink, a downlink DPCCH including TFCI, pilot symbols, and TPC is continuously transmitted. On the other hand, when the DPDCH is not transmitted, the DPCCH is transmitted at a gating rate in a gated mode. The power control rate of the downlink is determined by the gating rate of the uplink. Reference numeral 1101 indicates the case that for an uplink gating rate of 1/1, the downlink power control rate is 1600 Hz. Reference numeral 1103 indicates the case that for an uplink gating rate of 1/2, the downlink power control rate is 800 Hz. Reference numeral 1105 indicates the case that for an uplink gating rate of 1/4, the downlink power control rate is 400 Hz. Reference numeral 1107 indicates the case that for an uplink gating rate of 1/8, the downlink power control rate is 200 Hz.

Figure 11B:
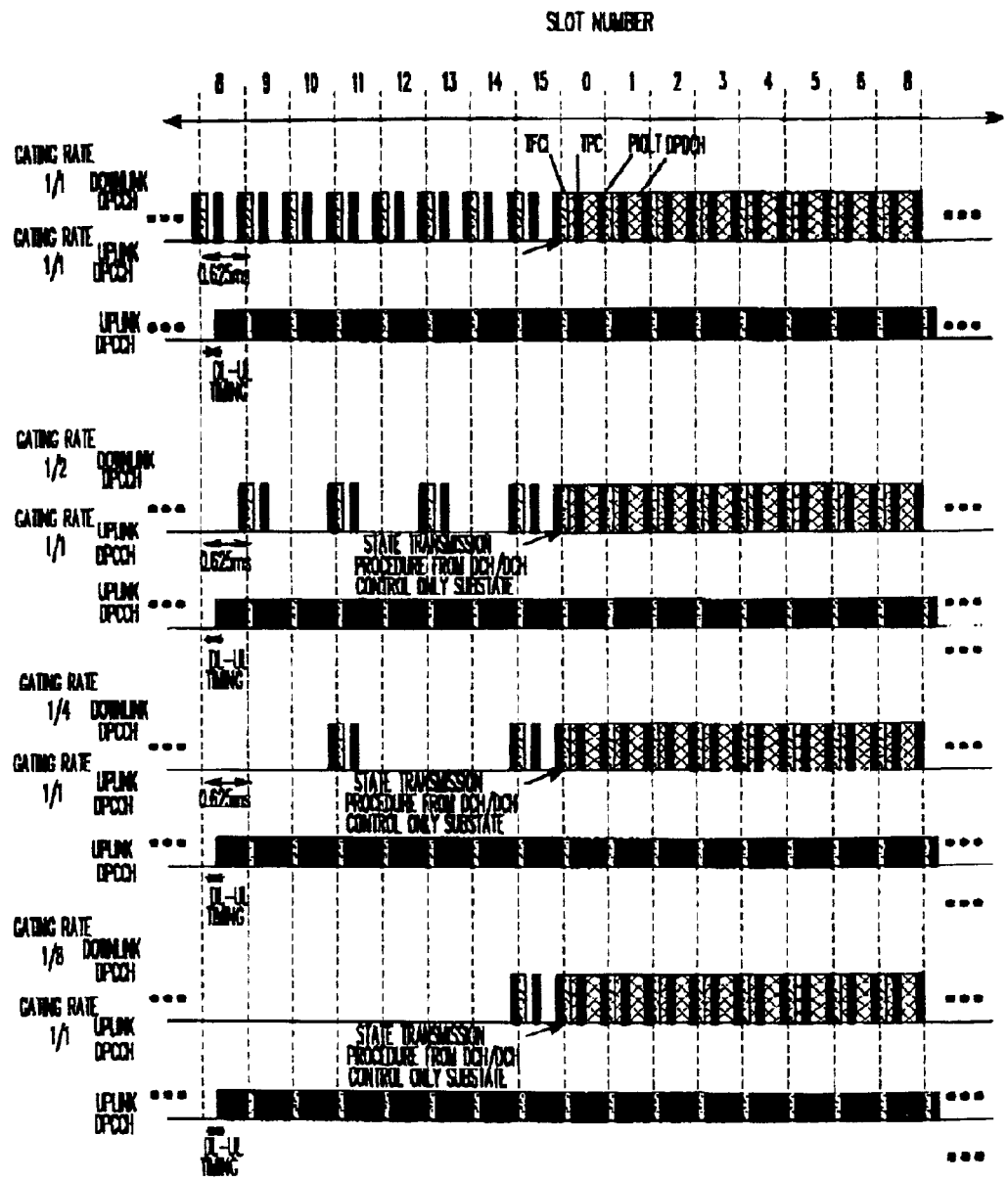
FIG. 11B is a diagram illustrating a first embodiment of a method for transmitting downlink and uplink signals at different gating rates when a gated transmission message is transmitted on the downlink in a gated mode of the UMTS according to the embodiment of the present invention.

FIG. 11B is a signal transmission diagram for the down link and the uplink at different gating rates when a gated transmission message is transmitted on the downlink in the state that no traffic data is transmitted on a DPDCH for a predetermined time according to a first embodiment of the present invention. That is, FIG. 11B shows an embodiment of transmitting signals on the downlink and uplink at different gating rates (an uplink gating rate of 1).

Referring to FIG. 11B, when a downlink message is not transmitted, the downlink gating rate varies to 1, 1/2, 1/8, and 1/8 and then the downlink power control rate in turn varies to 1600, 800, 400, and 200 Hz. On the other hand, when a message is transmitted on the DPDCH, the downlink power control rate is fixed at 1600 Hz regardless of the downlink gating rate. In addition, it can be noted that downlink and uplink power control delays are minimized regardless of gating positions (gating pattern) of the uplink.

Figure 11C:
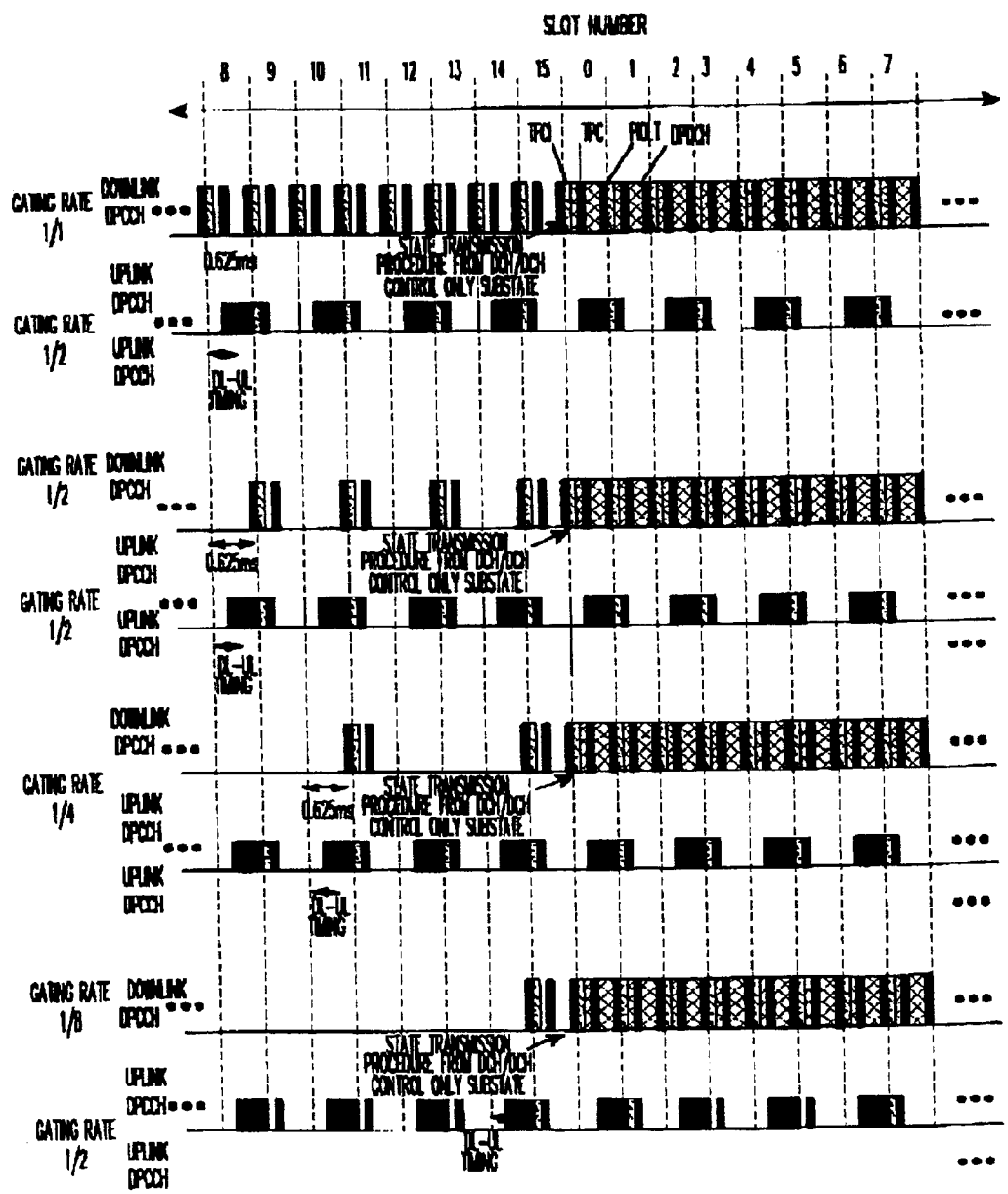
FIG. 11C is a diagram illustrating a second embodiment of the method for transmitting downlink and uplink signals at different gating rates when a gated transmission message is transmitted on the downlink in a gated mode of the UMTS according to the embodiment of the present invention.

FIG. 11C is a signal transmission diagram for the downlink and the uplink at different gating rates when a gated transmission message is transmitted on the downlink in the state that no traffic data is transmitted on a DPDCH for a predetermined time according to a second embodiment of the present invention. That is, FIG. 11C shows another embodiment of transmitting signals on the downlink and uplink at different gating rates (an uplink gating rate of 1/2).

Referring to FIG. 11C, when no message is transmitted on the downlink, the downlink gating rate varies to 1, 1/2, 1/4, and 1/8 and then the downlink power control rate in turn varies to 1600, 800, 400, and 200 Hz. On the other hand, when a message is transmitted on the DPDCH, the downlink power control rate is fixed at 800 Hz regardless of the downlink gating rate.

A mobile station in the periphery of a cell with a large radius experiences a great propagation delay, thereby increasing a power control delay on the downlink/uplink. In this case, while traffic data is not transmitted on a DPDCH, the downlink/uplink power control delay varies according to downlink and uplink gating rates and relative gating positions. Therefore, a base station needs to change the downlink or uplink gating position (pattern) by estimating the propagation delay of the mobile station so that both the downlink and uplink power control delays can be minimized. For changing gating positions, the uplink gating position is fixed and the downlink gating position is changed, or vice versa.

Figure 12A:
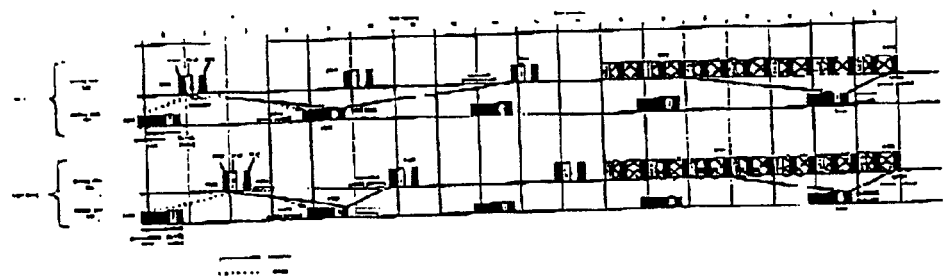
FIG. 12A is a diagram illustrating power control delay caused by propagation delay in both cases where a downlink DPDCH is present and absent in a gated mode of the UMTS according to the embodiment of the present invention.

In FIG. 12A, a case 12a-up shows that with a great propagation delay, one link power control delay is small and the other link power control delay is very large at a specific gating position (pattern). In the absence of a downlink DPDCH in the case 12a-up, downlink power control is achieved at a position 1209 by generating TPC 1207 by measuring a downlink pilot symbol 1201 and then going uplink. A power control delay is as great as 7 slots in this case. In the absence of the downlink DPDCH, uplink power control is achieved with a power control delay of 3 slots at a position 1207 by generating TPC 1201 by measuring an uplink pilot symbol 1201 and going downlink. In the presence of the downlink DPDCH in the case 12a-up, downlink power control is achieved with a power control delay of 4 slots at a position 1215 by generating uplink TPC 1213 by measuring a downlink pilot symbol 1211 and then going uplink.

A case 12a-down in FIG. 12A shows that balanced power control delays can be achieved on the downlink and the uplink by setting an optimal gating position (pattern) even when a propagation delay is great. In the absence of the downlink DPDCH in the case 12a-down, downlink power control is achieved with a power control delay of 3 slots at a position 1227 by generating TPC 1225 by measuring a downlink pilot symbol 1223 and then going uplink. In the absence of the downlink DPDCH, uplink power control is achieved with a power control delay of 3 slots at the position 1225 by generating TPC 1223 by measuring an uplink pilot symbol 1221 and going downlink. In the presence of the downlink DPDCH in the case 12a-down, downlink power control is achieved with a power control delay of 3 slots at a position 1235 by generating downlink TPC 1233 by measuring a downlink pilot symbol 1231 and then going uplink.

Figure 12B:
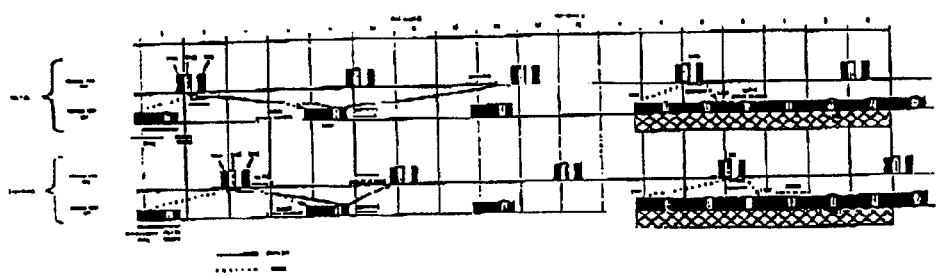
FIG. 12B is a diagram illustrating power control delay caused by propagation delay in both cases where an uplink DPDCH is present and absent in a gated mode of the UMTS according to the embodiment of the present invention.

In the presence of an uplink DPDCH in a case 12b-up shown in FIG. 12B, uplink power control is achieved with a power control delay of 1 slot at a position 1245 by generating uplink TPC 1243 by measuring an uplink pilot symbol 1241 and then going downlink.

In the presence of the uplink DPDCH in a case 12b-down shown in FIG. 12B, uplink power control is achieved with a power control delay of 2 slots at a position 1255 by generating uplink TPC 1253 by measuring an uplink pilot symbol 1251 and then going downlink.

As noted from the cases 12a-up and 12b-up, downlink and uplink power control delays are 7 slots and 3 slots, respectively when no message is transmitted with similar downlink and uplink slot positions, and they are 4 slots and 1 slot, respectively when a message is transmitted with similar downlink and uplink slot positions. As noted from the cases 12a-down and 12b-down, the downlink and uplink power control delays are the same 3 slots when no message is transmitted with different downlink and uplink slot positions, and they are 3 slots and 2 slots, respectively when a message is transmitted with different downlink and uplink slot positions.

In accordance with the above-described embodiments, when a propagation delay is great, power control delay can be reduced in the absence of a transmission message and downlink and uplink power control delays can be balanced in the presence of the transmission message by arranging downlink and uplink slots at different positions.

2. Application to CDMA-2000

Embodiments of the present invention which are applied to CDMA-2000 will be described in detail referring to FIGS. 4C & 4D and FIGS. 13A to 16B.

The embodiments of the present invention as will be described herein below can be applied to a CDMA-2000 mobile communication system. In the CDMA-2000 system, a frame is 20 msec in duration and one frame has 16 PCGs. That is, a PCG is 1.25 msec in duration and a DCCH frame is 5 slots or 20 msec. However, the above values are given by way of example only.

A hardware structure in the CDMA-2000 mobile communication system according to the embodiment of the present invention will be described below.

Figure 3C:
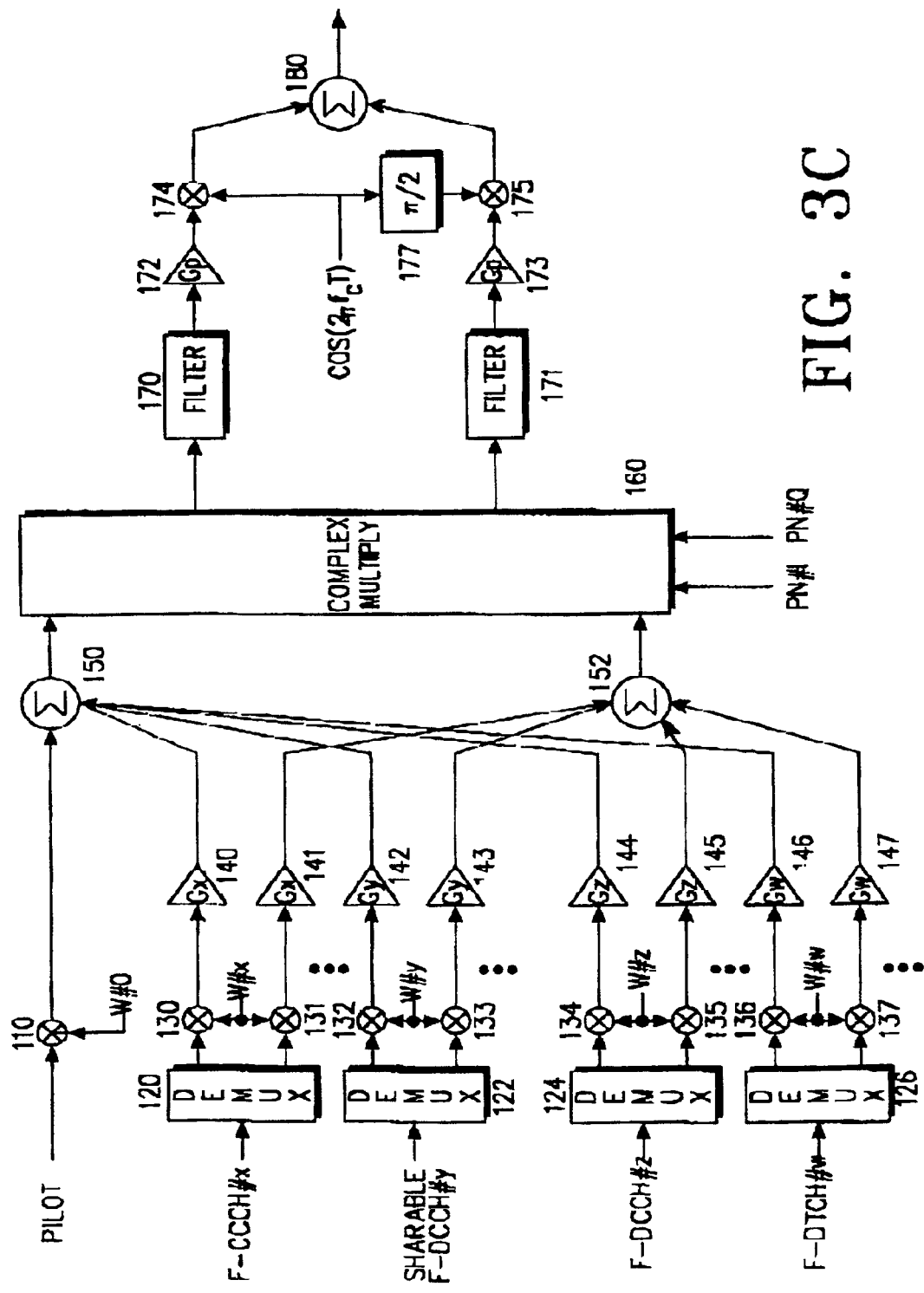
FIG. 3C is a diagram illustrating a structure of a base station transmitter in a conventional CDMA-2000 system.
Figure 4C:
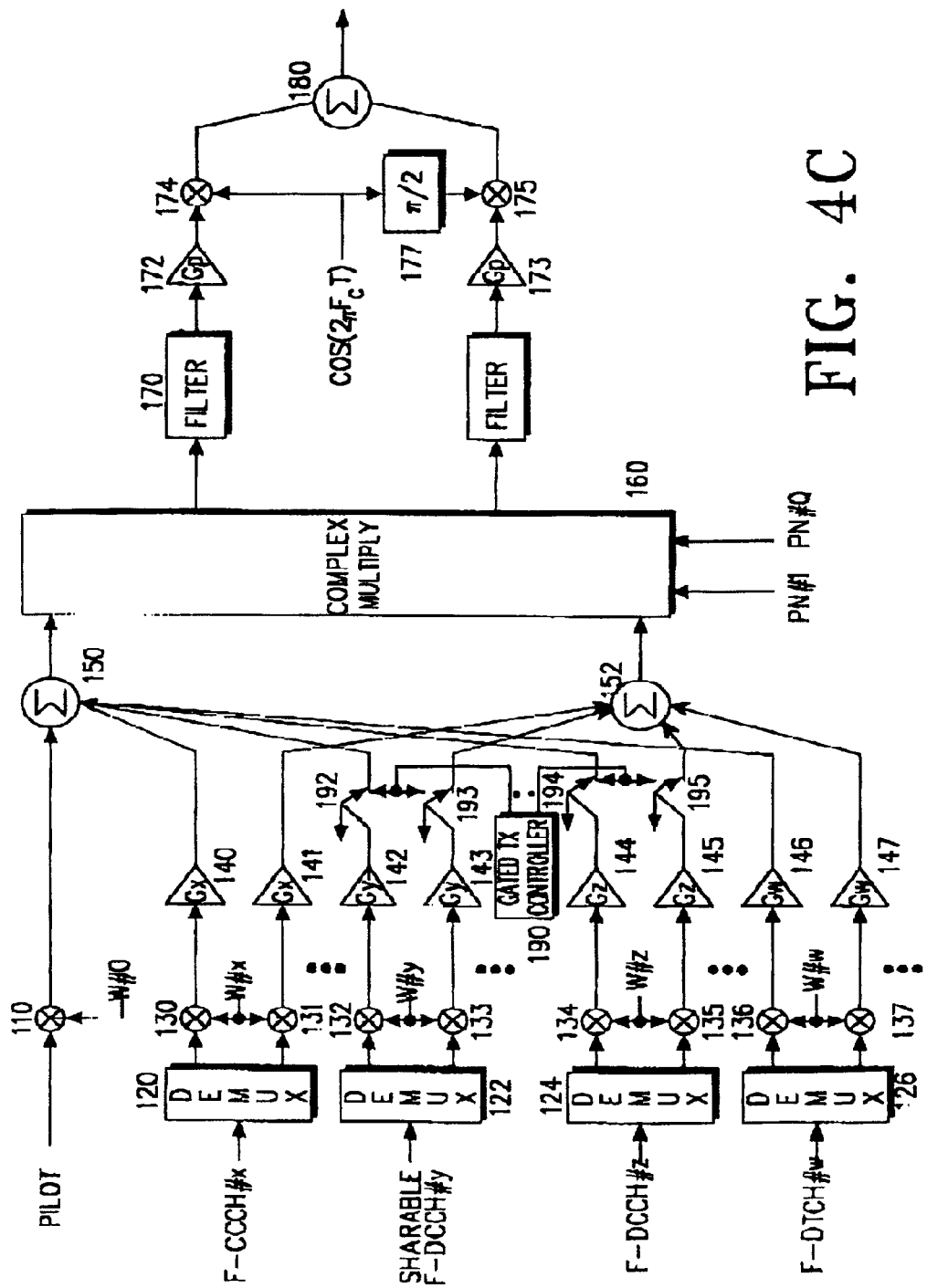
FIG. 4C is a diagram illustrating a structure of a base station transmitter in a CDMA-2000 system according to an embodiment of the present invention.

FIG. 4C shows a structure of a base station controller in the CDMA-2000 mobile communication system according to the embodiment of the present invention. The base station transmitter is different from the conventional one of FIG. 3C in that F-DCCH outputs of amplifiers 142 to 145 are gated by a gated transmission controller 190 and gating operators 192 to 195. That is, the gated transmission controller 190 transmits reverse PCBs at a PCG (or time slot) scheduled with a mobile station in a control hold state/normal substate where either F-DCCH or R-DCCH are not activated. When the R-DCCH is not activated in the control hold state/normal substate, only the reverse PCBs of a selected forward PCB are transmitted in the same pattern as the DTX pattern of a reverse pilot/PCB channel. The reverse gated transmission pattern is independent of a forward gated transmission pattern. If they are identical, an offset can exists between them for efficient power control. The offset is given as a system parameter.

Figure 3D:
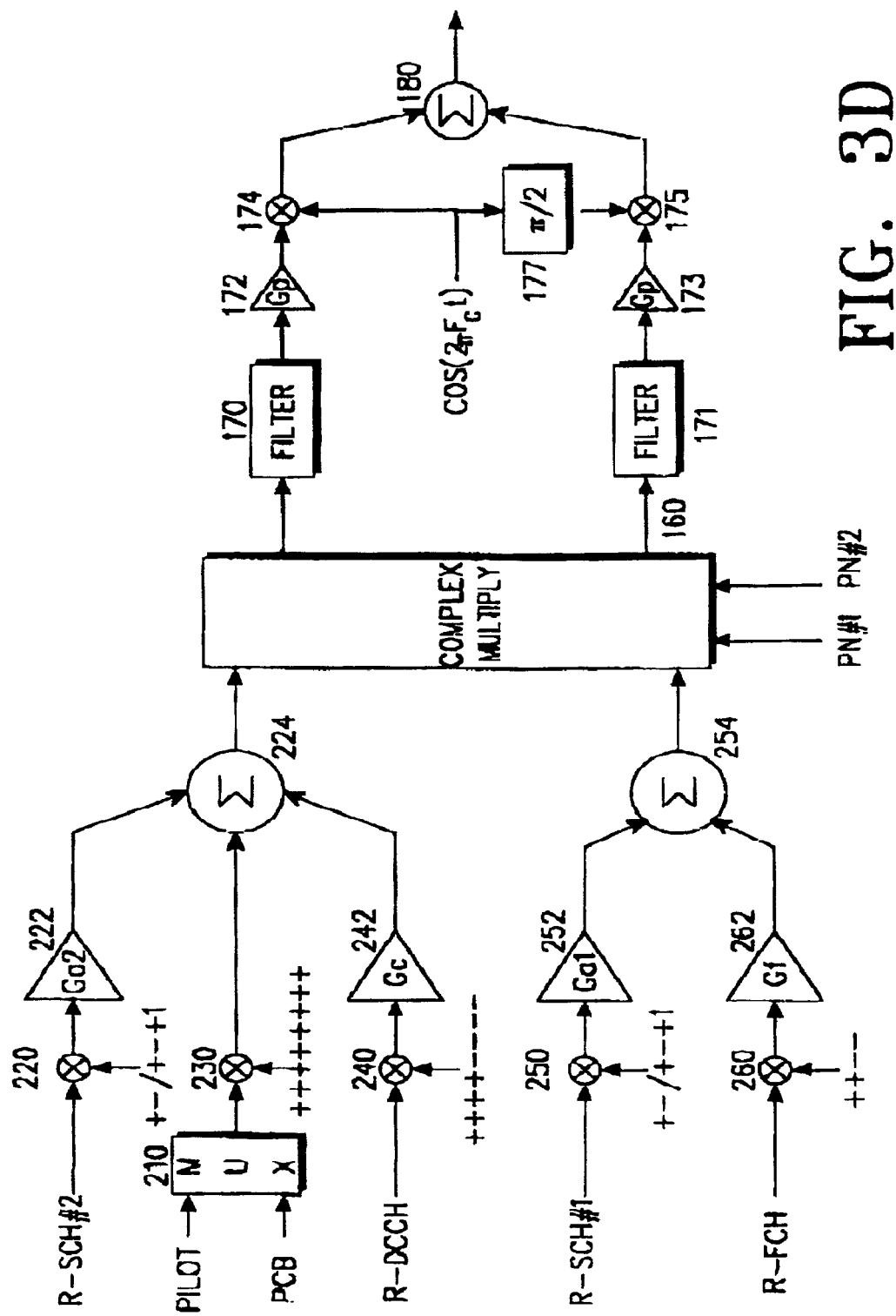
FIG. 3D is a diagram illustrating a structure of a mobile station transmitter in the conventional CDMA-2000 system.
Figure 4D:
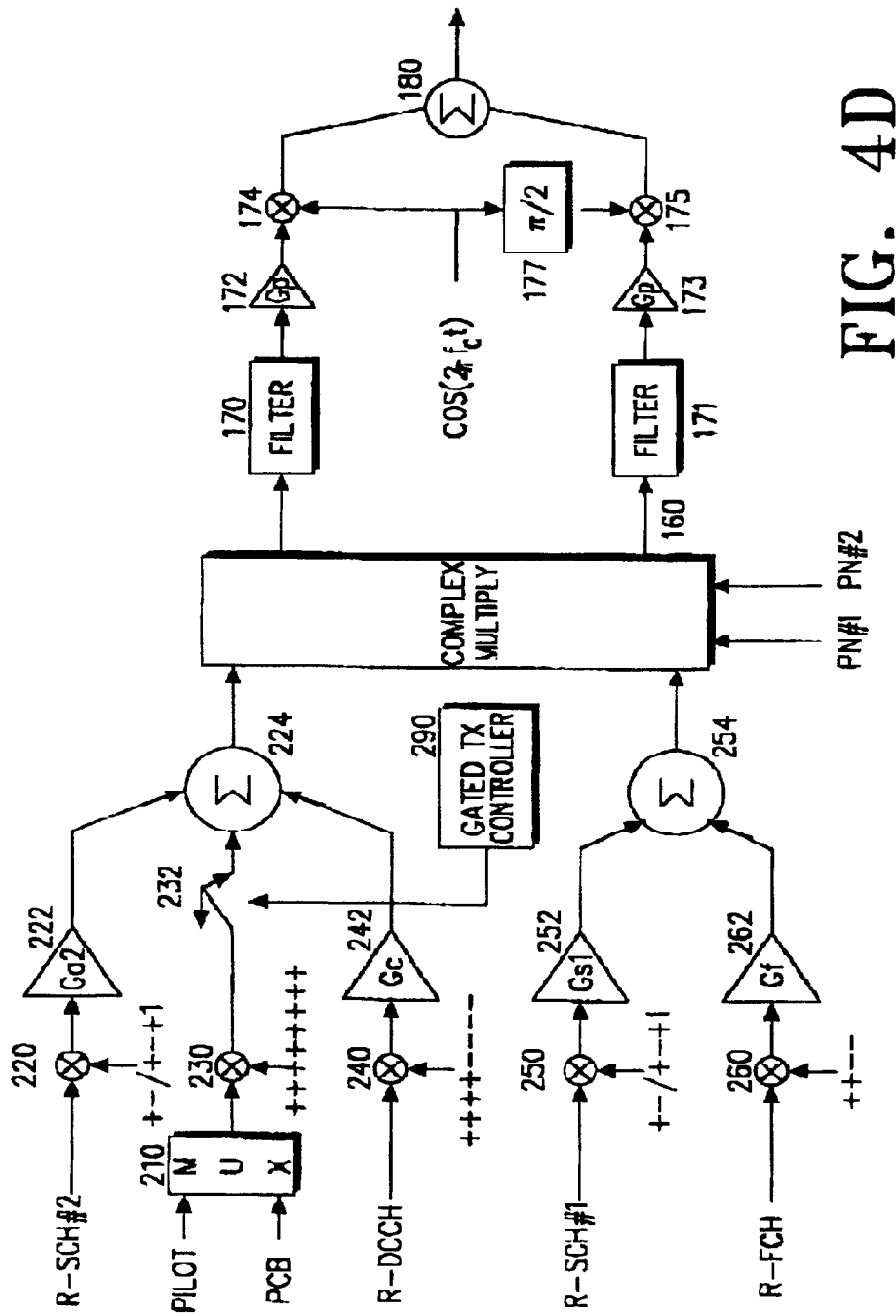
FIG. 4D is a diagram illustrating a structure of a mobile station transmitter in the CDMA-2000 system according to the embodiment of the present invention.

FIG. 4D is a block diagram of a mobile station transmitter in the CDMA-2000 mobile communication system according to the embodiment of the present invention. The mobile station of FIG. 4D is different from the conventional one of FIG. 3D in that it includes a gating operator 232 for gated transmission of a reverse pilot/PCB channel and a gated transmission controller 290 for controlling the gating operator 232. Because transmission of the reverse pilot/PCB channel is requisite for sync acquisition, no other reverse channels are transmitted for a period when the transmission of the reverse pilot/PCB channel is discontinued.

A description will be given of signal transmission diagrams for the base station and the mobile station in the CDMA-2000 mobile communication system according to the embodiment of the present invention.

Figure 5A:
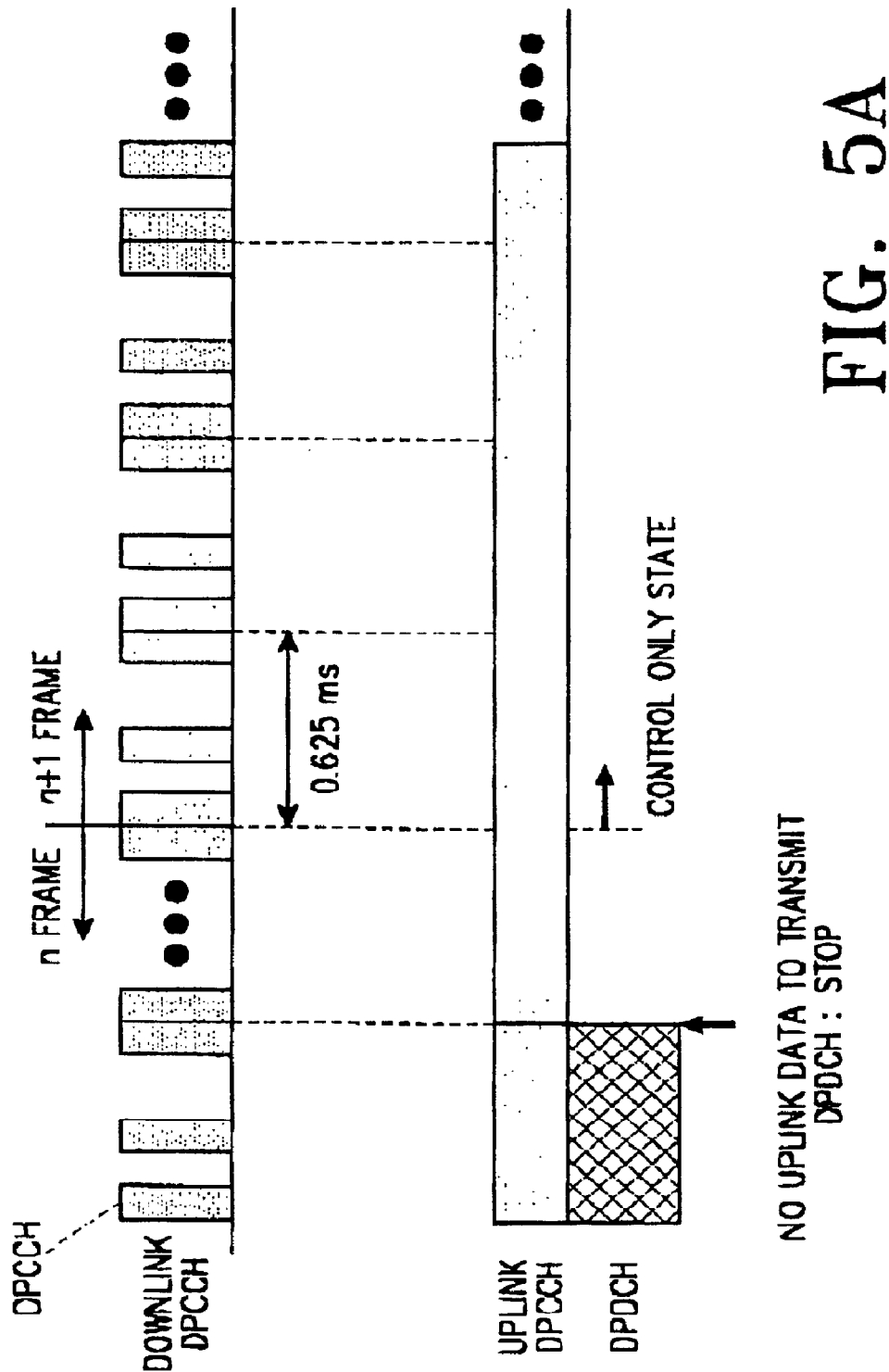
FIG. 5A is a diagram for explaining how to transmit a downlink DPCCH and an uplink DPCCH when transmission of an uplink DPDCH is discontinued in the conventional UMTS.
Figure 5B:
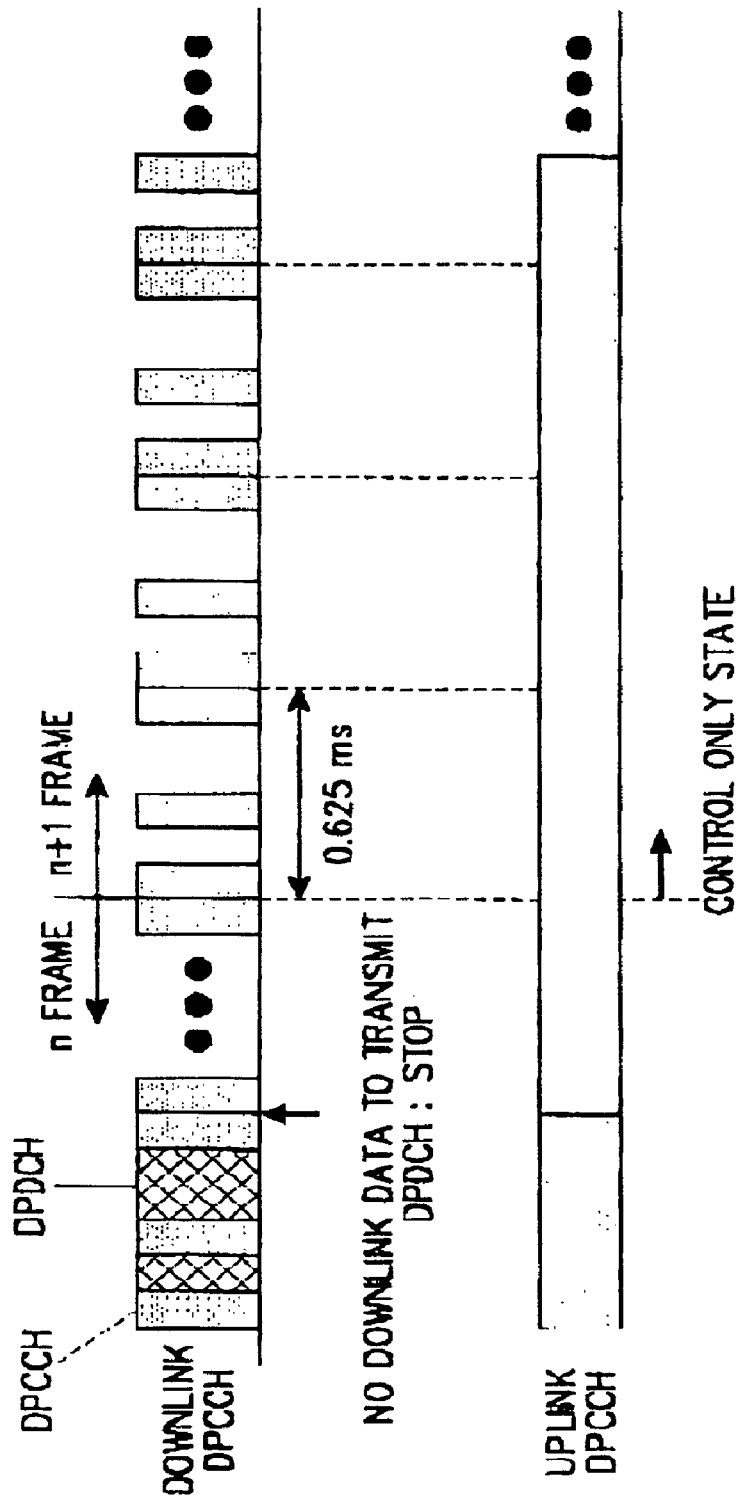
FIG. 5B is a diagram for explaining how to transmit a downlink DPCCH and an uplink DPCCH when transmission of a downlink DPDCH is discontinued in the conventional UMTS.
Figure 5C:
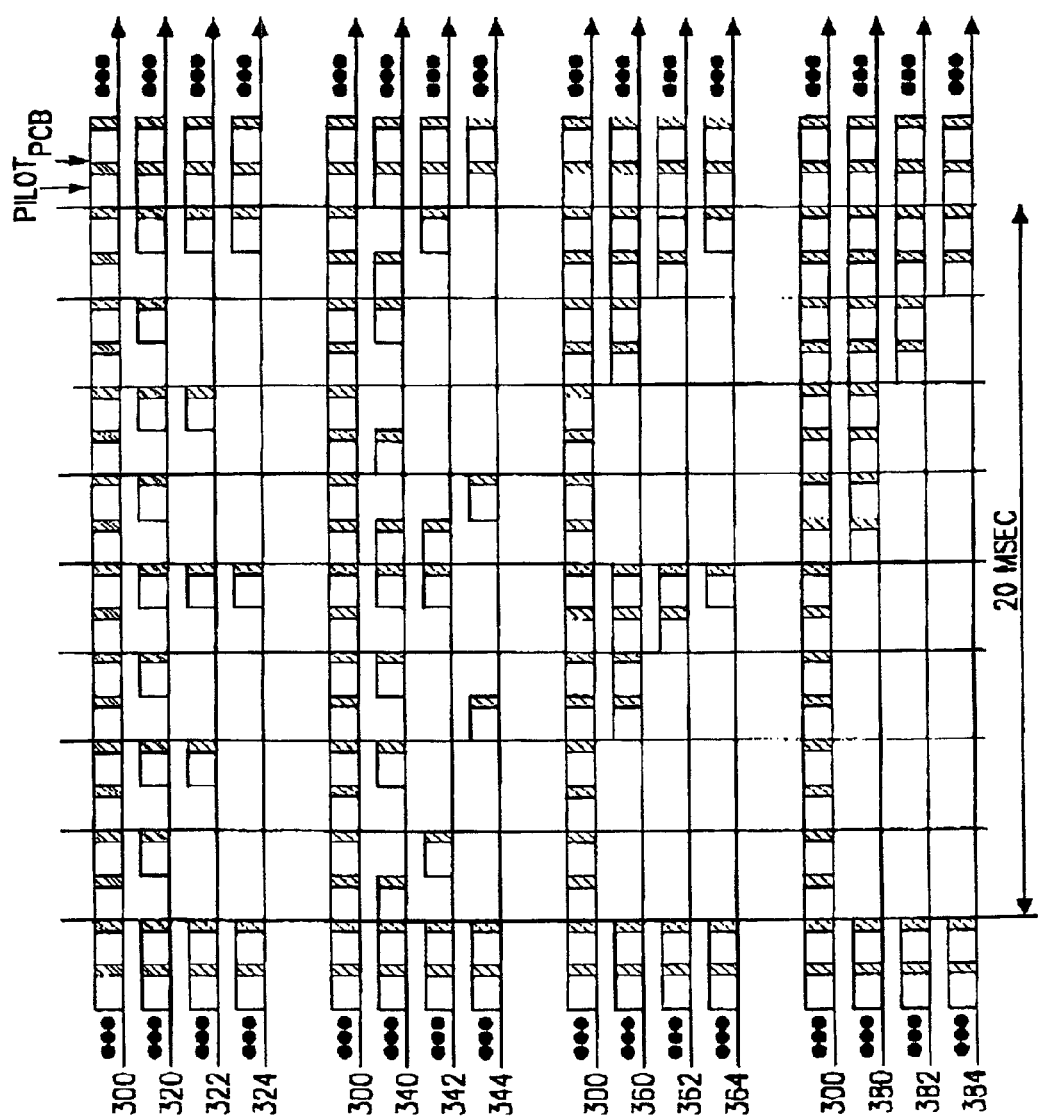
FIG. 5C is a diagram referred to for describing transmission of a reverse pilot/PCB channel signal in a control hold state of CDMA-2000 systems according to conventional technology and according to the present invention.

In FIG. 5C, reference numerals 320, 322, and 324 show signals transmitted in regular/gated transmission patterns of the reverse pilot/PCB channel in a control hold state/normal substate according to the embodiment of the present invention. Reference numerals 320 shows a method for regularly transmitting every other PCG (or time slot) on the reverse pilot/PCB channel, when DC=1/2 (only 1/2 of the whole PCGs in one frame are transmitted) in the control hold state/normal substate. Reference numeral 322 shows a method for regularly transmitting every fourth PCGs on the reverse pilot/PCB channel, when DC=1/4 (only 1/4 of the whole PCGs in one frame are transmitted) in the control hold state/normal substate. Reference numeral 324 shows a method for regularly transmitting every eighth PCGs on the reverse pilot/PCB channel, when DC=1/8 (only 1/8 of the whole PCGs in one frame are transmitted) in the control hold state/normal substate. The above state transition method can be divided into several methods as stated below, and is determined according to system setup. In one method, a direct state transition occurs from DC=1/1 to DC=1/2, from DC=1/1 to DC=1/4, or from DC=1/1 to DC=1/8 according to a set timer value or a transition command message from the base station. In another method, a sequential state transition occurs from DC=1/1 to DC=1/2, from DC=1/2 to DC=1/4, or from DC=1/4 to 1/8.

Reference numerals 340, 342, and 344 show another method for transmitting a signal according to a regular or gated transmission pattern of the reverse pilot/PCB channel in the control hold state/normal substate. Reference numerals 340 shows a method for transmitting every other PCG of the reverse pilot/PCB channel, when DC=1/2 (only 1/2 of the whole PCGs in one frame are transmitted) in the control hold state/normal substate. Reference numeral 342 shows a method for transmitting every fourth PCGs of the reverse pilot/PCB channel, when DC=1/4 (only 1/4 of the whole PCGs in one frame are transmitted) in the control hold state/normal substate. Reference numeral 344 shows a method for transmitting every eighth PCGs of the reverse pilot/PCB channel, when DC=1/8 (only 1/8 of the whole PCGs in one frame are transmitted) in the control hold state/normal substate. The above state transition method can be divided into several methods as stated below, and is determined according to system setup. In one method, a direct state transition occurs from DC=1/1 to DC=1/2, from DC=1/1 to DC=1/4, or from DC=1/1 to DC=1/8 according to a set timer value or a transition command message from the base station. In another method, a sequential state transition occurs from DC=1/1 to DC=1/2, from DC=1/2 to DC=1/4, or from DC=1/4 to 1/8.

Reference numerals 360, 362, and 364 show a third method for transmitting a signal according to a regular or gated transmission pattern of the reverse pilot/PCB channel in the control hold state/normal substate. Reference numerals 360 shows a method for transmitting four consecutive PCGs at regular locations, when DC=1/2 (only 1/2 of the whole PCGs in one frame are transmitted) in the control hold state/normal substate. Reference numeral 362 shows a method for transmitting two consecutive PCGs, when DC=1/4 (only 1/4 of the whole PCGs in one frame are transmitted) in the control hold state/normal substate. Reference numeral 364 shows a method for transmitting one PCG, when DC=1/8 (only 1/8 of the whole PCGs in one frame are transmitted) in the control hold state/normal substate. As the DC decreases to 1/2, 1/4, and 1/8, the number of the consecutive PCGs is decreased by half. The above state transition method can be divided into several methods as stated below, and is determined according to system setup. In one method, a direct state transition occurs from DC=1/1 to DC=1/2, from DC=1/1 to DC=1/4, or from DC=1/1 to DC=1/8 according to a set timer value or a transition command message from the base station. In another method, a sequential state transition occurs from DC=1/1 to DC=1/2, from DC=1/2 to DC=1/4, or from DC=1/4 to 1/8.

Reference numerals 380, 382, and 384 show a fourth method for transmitting a signal according to a regular or gated transmission pattern of the reverse pilot/PCB channel in the control hold state/normal substate. Reference numerals 380 shows a method for successively transmitting a half of the whole PCGs over the latter half of one frame, when DC=1/2 (only 1/2 of the whole PCGs in one frame are transmitted) in the control hold state/normal substate. Reference numeral 382 shows a method for successively transmitting a fourth of the whole PCGs over the last 1/4 of the frame, when DC=1/4 (only 1/4 of the whole PCGs in one frame are transmitted) in the control hold state/normal substate. Reference numeral 384 shows a method for successively transmitting an eighth of the whole PCGs over the last 1/8 of the frame, when DC=1/8 (only 1/8 of the whole PCGs in one frame are transmitted) in the control hold state/normal substate. As the DC decreases to 1/2, 1/4, and 1/8, the number of the PCGs included in the consecutive PCGs is decreased by half. The above state transition method can be divided into several methods as stated below, and is determined according to system setup. In one method, a direct state transition occurs from (DC=1/1 to DC=1/2, from DC=1/1 to DC=1/4, or from DC=1/1 to DC=1/8 according to a set timer value or a transition command message from the base station. In another method, a sequential state transition occurs from DC=1/1 to DC=1/2, from DC=1/2 to DC=1/4, or from DC=1/4 to 1/8.

The R-DCCH shown in FIGS. 13A to 13D and FIGS. 15A to 15C according to the present invention can exist on an R-DCCH frame length basis at four locations (0/5/10/15 msec) within a basic frame 20 msec.

Referring to FIG. 13A, reference numerals 400, 420, 422, and 424 show a method for transmitting a dmch generated in the control hold state/normal substate as shown in the cases 300, 320, 322, and 324 of FIG. 5C on a physical channel, R-DCCH. Reference numeral 400 shows a method for activating the R-DCCH within the R-DCCH frame length, i.e., 5 msec at longest after a dmch message is generated when no gated transmission is performed (continuous transmission DC=1/1) and transmitting the dmch message on the R-DCCH as indicated by reference numeral 412. Reference numeral 420 shows a method for activating the R-DCCH within 5 msec at longest after a dmch message is generated during DC=1/2 gated transmission and transmitting the dmch message on the R-DCCH as indicated by reference numeral 414. Reference numeral 422 shows a method for activating the R-DCCH within 5 msec at longest after a dmch message is generated during DC=1/4 gated transmission and transmitting the dmch message on the R-DCCH as indicated by reference numeral 416. Reference numeral 424 shows a method for activating the R-DCCH within 5 msec at longest after a dmch message is generated during DC=1/8 gated transmission and transmitting the dmch message on the R-DCCH as indicated by reference numeral 418. Even PCGs which are not transmitted according to a gated transmission pattern as shown in the cases 420, 422, and 424 are activated when the R-DCCH is transmitted in the corresponding period. It is possible to omit forward PCBs and expand a pilot period to a PCG length for transmission in the activated PCGs.

When the R-DCCH is to be transmitted during gated transmission, a preamble and a postamble are additionally transmitted by activating the reverse pilot/PCB channel before and after the R-DCCH in order to enable the base station to receive the R-DCCH with more accurate channel estimation. It is possible to omit the forward PCBs for the preamble and post amble periods of the reverse pilot/PCB channel and expand the pilot period to a PCB length. The number F ($\geq 0$) of preambles and the number B ($\geq 0$) of postambles are given as system parameters. The embodiment of the present invention will be illustratively described only in connection with a case of F=1 and B=1. When a PCG expected to be transmitted according to a gated transmission pattern is included in the preamble and postamble, the forward PCBs can be omitted. Reference numerals 420 and 422 denote cases that PCGs expected to be transmitted are used as preambles. Reference numeral 424 denotes a case that a preamble is activated as indicated by reference numeral 425 due to absence of a PCG expected to be transmitted. Because no PCBs are expected for transmission in a postamble period in the cases 420, 422, and 424, postambles are activated as indicated by reference numerals 415, 417, and 419.

The R-DCCH is transmitted at a transmission power level increased by a system parameter $\Delta P$, as compared to continuous transmission (DC=1). Though channel estimation is performed by using the added preamble and postamble, sync searching and tracking in a control hold state is implemented using PCGs expected to be activated.

Figure 13B:
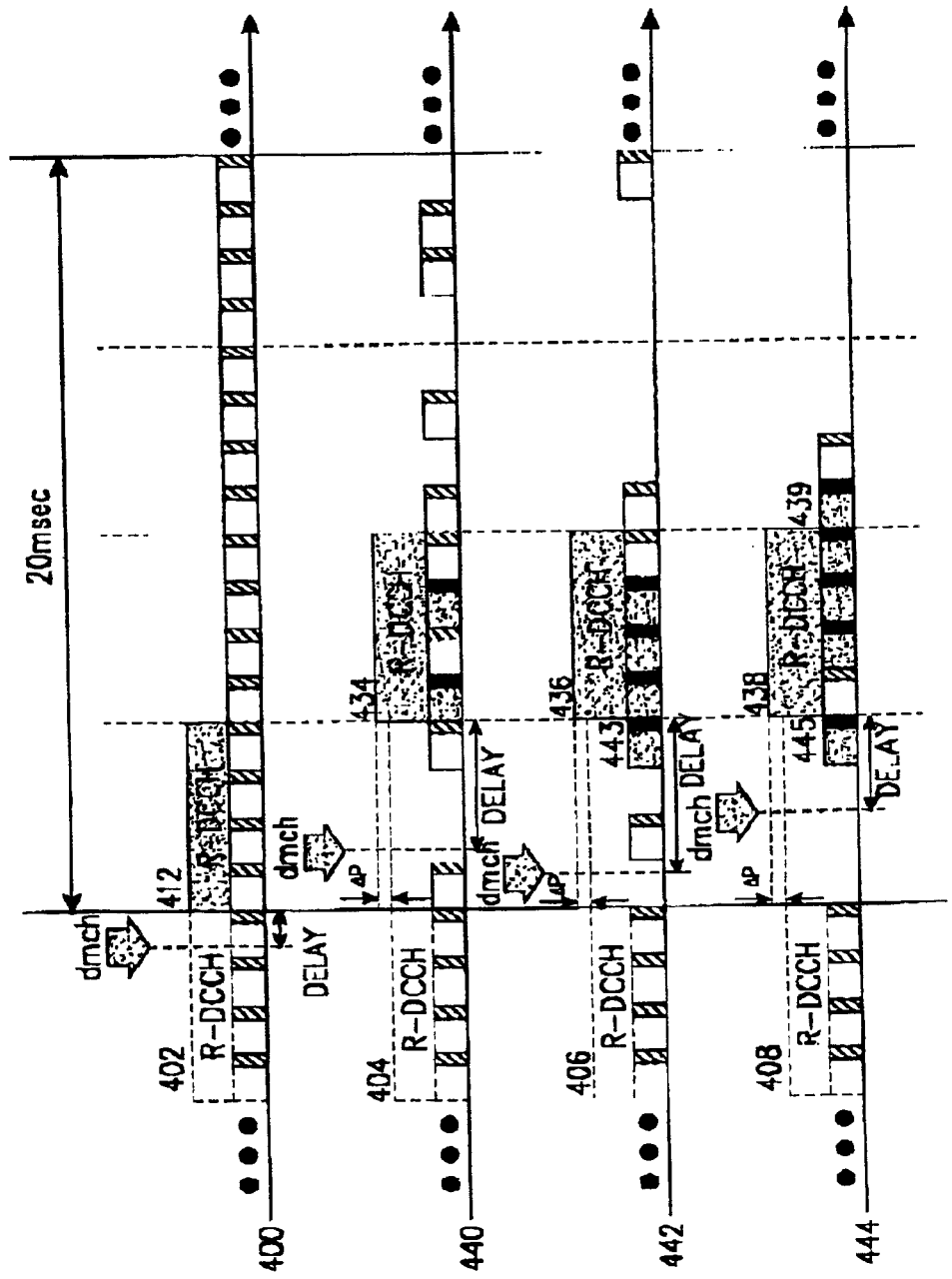
FIG. 13B is a diagram illustrating another method for transmitting a reverse pilot/PCB channel when an R-DCCH is activated in a control hold state in the conventional CDMA-2000 system and the CDMA-2000 system according to the embodiment of the present invention (gated transmission for the pilot/PCB channel at irregular time intervals)

Referring to FIG. 13B, reference numerals 400, 440, 442, and 444 show a method for transmitting a dmch generated in the control hold state/normal substate as shown in the cases 300, 340, 342, and 344 of FIG. 3 on the physical channel, R-DCCH. Reference numeral 400 shows a method for activating the R-DCCH within the R-DCCH frame length, i.e., 5 msec at longest after a dmch message is generated when no gated transmission is performed (continuous transmission (DC=1/1) and transmitting the dmch message on the R-DCCH as indicated by reference numeral 412. Reference numeral 440 shows a method for activating the R-DCCH within 5 msec at longest after a dmch message is generated during DC=1/2 gated transmission and transmitting the dmch message on the R-DCCH as indicated by reference numeral 434. Reference numeral 442 shows a method for activating the R-DCCH within 5 msec at longest after a dmch message is generated during DC=1/4 gated transmission and transmitting the dmch message on the R-DCCH as indicated by reference numeral 436. Reference numeral 444 shows a method for activating the R-DCCH within 5 msec at longest after a dmch message is generated during DC=1/8 gated transmission and transmitting the dmch message on the R-DCCH as indicated by reference numeral 438. Even PCGs which are not transmitted according to a gated transmission pattern as shown in the cases 440, 442, and 444 are activated when the R-DCCH is transmitted in the corresponding period. It is possible to omit forward PCBs and expand a pilot period to a PCG length for transmission in the activated PCGs.

When the R-DCCH is to be transmitted during gated transmission, a preamble and a postamble are additionally transmitted by activating the reverse pilot/PCB channel before and after the R-DCCH in order to enable the base station to receive the R-DCCH with more accurate channel estimation. It is possible to omit the forward PCBs for the preamble and post amble periods of the reverse pilot/PCB channel and expand the pilot period to a PCB length. The number F ($\geq$0) of preambles and the number B ($\geq$0) of postambles are given as system parameters. All the embodiments of the present invention are illustratively described only in connection with a case of F=1 and B=1. When a PCG expected to be transmitted according to a gated transmission pattern is included in the preamble and postamble, the forward PCBs can be omitted. In the case 440, a PCG expected to be transmitted is used as a preamble. In the case 442, a PCG expected to be transmitted is used as a preamble is activated as indicated by reference numeral 443. In the case 444, a preamble and a postamble are activated as indicated by reference numerals 445 and 439 due to absence of PCGs expected to be transmitted for a preamble and postamble period.

The R-DCCH is transmitted at a transmission power level increased by a system parameter $\Delta P$, as compared to continuous transmission (DC =1). Channel estimation is performed by using the added preamble and postamble.

Figure 13C:
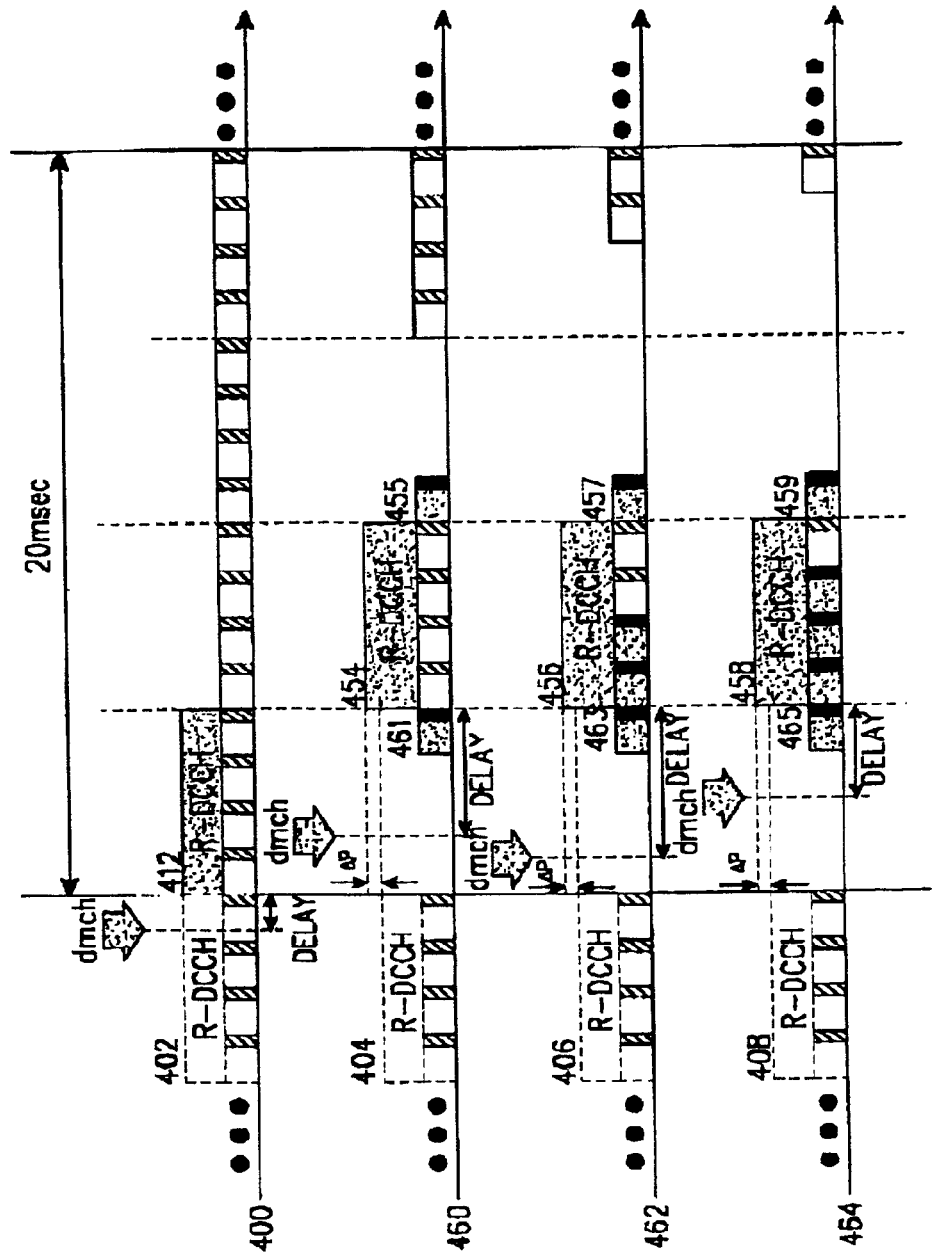
FIG. 13C is a diagram illustrating a third method for transmitting a reverse pilot/PCB channel when an R-DCCH is activated in a control hold state in the conventional CDMA-2000 system and the CDMA-2000 system according to the embodiment of the present invention (gated transmission for the pilot/PCB channel at predetermined multiple time slot intervals at a plurality of positions in one frame)

Referring to FIG. 13C, reference numerals 400, 460, 462, and 464 show positions where the physical channel, R-DCCH is possible located when the R-DCCH transmits a dmch generated in the control hold state/normal substate as shown in the cases 300, 360, 362, and 364 of FIG. 3. Reference numeral 400 shows a method for activating the R-DCCH within the R-DCCH frame length, i.e., 5 msec at longest after a dmch message is generated when no gated transmission is performed (continuous transmission DC=1/1) and transmitting the dmch message on the R-DCCH as indicated by reference numeral 412. Reference numeral 460 shows a method for activating the R-DCCH within 5 msec at longest after a dmch message is generated during DC=1/2 gated transmission and transmitting the dmch message on the R-DCCH as indicated by reference numeral 454. Reference numeral 462 shows a method for activating the R-DCCH within 5 msec at longest after a dmch message is generated during DC=1/4 gated transmission and transmitting the dmch message on the R-DCCH as indicated by reference numeral 456. Reference numeral 464 shows a method for activating the R-DCCH within 5 msec at longest after a dmch message is generated during DC=1/8 gated transmission and transmitting the dmch message on the R-DCCH as indicated by reference numeral 458. Even PCGs which are not transmitted according to a gated transmission pattern as shown in the cases 460, 462, and 464 are activated when the R-DCCH is transmitted in the corresponding period. It is possible to omit forward PCBs and expand a pilot period to a PCG length for transmission in the activated PCGs.

When the R-DCCH is to be transmitted during gated transmission, a preamble and a postamble are additionally transmitted by activating the reverse pilot/PCB channel before and after the R-DCCH in order to enable the base station to receive the R-DCCH with more accurate channel estimation. It is possible to omit the forward PCBs for the preamble and postamble periods of the reverse pilot/PCB channel and expand the pilot period to a PCB length. The number F ($\geq$0) of preambles and the number B ($\geq$0) of postambles are given as system parameters. All the embodiments of the present invention are illustratively described only in connection with a case of F=1 and B=1. When a PCG expected to be transmitted according to a gated transmission pattern is included in the preamble and postamble, the forward PCBs can be omitted. In the case 460, a PCG expected to be transmitted is used as a preamble. In the case 460, a preamble and a postamble are activated as indicated by reference numerals 461 and 455 due to absence of PCGs expected to be transmitted for a preamble and postamble period. In the case 462, a preamble and a postamble are activated as indicated by reference numerals 463 and 457 due to absence of PCGs expected to be transmitted for a preamble and postamble period. In the case 464, a preamble and a postamble are activated as indicated by reference numerals 465 and 459 due to absence of PCGs expected to be transmitted for a preamble and postamble period.

The R-DCCH is transmitted at a transmission power level increased by the system parameter $\Delta P$, as compared to continuous transmission (DC =1). While channel estimation is performed by using the added preamble and postamble, sync searching and tracking in a control hold state is implemented using PCGs expected to be activated.

Figure 13D:
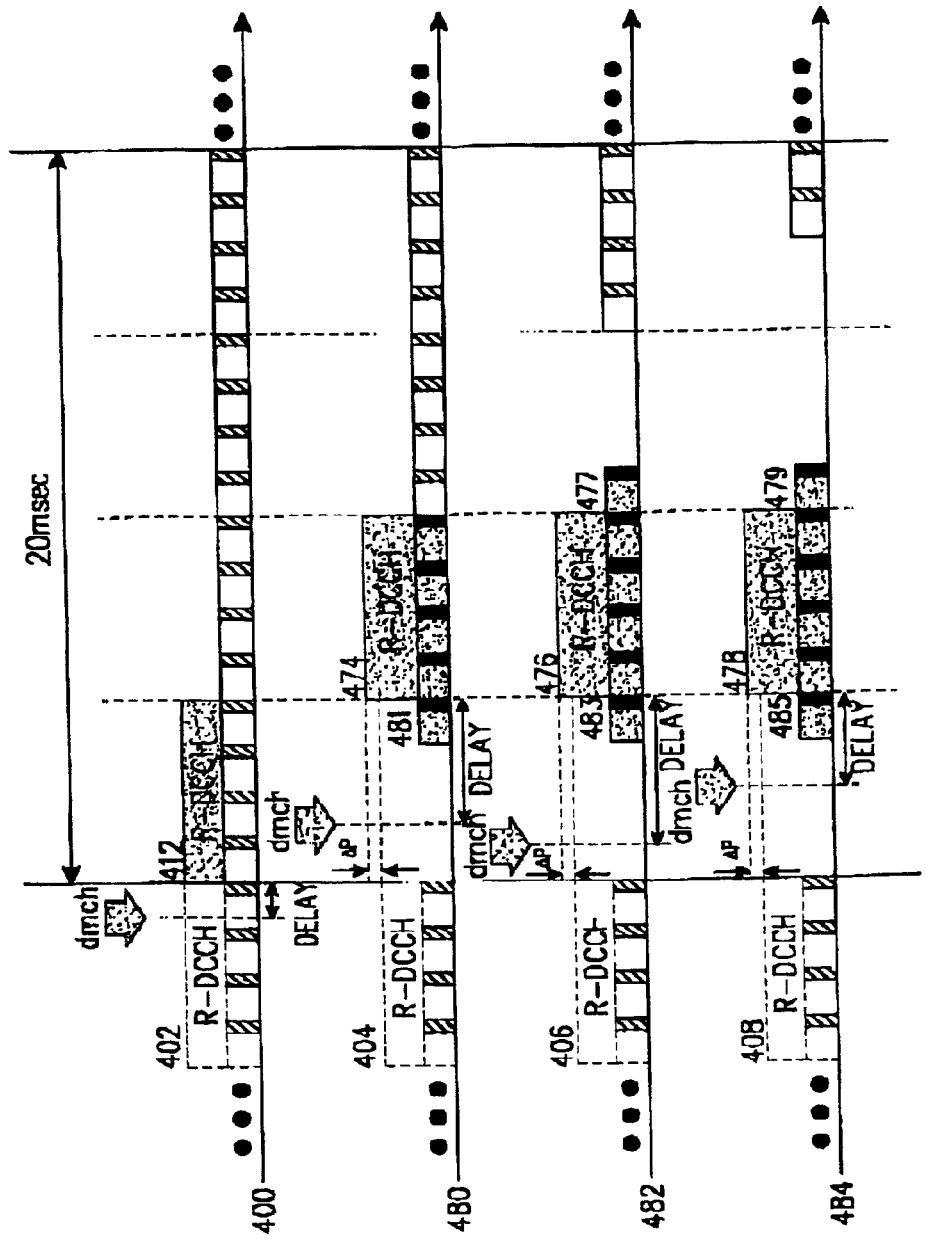
FIG. 13D is a diagram illustrating a fourth method for transmitting a reverse pilot/PCB channel when an R-DCCH is activated in a control hold state in the conventional CDMA-2000 system and the CDMA-2000 system according to the embodiment of the present invention (gated transmission for the pilot/PCB channel at predetermined multiple time slot intervals at one position in one frame)

Referring to FIG. 13D, reference numerals 400, 480, 482, and 484 show positions where the physical channel, R-DCCH is possible located when the R-DCCH transmits a dmch generated in the control hold state/normal substate as shown in the cases 300, 380, 382, and 384 of FIG. 3. Reference numeral 400 shows a method for activating the R-DCCH within the R-DCCH frame length, i.e., 5 msec at longest after a dmch message is generated when no gated transmission is performed (continuous transmission DC=1/1) and transmitting the dmch message on the R-DCCH as indicated by reference numeral 412. Reference numeral 480 shows a method for activating the R-DCCH within 5 msec at longest after a dmch message is generated during DC=1/2 gated transmission and transmitting the dmch message on the R-DCCH as indicated by reference numeral 474. Reference numeral 482 shows a method for activating the R-DCCH within 5 msec at longest after a dmch message is generated during DC=1/4 gated transmission and transmitting the dmch message on the R-DCCH as indicated by reference numeral 476. Reference numeral 484 shows a method for activating the R-DCCH within 5 msec at longest after a dmch message is generated during DC=1/8 gated transmission and transmitting the dmch message on the R-DCCH as indicated by reference numeral 478. Even PCGs which are not transmitted according to a gated transmission pattern as shown in the cases 480, 482, and 484 are activated when the R-DCCH is transmitted in the corresponding period. It is possible to omit forward PCBs and expand a pilot period to a PCG length for transmission in the activated PCGs.

When the R-DCCH is to be transmitted during gated transmission, a preamble and a postamble are additionally transmitted by activating the reverse pilot/PCB channel before and after the R-DCCH in order to enable the base station to receive the R-DCCH with more accurate channel estimation. It is possible to omit the forward PCBs for the preamble and postamble periods of the reverse pilot/PCB channel and expand the pilot period to a PCB length. The number F ($\geq 0$) of preambles and the number B ($\geq 0$) of postambles are given as system parameters. All the embodiments of the present invention are illustratively described only in connection with a case of F=1 and B=1. When a PCG expected to be transmitted according to a gated transmission pattern is included in the preamble and postamble, the forward PCBs can be omitted. In the case 480, a PCG expected to be transmitted is used as a preamble. A preamble is activated as indicated by reference numeral 481. In the case 482, a preamble and a postamble are activated as indicated by reference numerals 483 and 477 due to absence of PCGs expected to be transmitted for a preamble and postamble period. In the case 484, a preamble and a postamble are activated as indicated by reference numerals 485 and 479 due to absence of PCGs expected to be transmitted for the preamble and postamble period.

The R-DCCH is transmitted at a transmission power level increased by the system parameter $\Delta P$, as compared to continuous transmission (DC =1). While channel estimation is performed by using the added preamble and postamble, sync searching & tracking in a control hold state is implemented using PCGs expected to be activated.

FIGS. 14A to 15C show that a power control rate and a power control delay can be reduced by using different forward and reverse gating rates when a state transition message is transmitted in a control hold state according to the present invention. Further, FIGS. 16A and 16B shows that a power control delay is reduced or that power control delays are balanced on the forward and reverse links by using different forward and reverse gating patterns in the control hold state. Reference symbols FL and RL denote forward link and reverse link, respectively in the following description.

Figure 14A:
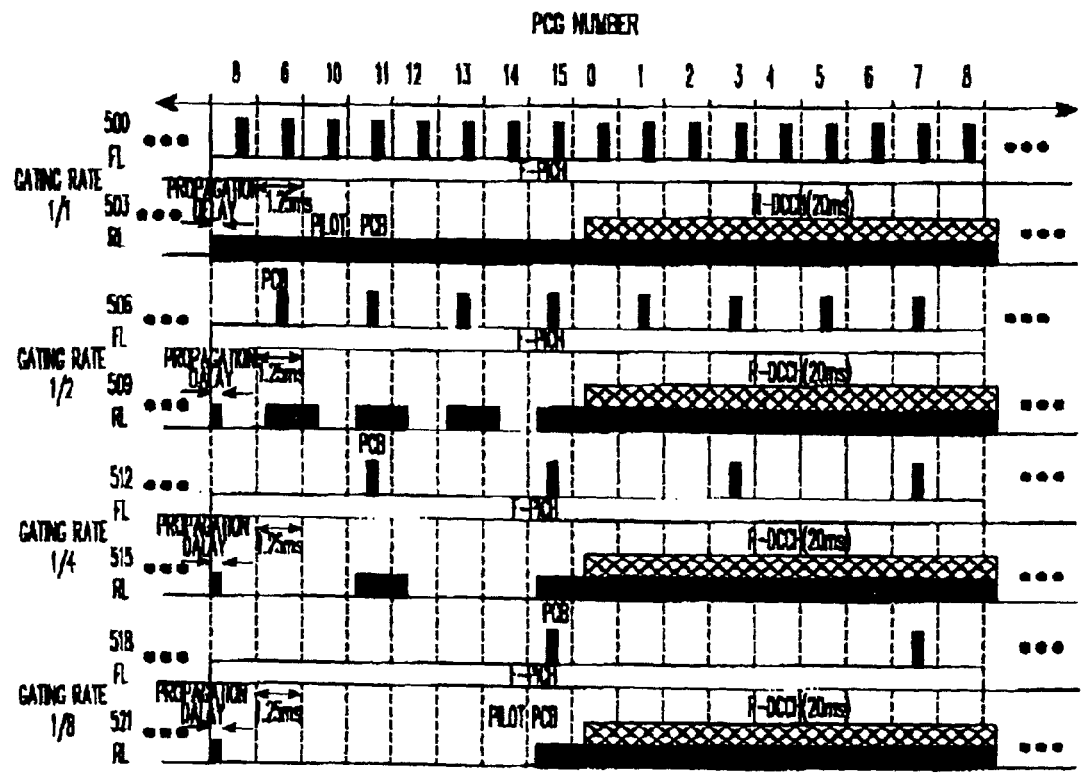
FIG. 14A is a diagram illustrating a method for transmitting forward and reverse link signals at the same gating rate in both cases that an R-DCCH is activated and not activated in a control hold state of the CDMA-2000 system according to the embodiment of the present invention.
Figure 14B:
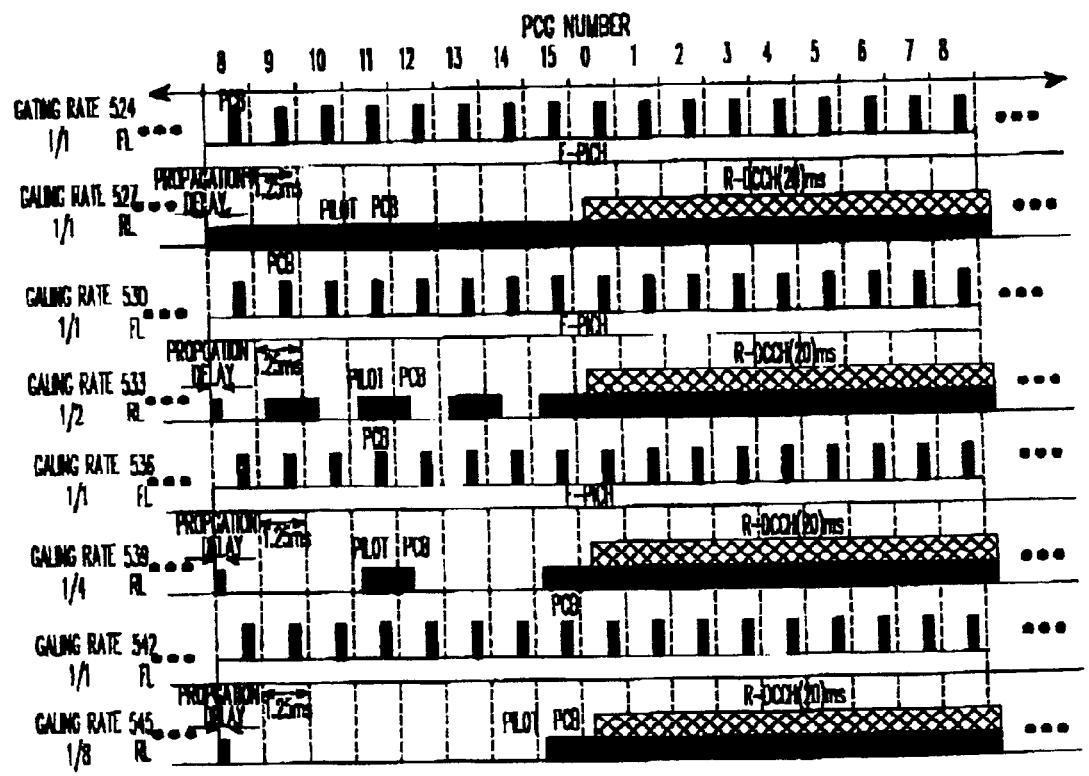
FIG. 14B is a diagram illustrating a method for transmitting forward and reverse link signals at different gating rates in both cases that an R-DCCH is activated and not activated in a control hold state of the CDMA-2000 system according to the embodiment of the present invention (forward channel transmission DC=1)
Figure 14C:
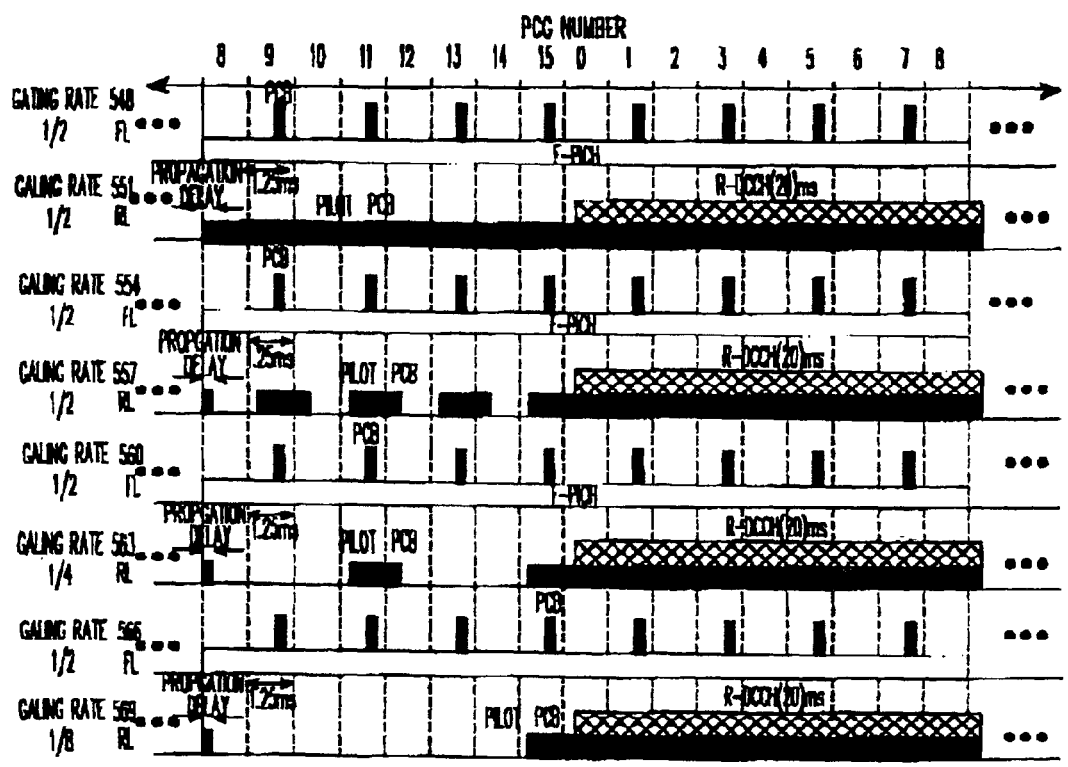
FIG. 14C is a diagram illustrating another method for transmitting forward and reverse link signals at different gating rates in both cases that an R-DCCH is activated and not activated in a control hold state of the CDMA-2000 system according to the embodiment of the present invention (forward channel transmission DC=2)

FIGS. 14A, 14B, and 14C are signal transmission diagrams for the case that the R-DCCH is activated or not activated in a control hold state according to the present invention.

FIG. 14A is a signal transmission diagram for the forward link and the reverse link at the same gating rate in both cases that the R-DCCH is activated and not activated in the control hold state. That is, FIG. 14A shows a method of transmitting signals on the forward link and the reverse link at the same gating rate when the R-DCCH is activated or not activated in the control hold state.

Referring to FIG. 14A, when the R-DCCH including pilot symbols and PCBs is activated, the R-DCCH is transmitted continuously. On the other hand, when the R-DCCH is not activated, a reverse pilot channel is transmitted at a gating rate in a gated mode. The power control rate of the reverse link is determined by the gating rate of the forward link. Reference numeral 500 indicates the case that for a forward link gating rate of 1/1, the reverse link power control rate is 800 Hz. Reference numeral 506 indicates the case that for a forward link gating rate of 1/2, the reverse link power control rate is 400 Hz. Reference numeral 512 indicates the case that for a forward link gating rate of 1/4, the reverse link power control rate is 200 Hz. Reference numeral 518 indicates the case that for a forward link gating rate of 1/8, the reverse link power control rate is 100 Hz.

As for the case that the R-DCCH is not activated in the control hold state in FIG. 14A, the reverse pilot signal including pilot symbols and PCBs is transmitted in all of eight PCGs ($8_{th}$ to $15_{th}$) when the forward and reverse link gating rates is 1/1. That is, since the reverse pilot channel signal is transmitted in each PCG of 1.25 msec, a reverse link power control rate is 800 Hz. For the forward and reverse link gating rates of 1/2, the reverse pilot channel is transmitted in the 1/2 ($9^{th}$, $11^{th}$, $13^{th}$, and $15^{th}$) of the eight PCGs. That is, since the reverse pilot channel signal is transmitted in every 1.25 msec intervals, the reverse link power control rate is 400 Hz. For the forward and reverse link gating rates of 1/4, the reverse pilot channel is transmitted in the 1/4 ($11^{th}$ and $15^{th}$) of the eight PCGs. That is, since the reverse pilot channel signal is transmitted in every 5.0 msec intervals, the reverse link power control rate is 200 Hz. For the forward and reverse link gating rates of 1/8, the reverse pilot channel is transmitted only in one ($15^{th}$) of the eight PCGs. That is, since the reverse pilot channel signal is transmitted in every 10.0 msec intervals, the reverse link power control rate is 100 Hz. The same power control rate is produced when the R-DCCH is activated.

FIG. 14B is a signal transmission diagram for the forward link and the reverse link at different gating rates in both cases that the R-DCCH is activated and not activated in the control hold state according to a first embodiment of the present invention. That is, FIG. 14B shows a method of transmitting signals on the forward link and the reverse link at different gating rate (a forward link gating rate of 1) when the R-DCCH is activated or not activated in the control hold state.

Referring to FIG. 14B, when the R-DCCH is not activated, as the reverse link gating rate varies to 1, 1/2, 1/4, and 1/8, the reverse link power control rate varies to 800, 400, 200, and 100 Hz. On the other hand, when the R-DCCH is activated, the reverse link power control rate is fixed at 800 Hz regardless of the reverse link gating rate. In addition, it can be noted that forward link and reverse link power control delays are minimized regardless of the reverse link gating rate.

As for the case that the R-DCCH is not activated in the control hold state in FIG. 14B, the reverse pilot signal including pilot symbols and PCBs is transmitted in all of eight PCGs ($8_{th}$ to $15_{th}$) when the reverse link gating rate is 1/1. That is, since the reverse pilot channel signal is transmitted in each PCG of 1.25 msec, a reverse link power control rate is 800 Hz. For a reverse link gating rate of 1/2, the reverse pilot channel is transmitted in the 1/2 ($9^{th}$, $11^{th}$, $13^{th}$, and $15^{th}$) of the eight PCGs if a propagation delay is neglected. That is, since the reverse pilot channel signal is transmitted in every 1.25 msec intervals, the reverse link power control rate is 400 Hz. For a reverse link gating rate of 1/4, the reverse pilot channel is transmitted in the 1/4 ($11^{th}$ and $15^{th}$) of the eight PCGs if the propagation delay is neglected. That is, since the reverse pilot channel signal is transmitted in every 5.0 msec intervals, the reverse link power control rate is 200 Hz. For a reverse link gating rate of 1/8, the reverse pilot channel is transmitted in only one ($15^{th}$) of the eight PCGs if the propagation delay is neglected. That is, since the reverse pilot channel signal is transmitted in every 10.0 msec intervals, the reverse link power control rate is 100 Hz.

FIG. 14C is a signal transmission diagram for the forward link and the reverse link at different gating rates in both cases that the R-DCCH is activated and not activated in the control hold state according to a second embodiment of the present invention. That is, FIG. 14C shows another method of transmitting signals on the forward link and the reverse link at different gating rate (a forward link gating rate of 1/2) when the R-DCCH is activated or not activated in the control hold state.

Referring to FIG. 14C, when the R-DCCH is not activated, as the reverse link gating rate varies to 1, 1/2, 1/4, and 1/8, the reverse link power control rate varies to 800, 400, 200, and 100 Hz. It can be noted that forward link and reverse link power control delays are minimized regardless of the reverse link gating rate.

As for the case that the R-DCCH is not activated in the control hold state in FIG. 14C, the reverse pilot signal including pilot symbols and PCBs is transmitted in all of four PCGs ($9^{th}$, $11^{th}$, $13^{th}$, and $15^{th}$) on which a signal is transmitted according to the forward link gating rate, when the reverse link gating rate is 1/1. That is, since the reverse pilot channel signal is transmitted in each PCG of 1.25 msec, a reverse link power control rate is 400 Hz. For a reverse link gating rate of 1/2, the reverse pilot channel is transmitted in the 1/2 ($9^{th}$, $11^{th}$, $13^{th}$, and $15^{th}$) of eight PCGs. That is, since the reverse pilot channel signal is transmitted in every 1.25 msec intervals, the reverse link power control rate is 400 Hz. For a reverse link gating rate of 1/4, the reverse pilot channel is transmitted in the 1/4 ($11_{th}$ and $15^{th}$) of the eight PCGs if the propagation delay is neglected. That is, since the reverse pilot channel signal is transmitted in every 5.0 msec intervals, the reverse link power control rate is 200 Hz. For a reverse link gating rate of 1/8, the reverse pilot channel is transmitted in only one ($15^{th}$) of the eight PCGs if the propagation delay is neglected. That is, since the reverse pilot channel signal is transmitted in every 10.0 msec intervals, the reverse link power control rate is 100 Hz.

Figure 15A:
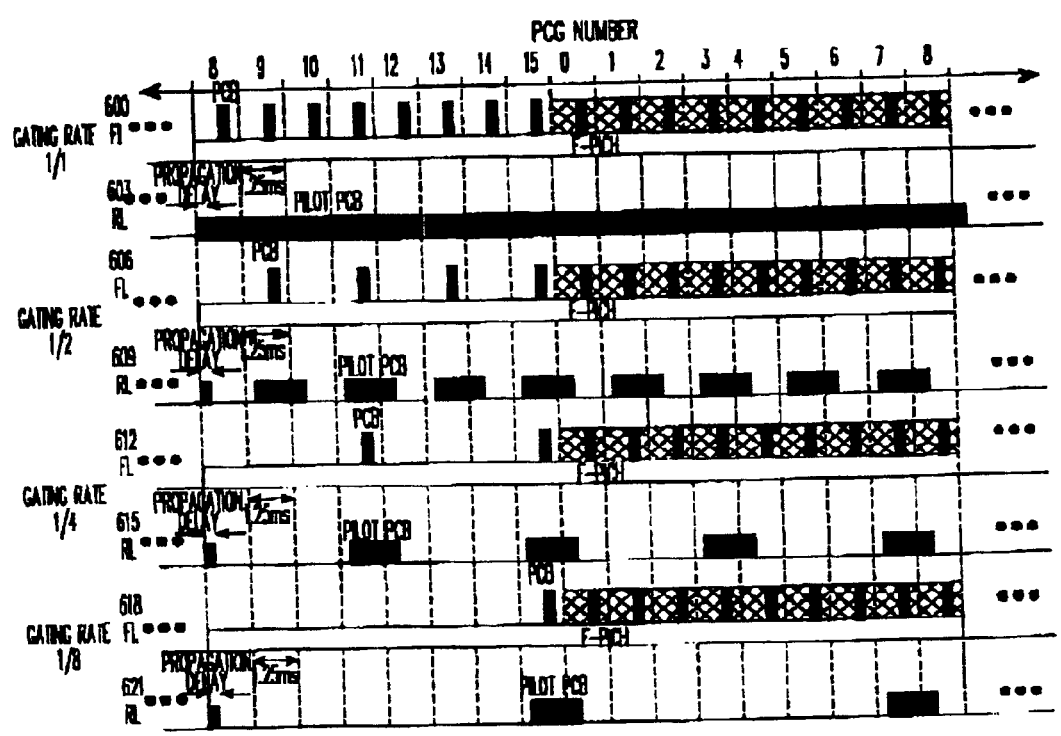
FIG. 15A is a diagram illustrating a method for transmitting forward and reverse link signals at the same gating rate in both cases that an F-DCCH is activated and not activated in a control hold state of the CDMA-2000 system according to the embodiment of the present invention.
Figure 15B:
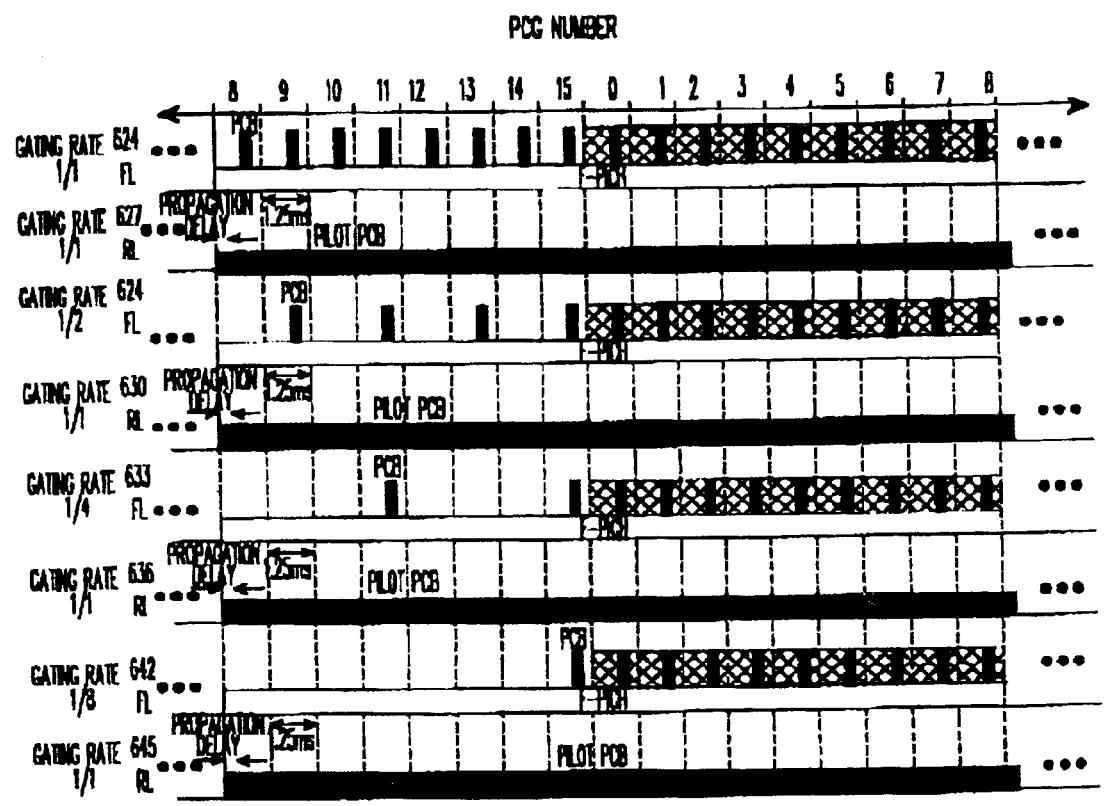
FIG. 15B is a diagram illustrating a method for transmitting forward and reverse link signals at different gating rates in both cases that an F-DCCH is activated and not activated in a control hold state of the CDMA-2000 system according to the embodiment of the present invention (reverse channel transmission DC=1)
Figure 15C:
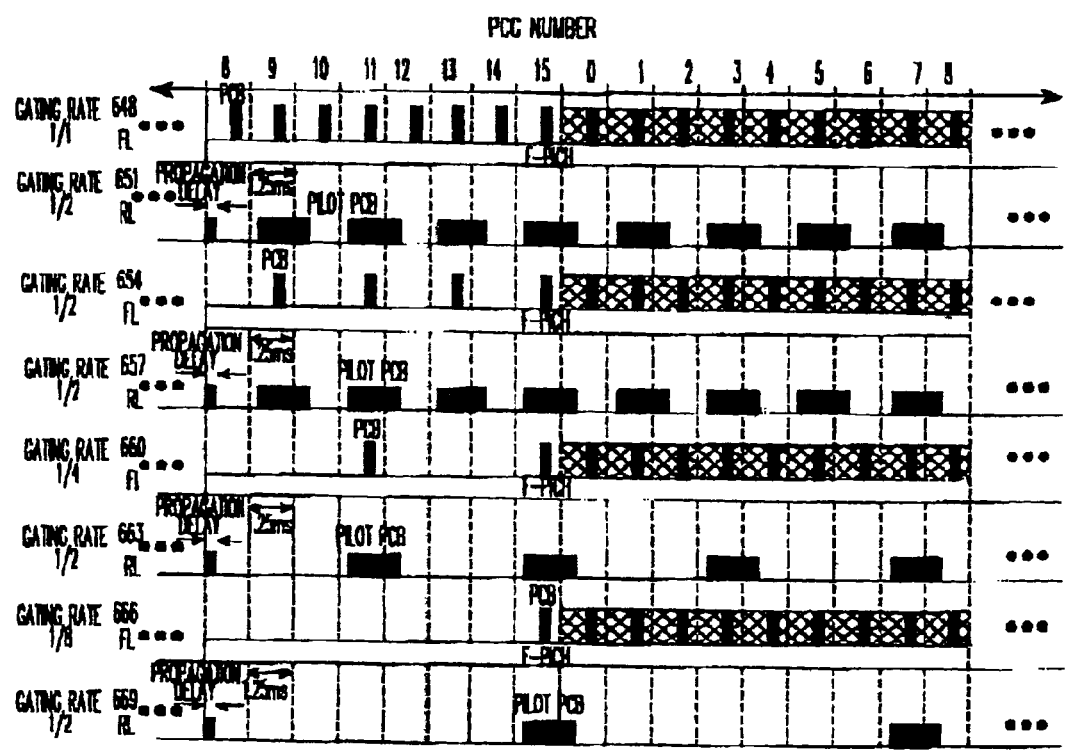
FIG. 15C is a diagram illustrating another method for transmitting forward and reverse link signals at different gating rates in both cases that an F-DCCH is activated and not activated in a control hold state of the CDMA-2000 system according to the embodiment of the present invention (reverse channel transmission DC=2)
Figure 16A:
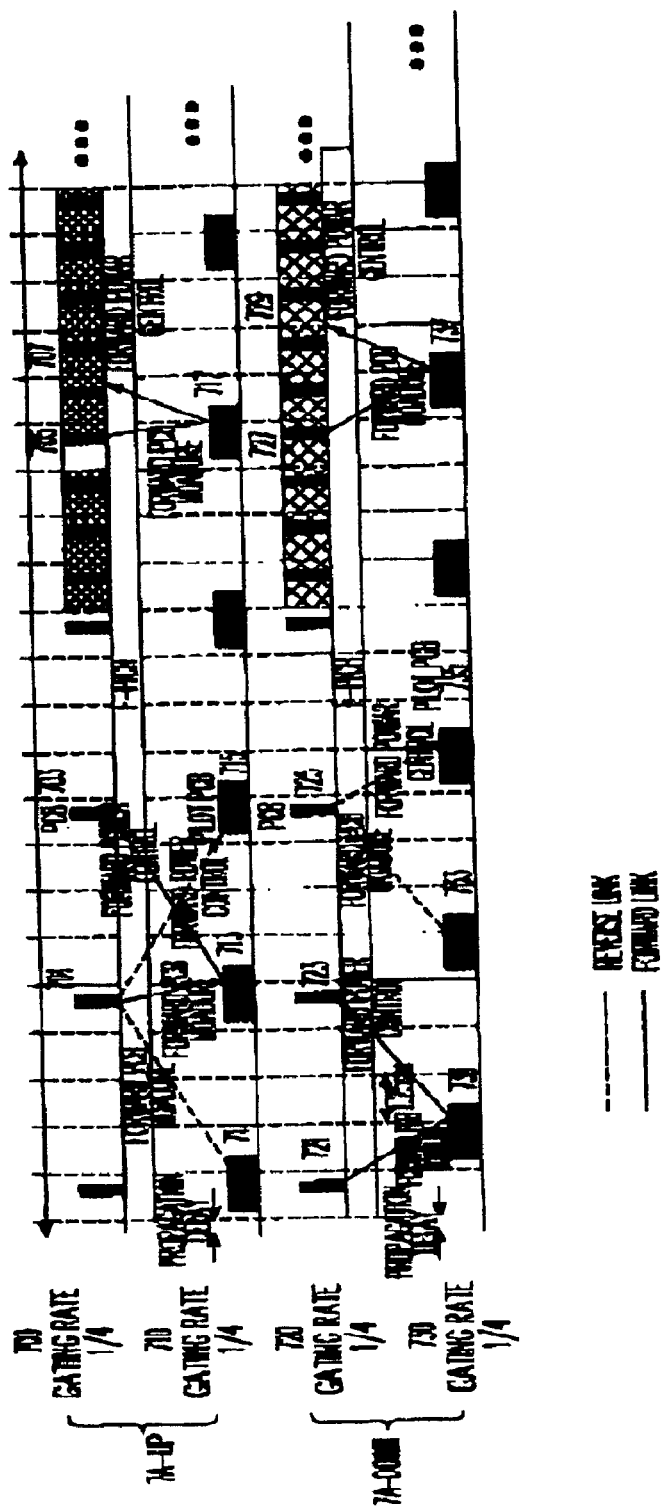
FIG. 16A is a diagram illustrating power control delay according to a gated transmission pattern of a transmission signal in both cases that an F-DCCH is activated and not activated in a control hold state of the CDMA-2000 system according to the embodiment of the present invention.
Figure 16B:
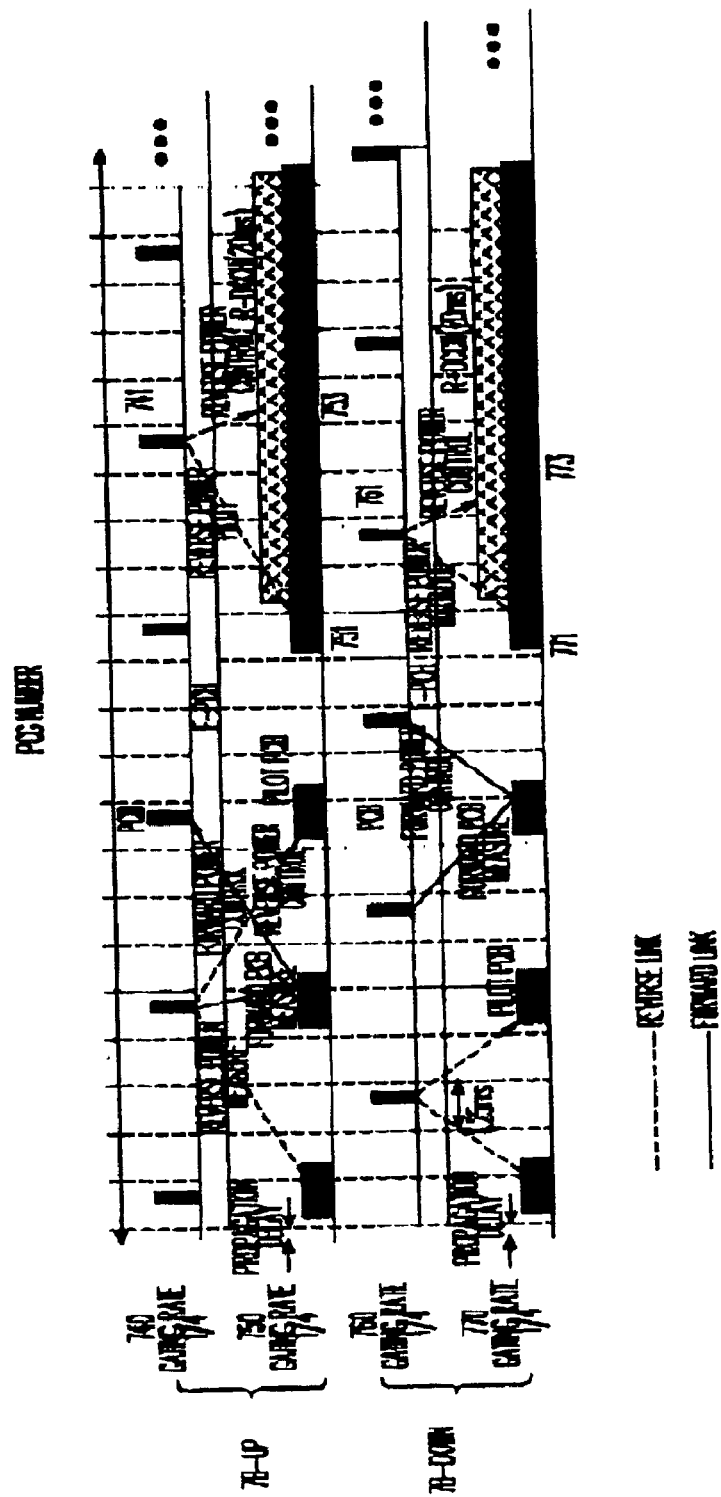
FIG. 16B is a diagram illustrating power control delay according to a gated transmission pattern of a transmission signal in both cases that an R-DCCH is activated and not activated in a control hold state of the CDMA-2000 system according to the embodiment of the present invention.

FIGS. 15A, 15B, and 15C are signal transmission diagrams in both cases that an F-DCCH is activated and not activated in the control hold state according to the present invention.

FIG. 15A is a signal transmission diagram for the forward link and the reverse link at the same gating rate in both cases that the F-DCCH is activated and not activated in the control hold state.

Referring to FIG. 15A, when the F-DCCH is activated, PCBs are transmitted continuously. On the other hand, when the F-DCCH is not activated, the PCBs are transmitted at a gating rate in a gated mode. The power control rate of the forward link is determined by the gating rate of the reverse link. Reference numeral 603 indicates the case that for forward and reverse link gating rates of 1/1, the forward link power control rate is 800 Hz since the PCB signal is transmitted in all of $8^{th}$ to $15^{th}$ PCGs on the forward link. Reference numeral 609 indicates the case that for forward and reverse link gating rates of 1/2, the forward link power control rate is 400 Hz since the PCB signal is transmitted in $9^{th}$, $11^{th}$, $13^{th}$, and $15^{th}$ PCGs on the forward link. Reference numeral 615 indicates the case that for forward and reverse link gating rates of 1/4, the forward link power control rate is 200 Hz since the PCB signal is transmitted in $11^{th}$ and $15^{th}$ PCGs on the forward link. Reference numeral 621 indicates the case that for forward and reverse link gating rates of 1/8, the forward link power control rate is 100 Hz since the PCB signal is transmitted only in the $15^{th}$ PCG on the forward link.

FIG. 15B is a signal transmission diagram for the forward link and the reverse link at different gating rates in both cases that the F-DCCH is activated and not activated in the control hold state according to a first embodiment of the present invention. That is, FIG. 15B shows a method of transmitting signals on the forward link and the reverse link at different gating rate (a reverse link gating rate of 1) when the R-DCCH is activated or not activated in the control hold state.

Referring to FIG. 15B, when the F-DCCH is not activated, as the forward link gating rate varies to 1, 1/2, 1/4, and 1/8, the forward link power control rate varies to 800, 400, 200, and 100 Hz. The forward PCB signal is transmitted in all of eight PCGs ($8^{th}$ to $15^{th}$) when the forward link gating rate is 1/1. That is, since the forward PCB signal is transmitted in every 1.25 msec intervals, a forward link power control rate is 800 Hz. For a forward link gating rate of 1/2, the forward PCB channel is transmitted in the 1/2 ($9^{th}$, $11^{th}$, $13^{th}$, and $15^{th}$) of the eight PCGs. That is, since the forward PCB signal is transmitted in every 2.5 msec intervals, the forward link power control rate is 400 Hz. For a forward link gating rate of 1/8, the forward PCB signal is transmitted in the $11^{th}$ and $15^{th}$ PCGs. That is, since the forward PCB signal is transmitted in every 5.0 msec intervals, the forward link power control rate is 200 Hz. For a forward link gating rate of 1/8, the forward pilot channel is transmitted in only the $15^{th}$ PCG. That is, since the forward PCB signal is transmitted in every 10.0 msec intervals, the forward link power control rate is 100 Hz.

On the other hand, when the F-DCCH is activated, the forward link power control rate is fixed at 800 Hz regardless of the forward link gating rate. In addition, it can be noted that forward link and reverse link power control delays are minimized regardless of the forward link gating rate.

FIG. 15C is a signal transmission diagram for the forward link and the reverse link at different gating rates in both cases that the F-DCCH is activated and not activated in the control hold state according to a second embodiment of the present invention. That is, FIG. 15C shows another method of transmitting signals on the forward link and the reverse link at different gating rate (a reverse link gating rate of 1/2) when the F-DCCH is activated or not activated in the control hold state.

Referring to FIG. 15C, when the F-DCCH is not activated, as the forward link gating rate varies to 1, 1/2, 1/4, and 1/8, the forward link power control rate varies to 800, 400, 200, and 100 Hz. The forward PCB signal is transmitted in all of four PCGs ($9^{th}$, $11^{th}$, $13^{th}$, and $15^{th}$) wherein a signal is transmitted according to a reverse gating rate, when the forward link gating rate is 1/1. That is, since the forward PCB signal is transmitted in every 2.5 msec intervals, a forward link power control rate is 400 Hz. For a forward link gating rate of 1/2, the forward PCB channel is transmitted in 1/2 ($9^{th}$, $11^{th}$, $13^{th}$, and $15^{th}$) of eight PCGs. That is, since the forward PCB signal is transmitted in every 2.5 msec intervals, the forward link power control rate is 400 Hz. For a forward link gating rate of 1/8, the forward PCB signal is transmitted in the $11^{th}$ and $15^{th}$ PCGs. That is, since the forward PCB signal is transmitted in every 5.0 msec intervals, the forward link power control rate is 200 Hz. For a forward link gating rate of 1/8, the forward pilot channel is transmitted in only the $15^{th}$ PCG. That is, since the forward PCB signal is transmitted in every 10.0 msec intervals, the forward link power control rate is 100 Hz.

On the other hand, when the F-DCCH is activated, the forward link power control rate is fixed at 400 Hz regardless of the forward link gating rate. In addition, it can be noted that forward link and reverse link power control delays are minimized regardless of the forward link gating rate.

A mobile station in the periphery of a cell with a large radius experiences a great propagation delay, thereby increasing a power control delay on the forward link/reverse link. In this case, the forward link/reverse link power control delay varies according to forward link and reverse link gating rates and relative gating positions. Therefore, a base station needs to change the forward link or reverse link gating position (pattern) to minimize forward and reverse link power control delays. For changing gating positions, the forward link gating position is fixed and the reverse link gating position is changed, or vice versa.

FIGS. 16A and 16B show that power control delays vary by gating transmission patterns according to the present invention when the F-DCCH is activated or not activated and when the R-DCCH is activated or not activated. That is, a power control delay can be reduced through gating of a transmission pattern, as compared to non-gating of a transmission pattern. A network can set reverse and forward link gating patterns for each user. In this case, the gating patterns are set in such a way that power control delays are minimized or balanced on the forward and reverse links. Values related with a power control delay in FIGS. 16A and 16B can be changed according to how a system is configured. A solid line denotes the forward link and a dotted line, the reverse link in the drawings.

FIG. 16A shows that a power control delay is changed according to a reverse link transmission pattern when the F-DCCH is activated or not activated in a control hold state.

In FIG. 16A, when the F-DCCH is not activated with such a reverse link transmission pattern as shown in a case 16a-up, forward link power control is achieved with a power control delay of 3 PCGs at a position 703 by generating a PCB 713 by measuring a forward link PCB 701 and then going up on the reverse link. Reverse link power control is achieved with a power control delay of 7 PCGs at a position 715 by generating the PCB 701 by measuring a reverse pilot symbol 711 and going down on the forward link. When the F-DCCH is activated in the case 16a-up, forward power control is achieved with a power control delay of 1 PCG at a position 707 by generating a reverse PCB 717 by measuring a forward link PCB 705 and then going up on the reverse link.

When the F-DCCH is not activated with a reverse link transmission pattern shown in a case 16a-down in FIG. 16A, forward link power control is achieved with a power control delay of 3 PCGs at a position 723 by generating a PCB 731 by measuring a forward link PCB 721 and then going up on the reverse link. Reverse link power control is achieved with a power control delay of 3 PCGs at a position 735 by generating a PCB 725 by measuring a reverse pilot symbol 733 and going down on the forward link. When the F-DCCH is activated in the case 16a-sown, forward power control is achieved with a power control delay of 2 PCGs at a position 729 by generating a reverse PCB 737 by measuring a forward link PCB 727 and then going up on the reverse link.

FIG. 16B shows that a power control delay is changed according to a forward link transmission pattern when the R-DCCH is activated or not activated in a control hold state.

Referring to FIG. 16B, when the R-DCCH is activated with a reverse link transmission pattern in a case 16b-up, reverse link power control is achieved with a power control delay of 3 PCGs at a position 753 by generating a reverse PCB 741 by measuring a reverse pilot symbol 751 and then going down on the forward link.

When the R-DCCH is activated in a case 16b-down, reverse link power control is achieved with a power control delay of 2 PCGs at a position 773 by generating a forward PCB 761 by measuring a reverse pilot symbol 771 and then going down on the forward link.

As noted from the cases 16a-up and 16b-up, forward link and reverse link power control delays are 3 PCGs and 7 PCGs, respectively in the absence of the F-DCCH and R-DCCH when forward link and reverse link slot positions are similar. If the F-DCCH exists, they are 1PCG and 3 PCGs, respectively. As noted from the cases 16a-down and 16b-down, the forward link and reverse link power control delays are equally 3 PCGs in the absence of the F-DCCH and the R-DCCH when the forward and reverse link gated transmission patterns are different. When the F-DCCH exists, they are equally 2 PCGs. In accordance with the above-described embodiments, forward and reverse link power control delays can be reduced when the DCCHs are not activated and balanced when the DCCHs are activated, by using different forward and reverse link gated transmission patterns.

Forward and reverse power control operations according to channel transmission in the control hold state in the CDMA communication system can be summarized:

(1) A mobile station gates a reverse channel at a reverse link gating rate (gating pattern) different from a forward gating rate and transmits a reverse pilot and forward power control information on the reverse channel;

(2) A base station gates a forward channel at a forward link gating rate (gating pattern) different from the reverse gating rate and transmits reverse power control information on the forward channel;

(3) The network sets different gating patterns on the forward and reverse links for each user in order to minimize a power control delay or balance power control delays of the forward and reverse links;

(4) The mobile station controls reverse transmission power according to the reverse power control information received on the forward channel;

(5) The mobile station measures the received signal strength, generates the forward power control information as the reverse link gating rate, and transmits the reverse link gating rate on the reverse channel; and (6) The base station controls forward transmission power according to the forward power control information received on the reverse channel.

As described above, the present invention has the following advantages by gating the F-DCCH and R-DCCH at different gating rates when transmission data does not exist for a predetermined time:

(1) Time required for sync reacquisition from a base station is minimized, inter-link interference is prevented, and use time of a mobile station is reduced, thereby increasing service capacity;

(2) A power control rate is increased and a power control delay is decreased by using different gating rates for the forward and reverse links. As a result, performance and cell capacity are increased; and (3) A gating position is changed to minimize a power control delay between both the links caused by a propagation delay, increasing the performance of both the links.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for setting different gating rates for an uplink and a downlink in a CDMA communication system, comprising:

a mobile station having a gated transmission controller for controlling transmission of an uplink dedicated control channel signal in a gated mode according to an uplink gating rate; and a base station having a gated transmission controller for controlling transmission of a downlink dedicated control channel signal in a gated mode according to a downlink gating rate different from the uplink gating rate, wherein the uplink gating rate and the downlink gating rate are compared to set the downlink gating rate different from the uplink gating rate.

2. The apparatus as claimed in claim 1, wherein the gated transmission controller of the mobile station transmits the uplink dedicated control channel signal in the gated mode at a changed gating rate on the uplink.

3. The apparatus as claimed in claim 1, wherein the gated transmission controller of the mobile station transmits the uplink dedicated control channel signal in the gated mode at a fixed gating rate on the uplink.

4. The apparatus as claimed in claim 2, wherein the gated transmission controller of the base station transmits the downlink dedicated control channel signal in the gated mode at a fixed gating rate on the downlink.

5. The apparatus as claimed in claim 3, wherein the gated transmission controller of the base station transmits the downlink dedicated control channel signal in the gated mode at a changed gating rate on the downlink.

6. A method of setting different gating rates for a downlink and an uplink in a CDMA communication system, comprising:

transmitting an uplink dedicated control channel signal in a gated mode according to an uplink gating rate when there is no data to transmit for a predetermined time; and transmitting a downlink dedicated control channel signal in a gated mode according to a downlink gating rate different from the uplink gating rate, wherein the uplink gating rate and the downlink gating rate are compared to set the downlink gating rate different from the uplink gating rate.

7. The method as claimed in claim 6, wherein the uplink dedicated control signal is transmitted in the gated mode at a changed gating rate on the uplink.

8. The method as claimed in claim 6, wherein the uplink dedicated control signal is transmitted in the gated mode at a fixed gating rate on the uplink.

9. The method as claimed in claim 7, wherein the gating rate of the downlink is 1.

10. The method as claimed in claim 7, wherein the gating rate of the downlink is 1/2.

11. The method as claimed in claim 8, wherein the gating rate of the uplink is 1.

12. The method as claimed in claim 8, wherein the gating rate of the uplink is 1/2.

13. The method as claimed in claim 7, wherein the downlink dedicated control signal is transmitted in the gated mode at a fixed gating rate on the downlink.

14. The method as claimed in claim 8, wherein the downlink dedicated control signal is transmitted in the gated mode at a changed gating rate on the downlink.

15. The method as claimed in claim 13, wherein the gating rate of the downlink is 1.

16. The method as claimed in claim 13, wherein the gating rate of the downlink is 1/2.

17. A channel transmission method in a CDMA communication system, comprising the step of transmitting data at a forward gating rate different from a reverse gating rate in a gated mode, wherein the reverse gating rate and the forward gating rate are compared to set the forward gating rate different from the reverse gating rate.

18. A channel transmission apparatus in a CDMA communication system, comprising a gating controller for transmitting data at a forward gating rate different from a reverse gating rate in a gated mode, wherein the reverse gating rate and the forward gating rate are compared to set the forward gating rate different from the reverse gating rate.

* * * * *